United States Patent
Carr et al.

(10) Patent No.: US 7,313,575 B2
(45) Date of Patent: Dec. 25, 2007

(54) DATA SERVICES HANDLER

(75) Inventors: Steven R. Carr, San Jose, CA (US); Venkatakrishnan Muthuswamy, Cupertino, CA (US); Tudor Har, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 495 days.

(21) Appl. No.: 10/868,434

(22) Filed: Jun. 14, 2004

(65) Prior Publication Data

US 2005/0278270 A1  Dec. 15, 2005

(51) Int. Cl.
*G06F 17/00* (2006.01)
*G06F 7/00* (2006.01)
*G06F 15/16* (2006.01)

(52) U.S. Cl. .............. 707/104.1; 707/101; 707/102; 709/201

(58) Field of Classification Search ............ 707/104.1, 707/100, 102, 101; 705/1; 709/201
See application file for complete search history.

(56) References Cited

U.S. PATENT DOCUMENTS

| | | | |
|---|---|---|---|
| 6,088,717 A * | 7/2000 | Reed et al. ............... 709/201 |
| 6,157,707 A | 12/2000 | Baulier et al. |
| 6,163,604 A | 12/2000 | Baulier et al. |
| 6,233,575 B1 | 5/2001 | Agrawal et al. |
| 6,240,411 B1 | 5/2001 | Thearling |
| 6,317,700 B1 | 11/2001 | Bagne |
| 6,480,844 B1 | 11/2002 | Cortes et al. |
| 6,484,163 B1 | 11/2002 | Lawrence et al. |
| 6,519,576 B1 | 2/2003 | Freeman |
| 6,557,008 B1 | 4/2003 | Temple, III et al. |
| 6,571,279 B1 | 5/2003 | Herz et al. |
| 7,062,500 B1 * | 6/2006 | Hall et al. ............... 707/102 |
| 2004/0045014 A1 * | 3/2004 | Radhakrishnan ............ 719/328 |
| 2005/0021354 A1 * | 1/2005 | Brendle et al. ............... 705/1 |
| 2005/0021998 A1 * | 1/2005 | Fiedler et al. ............. 713/200 |
| 2005/0044165 A1 * | 2/2005 | O'Farrell et al. ............ 709/213 |
| 2005/0091276 A1 * | 4/2005 | Brunswig et al. ......... 707/104.1 |

* cited by examiner

*Primary Examiner*—Kuen S Lu

(57) ABSTRACT

A data services handler comprises an interface between a data store and applications that supply and consume data, and a real time information director (RTID) that transforms data under direction of polymorphic metadata that defines a security model and data integrity rules for application to the data.

37 Claims, 24 Drawing Sheets

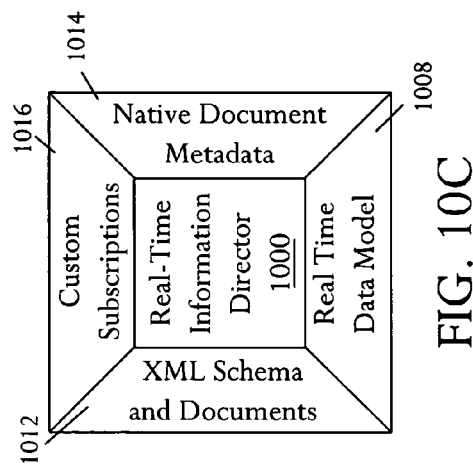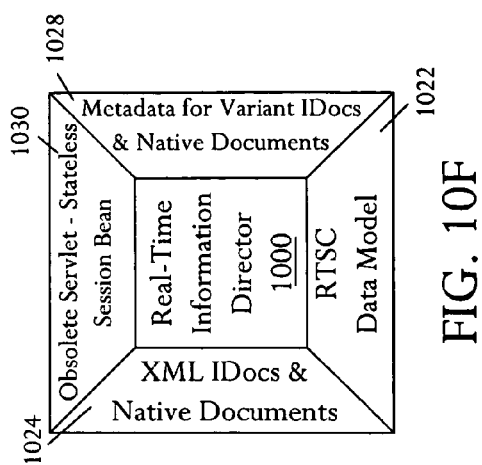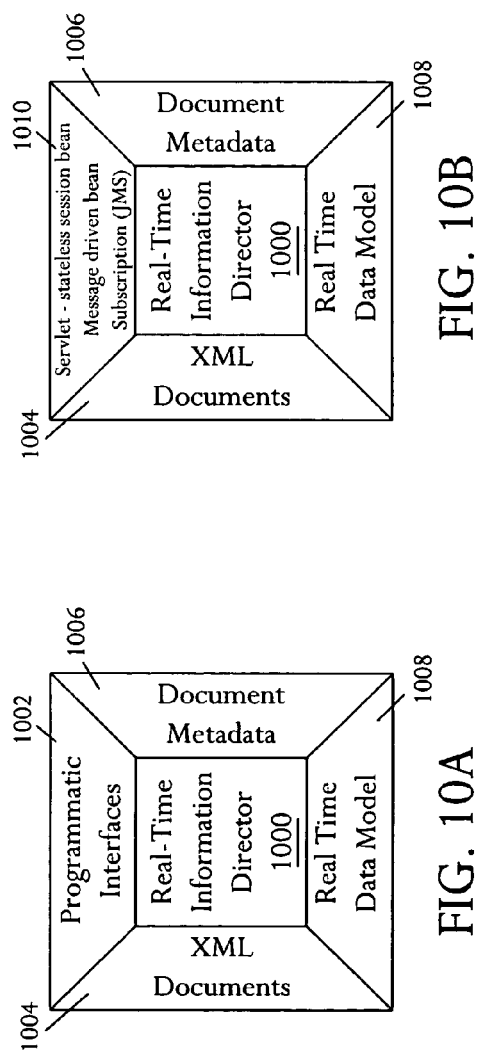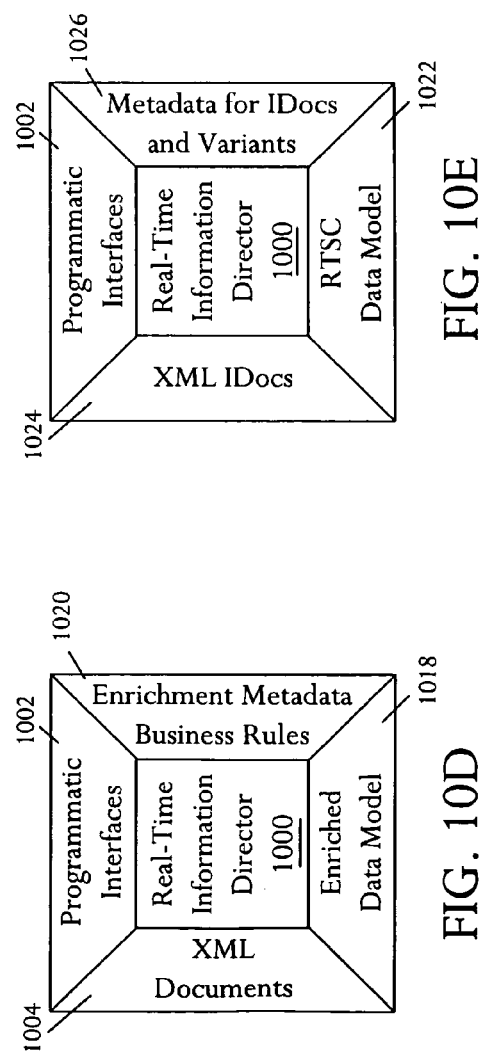

DATA SERVICES HANDLER

BACKGROUND OF THE INVENTION

Enterprises today are driven to improve responsiveness to customers and events, an objective commonly sought through usage of a computing infrastructure that attains access to integrated, real-time information. One aspect of real-time enterprises is a capability to materialize data from disjointed databases into an integrated data model. Many problems, such as synchronization of master data, cannot be solved effectively by a federated database approach alone. Data elements are deduplicated and merged into a common data model to create a semantic bridge between systems. Existing tools and methods operate in batch mode to support business intelligence applications, but little is available to support real-time information integration.

Latency, an inability to react immediately to business stimuli, can contribute to basically any deficiency in business performance, for example poor customer service, missed selling opportunities, failure to address consumer fraud, insufficiency in monitoring enterprise finances, and the like. A zero latency enterprise (ZLE) performance has been sought to enable enterprises to eliminate latency from operations so that business events that occur anywhere in an organization can immediately trigger appropriate actions across other parts of the enterprise and beyond. Elimination of operational inconsistency is sought to enable users to gain real-time consolidated performance and enable the enterprise to become more responsive and competitive.

The challenge is attaining a zero latency performance so that a business can integrate, synchronize, and route data across the enterprise, all in real time.

One technique that has been attempted to attain a low latency performance relies on standard applications to supply data services using a standard data model. Another technique attempts to customize a data model without recoding applications through usage of table-driven code. Table-driven code is deficient in capability to handle new data cases well if the new cases have attributes unlike previous cases. Another attempted solution is usage of user-exits to evade limitations of table-driven approaches. User-exits are difficult to integrate into the application, as data and functions available to user-exits are typically very limited.

While many industry participants have sought real-time performance, few have attained more than simple asynchronous message passing middleware. Similarly, an adaptive computing capability has been discussed but not progressed beyond simple system level concepts such as computing on demand.

SUMMARY

In accordance with an embodiment of a data services system, a data services handler comprises an interface between a data store and applications that supply and consume data, and a real time information director (RTID) that transforms data under direction of polymorphic metadata that defines a security model and data integrity rules for application to the data.

BRIEF DESCRIPTION OF THE DRAWINGS

Embodiments of the invention relating to both structure and method of operation, may best be understood by referring to the following description and accompanying drawings whereby:

FIGS. 10A through 10K are schematic block diagrams illustrating embodiments of various real time information director interfaces;

DETAILED DESCRIPTION

Figure 1A:
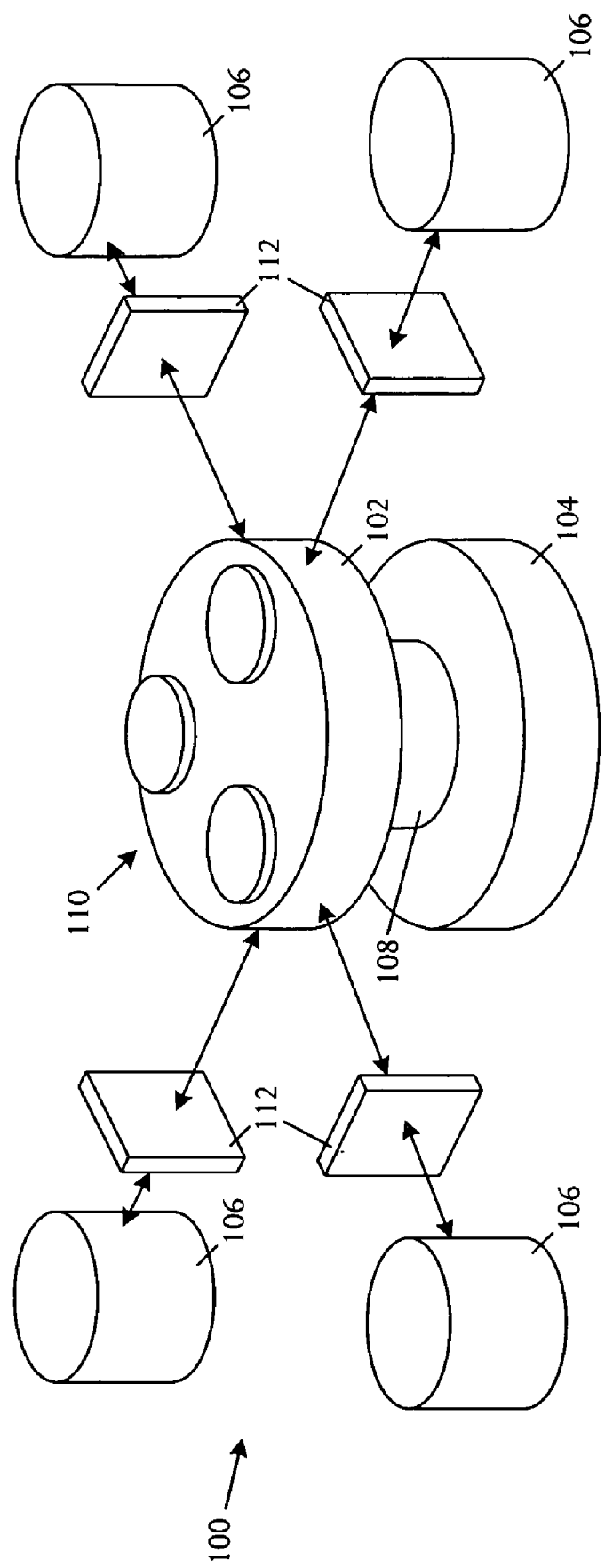
FIGS. 1A and 1B are schematic block diagrams that depict an embodiment of a data services handler.

An example of a real-time infrastructure is Supply Chain™ from Hewlett-Packard of Palo Alto, Calif., which operates in a distributed fashion, with geographies and business units having different business processes. To respond to customers and suppliers more effectively, a real-time computing infrastructure is implemented which maps data from many of the hundreds of Systems, Applications, and Products (SAP) instances into a common data model, embodied in a real-time data store. SAP of Walldorf, Germany supplies enterprise systems. The result is a unified view of the Supply Chain, up to the current minute, that attains an ability to manage supply globally, enabling more efficient pricing, supplier contracts, and inventory turns.

The illustrative embodiments can be implemented in a real-time computing architecture with a capability to supply a solution that makes an enterprise more adaptive as a business by supplying a capability to integrate disparate enterprise applications in real time, addressing business-level flexibility and timeliness. An enterprise system is a computing environment or model that includes multiple interlinked servers and networks in which multiple users access applications and data stored on a server.

A real-time infrastructure has one or more of several desirable characteristics including an extreme adaptability of the data model, allowing rapid customization. In illustrative embodiments, relationships between source data and a central data model are described as metadata. Other characteristics include support for cleansing, enrichment, integration, and aggregation of data for use by subscribing applications, a capability for mapping and translating data and messages from numerous structures and database technologies into a common data model. Data cleansing, which may otherwise be termed data scrubbing, is the process of amending or removing data in a database that is incomplete, incorrect, improperly formatted, or duplicated. In a data-intensive application such as telecommunications, transportation, banking, insurance, or retailing, data cleansing is used to systematically examine data for flaws using rules, algorithms, data relationships, such as look-up tables, and the like. Other characteristics include a simple and open subscription service, security and integrity of data in the real-time data store, and a capability for synchronous and asynchronous delivery of inbound and outbound data.

An integrated set of services called a real time information director (RTID) has been developed to address performance and functionality of a real-time enterprise. The real time information director is responsible for most or all data input and output to the real-time data store. The real time information director receives and sends data in the form of eXtended Markup Language (XML) documents. In an illustrative embodiment, the real time information director is implemented in the Java language and runs through WebLogic Server™ from BEA of San Jose, Calif. The real time information director is accessed synchronously via HyperText Transport Protocol (HTTP) and asynchronously via Java Message Service (JMS). Hewlett-Packard's OpenView™ manages the real time information director through standard Java 2 Enterprise Edition (J2EE) and NonStop WebLogic Server (WLS) mechanisms. The real time information director interoperates with various Enterprise Application Integration (EAI) platforms and middleware, such as SAP Netweaver XI™ from SAP of Walldorf, Germany, various programs from Web Methods™ of Fairfax, Va., Rendezvous™ from TIBCO Software, Inc. of Palo Alto, Calif., BEA eLink™ and HP Service Bus™. The EAI platforms supply adapters to many other applications that feed or consume data from the real-time data store.

The real time information director prepares and caches Java Database Connectivity (JDBC) statements for each inbound or outbound document class. A "document disassembler" contains prepared statements for inserting or updating various records related to a particular class of inbound documents into the data store. A "document assembler" contains prepared statements for selecting various records related to a particular class of outbound documents from the data store. The real time information director can instantiate and cache for reuse as many disassemblers and assemblers of each document class as is appropriate to handle peak concurrent demand.

Each class of documents is defined through descriptive metadata. Assemblers and disassemblers are created on-the-fly, based entirely on the descriptive metadata and on the schema of the tables read on demand from the database. Because the metadata is descriptive rather than procedural, the same metadata is used to build both assemblers and disassemblers of the same document class.

Metadata is expressed in Java, mainly with nested Java constructors. New Java metadata subclasses are created as appropriate to handle novel criteria. The metadata classes extensively use polymorphism. Format metadata classes map documents from externally-defined representations, such as SAP IDocs, to a common data model. Content metadata classes describe the relationships between the various records and tables that contribute to a particular document. Other metadata classes invoke various data services and cleanse or enrich the document, either before insertion into the real-time data store, or when assembling an outbound document.

A zero latency enterprise (ZLE) data store is developed that is capable of consolidating data that resides in multiple applications.

A real time information director is developed that supplies multiple services for clients of the ZLE data store including security, auditing, data cleansing, deduplication, aggregation, real-time scoring, business rules, accumulators, user-written functions, and the like.

The real time information director uses metadata, defined as data that describes various aspects of other data, for multiple purposes. In various embodiments, the real time information director uses the same descriptive metadata for purposes including controlling disassembly of documents for loading into a database, controlling assembly of documents from records in the database, generating an eXtended Markup Language (XML) schema that describes the document format, and other purposes.

Descriptive metadata is typically very concise in comparison to procedural code. For example, real time information director (RTID) metadata for individual SAP IDocs is typically about one-tenth the size of the eXtensible Stylesheet Language Transformations (XSLT) style sheets that have been created to map the IDoc to the Real-Time Supply Chain (RTSC) data model.

Polymorphic metadata can be used to enable extension of the real time information director to facilitate and address new functionality and behaviors. Polymorphic metadata is metadata that takes many forms, using polymorphism to flexibly represent different patterns economically and facilitate evolution of metadata as new circumstances arise. Generally, an individual metadata class can be used to represent a different common pattern, defined with attributes that are specific to the pattern. For example, circles and rectangles can be assigned to different classes of Shape with Circle having a defining attribute called diameter, and Rectangle having defining attributes called length and width. The polymorphic representation is economical because specified attributes or parameters of metadata can be limited to those that are applicable to a specific pattern under consideration. New metadata classes can be rapidly generated to solve new problems outside of the patterns previously encountered.

In some embodiments, polymorphic metadata can be expressed in Java, enabling usage of descriptive language for new classes of metadata to be implemented at the same time as the behavior that carries out that metadata. The descriptive power of the metadata can be embodied in Java constructors.

In a Java implementation, individual classes of real time information director (RTID) metadata can be implemented as distinct Java classes. Parameters passed to the constructors for each metadata class serve to describe the metadata. Other methods of metadata classes are called to carry out the functions of the metadata. A new class of metadata is most frequently created by creating a new subclass of an existing metadata class. The subclass can be used in any context in which the superclass could be used. Additional parameters can be defined for the sub-class, which can then be used within the implementation of any methods that override the inherited behaviors of the superclass. The metadata classes are stateless and are called by the core functionality of the real time information director (RTID) whenever the real time information director is operating on relevant data. Stateful data objects are passed to the relative metadata methods as parameters.

Referring to FIG. 1A, a schematic block diagram depicts an embodiment of a data services handler 100 that comprises an interface 102 between a data store 104 and applications, shown as applications 106, which supply and consume data, and a real time information director 108. The real time information director 108 transforms data under direction of polymorphic metadata that defines a security model and data integrity rules for application to the data.

In a particular embodiment, the data services handler 100 can be implemented according to a Zero Latency enterprise (ZLE) architecture or framework, a multiple-level architecture centered on a virtual hub or ZLE core 110, that caches and routes information. Contained within the ZLE core 110 are persistent ZLE data store 104 and various components or devices that maintain the data store 104 in synchrony with various systems integrated by the core 110. ZLE supports many enterprise applications, for example including Systems, Applications, and Products (SAP) in data processing, Siebel Systems, and other enterprise systems, that attach to the ZLE core 110 via a variety of application and technology adapters, shown as adapters 112. The adapters 112 convert proprietary messages to standards supported by the ZLE core 110. Siebel Systems, Inc., of San Mateo, Calif., supplies Customer Relationship Management (CRM) and business intelligence systems.

ZLE data store 104 caches information passing in and out of the core 110, maintains and enriches the information, and operates as an intelligent message store and queue to manage information delivery to the appropriate applications. Data in the ZLE data store 104 can be mined and used for business intelligence purposes, either through bulk extracts to data mining tools and data markets, or by direct queries against the data store 104. Data mining and other knowledge discovery applications that retrieve data from the data store 104 can also contribute models back to the ZLE core 110, where the models can be leveraged to direct business processes.

Specialized ZLE applications, such as personalization and fraud management, reside above the ZLE core 110 to directly access data in real-time and leverage real-time integration and other services.

Real time information director 108 supplies data services for various clients of a ZLE data store 104, or other Operational Data Store, including both data providers and data consumers. Real time information director 108 ensures data integrity and data security that can be particularly useful because no single application has exclusive access to data in the ZLE data store 104. Real time information director 108 supports a customizable data model that is not constrained to a particular program code, through usage of polymorphic metadata.

Figure 1B:
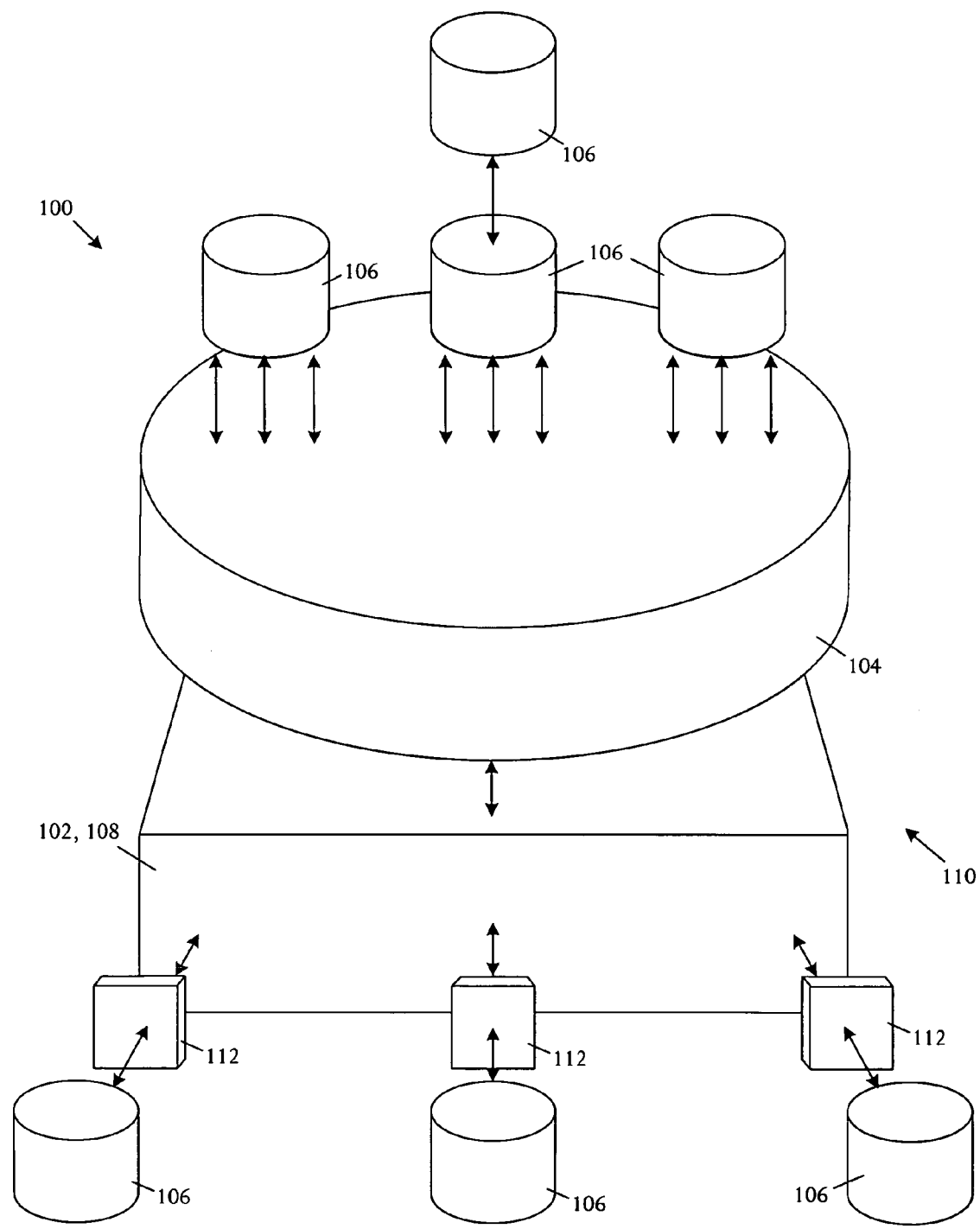

Referring to FIG. 1B, a schematic block diagram illustrates an embodiment of a data services handler 100 that uses the ZLE data store 104 as a physical and logical center of the ZLE core 110. The ZLE data store 104 can be based on an operational data store (ODS) model type that functions as a database front end for new and existing applications attached to the ZLE core 110. A conventional data warehouse is typically a back-end database constructed for after-the-fact analysis functionality. In contrast, the ZLE data store 104 resides logically in front of other applications 106 in the ZLE environment that uses the data store 104 as basis for real-time integration. The ZLE data store 104 accordingly operates as a hot enterprise cache, a state engine, a real-time data warehouse, and a relational message store.

By caching data in the ZLE data store 104, the ZLE framework enables applications and systems to be loosely coupled, improving over conventional closely-integrated systems which are limited in terms of scalability and availability. Specifically, conventional systems typically cannot function without all integrated systems being currently connected, or cannot scale independently. For example, a conventional e-store may be constrained to access a credit system to check a customer rating before completing a transaction. The ZLE framework caches data in a central repository to loosen application bonds without disrupting integration.

As a hot enterprise cache, ZLE data store 104 can update operational data continuously in real-time. Continuous database availability is enabled in some embodiments through usage of a NonStop SQL database in the ZLE core 110. The NonStop SQL database currently supports most international stock exchanges, the majority of Point Of Sale (POS) and Asynchronous Transfer Mode (ATM) networks, and other critical large-scale applications that cannot risk downtime. The NonStop SQL database has characteristics of massive linear scalability, parallelism, and continuous availability.

The ZLE data store 104 can further function as a state engine that represents the business state of an enterprise, a single location at which the state of a company is defined at a particular moment. A typical function of a database is online transaction processing (OLTP), operating as a state engine to track long-running applications. The single, consolidated database formed by the ZLE data store 104 enables development of new ZLE applications that reside above the data store 104 and leverage the current state of the business view. The applications can include new types of applications to manage customer relationships, prevent or reduce fraud, and the like.

Business state information is made available to many different systems enabling the database to function as a focal point of activity for simultaneous updating as transactional systems send updates to the data store 104, accessing by customer service applications, and querying and extraction to other operational and analytic systems.

ZLE data store 104 can also function as a real-time data warehouse for feeding downstream users subsets of real-time data. ZLE data store 104 can function as a real-time data warehouse at least partly on the basis that the NonStop SQL database resolves differing operating constraints of OLTP and business intelligence.

ZLE data store 104 can also function as a relational message store that is useful in a publish/subscribe environment. Messages moving through the ZLE core 110 can be maintained in a relational database that forms a basis for the ZLE data store 104. Individual messages, for example representing a POS transaction, a call detail report, a credit or debit transaction, or the like, can be stored and managed in a single, centralized location, enabling routing to multiple subscriber systems.

A publish/subscribe feature can be implemented in the NonStop SQL database to enable subscriptions to be created in SQL as select statements with output data streamed to the subscribing application. Subscriptions can be installed into tables, enabling waiting for events to occur.

Through the NonStop SQL database, publish/subscribe functionality enables messaging to leverage the database platform parallelism, partitioning, and manageability to ensure efficient flow of subscriber messages.

The various functions, processes, methods, and operations performed or executed by the system can be implemented as programs that are executable on various types of servers, processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The block diagrams and flow charts shown herein depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

Figure 2A:
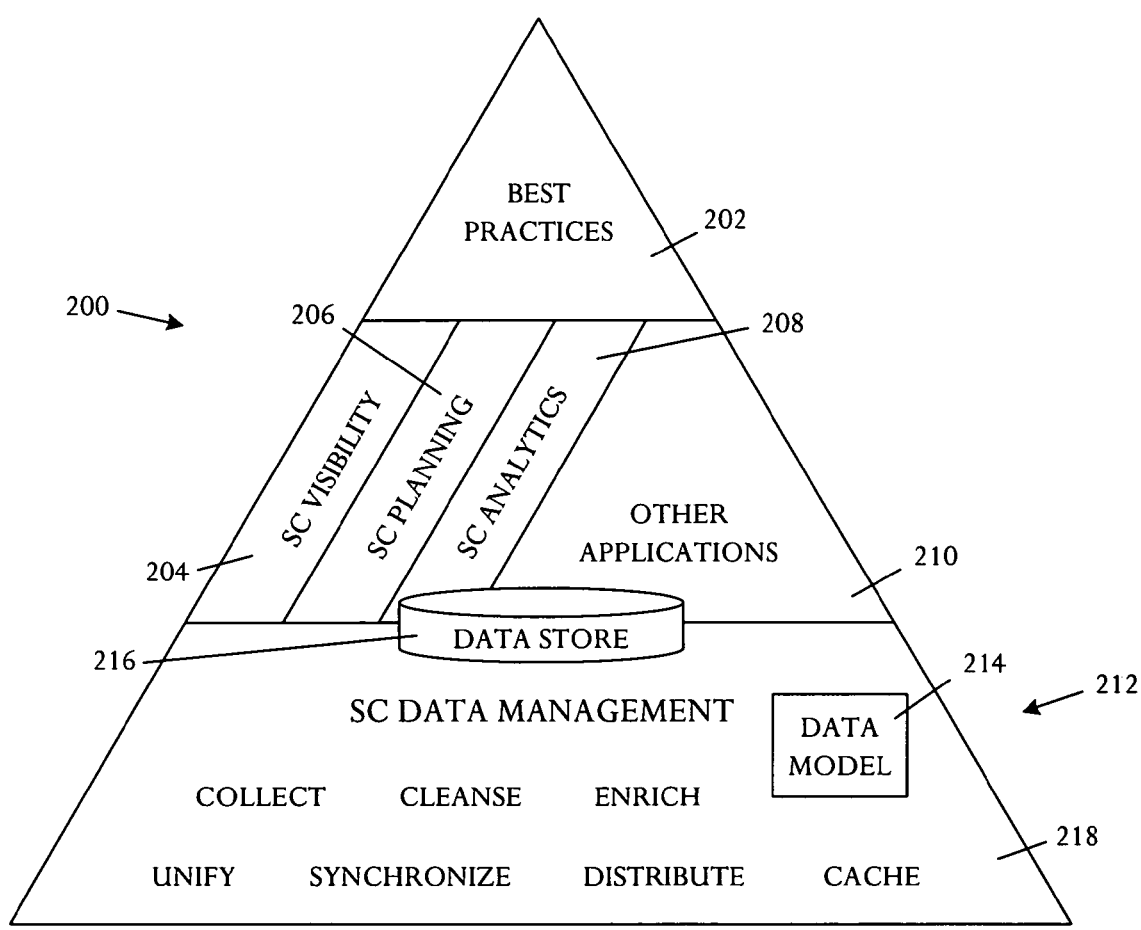
FIGS. 2A and 2B are schematic graphical diagrams illustrating an embodiment of a Real Time Supply Chain (RTSC) for usage in conjunction with the data services handler.

Referring to FIG. 2A, a schematic graphical diagram illustrates an embodiment of a Real Time Supply Chain (RTSC) 200 that can be implemented using the ZLE architecture. RTSC 200 enables definition and implementation of best practices 202 that enable systems designers and users to effectively deal with competitive realities, adapt quickly to changes in operating and business environments, maintain competitive advantage in an environment of technology globalization, reduce infrastructure costs, and create a proactive adaptive enterprise. The RTSC 200 includes components supporting supply chain visibility 204, supply chain planning 206, and supply chain analytics 208, as well as other applications 210. The supply chain components enhance operations and decision-making through real-time applications in applications that focus on using data to solve business problems.

The Real Time Supply Chain (RTSC) is being developed by Hewlett-Packard Company of Palo Alto, Calif., and defines a Foundation Layer 212, which supplies multiple data services in combination with a starting data model 214. The RTSC Foundation Layer 212 captures data from multiple SAP instances into a highly scalable centralized data store on a Hewlett-Packard Company NonStop Server, facilitating efficient movement of SAP documents in and out of a database. An RTSC data store 216 supplies global visibility to a corporation's data assets in disparate SAP instances. The starting data model 214 can be extended to meet particular functionality according to needs and desires of a particular customer. The Foundation Layer 212 supplies a robust starting data model for a manufacturing Supply Chain.

RTSC Foundation Layer 212 supplies a single view of a supply chain, enabling access to a single data source for Supply Chain applications 218, for example including Supply Chain data management that collects, cleanses, enriches, caches, unifies, synchronizes, distributes data, and the like.

Figure 2B:
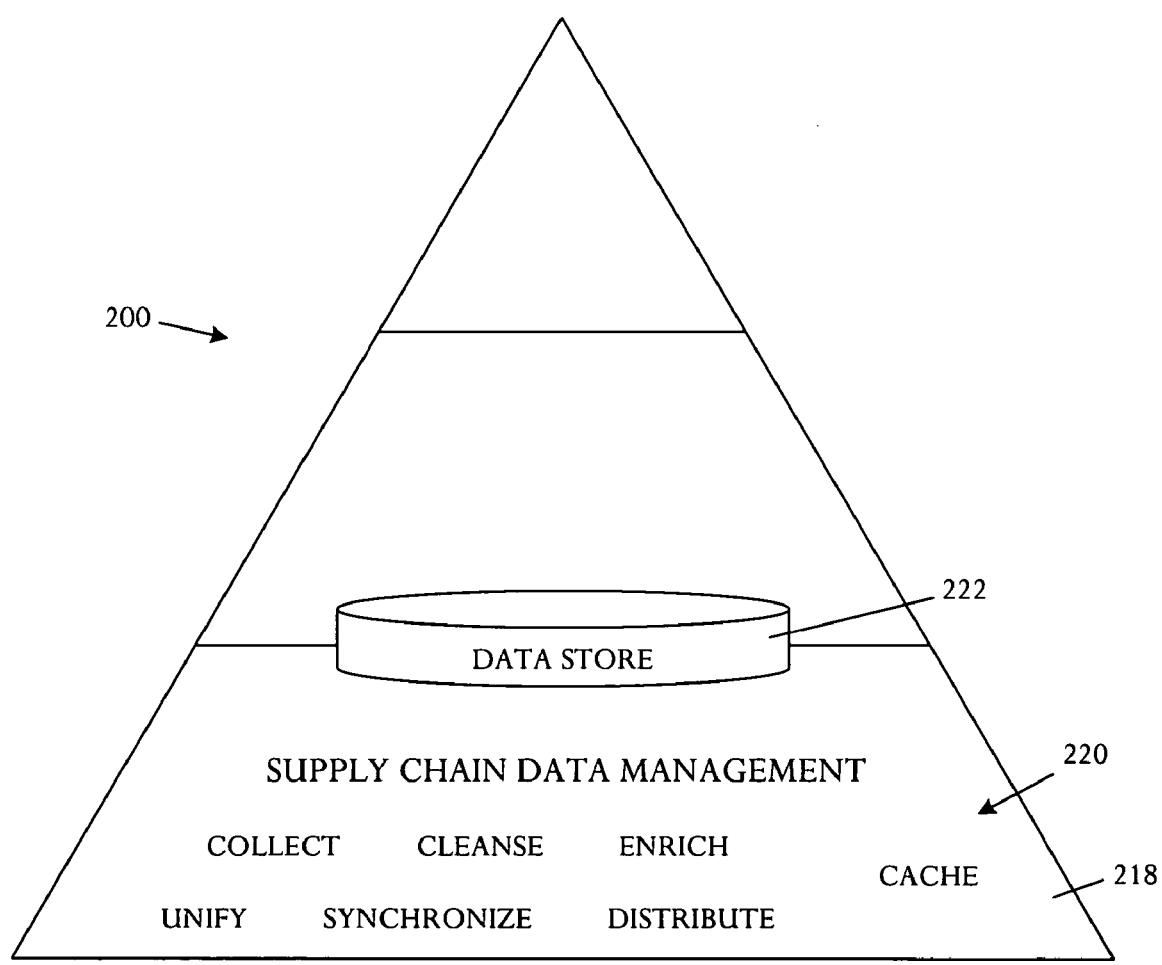

Referring to FIG. 2B, a schematic graphical diagram illustrates an embodiment of a Real Time Supply Chain (RTSC) 200 including Supply Chain Data Management Components 220 that manage data in a data store 222. The data management components 220 supply an infrastructure that maintains data fidelity, enabling customer applications to operate on complete and correct data. In various embodiments, supported customer applications may include SAP XI Adapters, Web Methods Adapters, and Hewlett-Packard Data Models. Similarly, data mapping, database updates, and subscriptions can be supported. The real time information director (RTID) is generally implemented as a data management component. Some systems may implement a customer/part deduplicator.

In a particular embodiment, the RTSC Foundation Layer 212 is an application of Hewlett-Packard's Zero Latency Enterprise (ZLE) architecture to the Supply Chain business domain. The ZLE enables an enterprise to eliminate the latency in the ability to act upon information that is imposed when the desired information is contained within storage structures otherwise constrained to access by a specific application. Custom Foundation Layers can be specially-constructed for industries and business domains other than the Supply Chain. The individual Foundation Layers generally include a starting data model that is subject to customization. The individual Foundation Layers facilitate creation of customer-specific ZLE solutions.

The Foundation Layer 212 enables rapid customization and extension of the data model with no reprogramming, including the addition of more documents and tables. The Foundation Layer 212 also enables interoperation with multiple EAI vendors to attain enhanced or maximum connectivity to multiple SAP instances and other applications while supporting widely-accepted industry standards. In a particular embodiment, the Foundation Layer 212 supports Java language for application development and deployment and extended Markup Language (XML) for data input and output.

Referring to FIGS. 1A and 1B in conjunction with FIGS. 2A and 2B, the ZLE system collects data from various applications into a unified ZLE data store 104. The ZLE data store 104 is an extended form of an operational data store, which contains current and historical data, including state data and event data. The data store 104 can be configured as massively scalable and highly available. A data handling system 100 using a Hewlett-Packard's NonStop Server™ using NonStop SQL/MX™ is well suited to serve as the platform for the ZLE data store 104. Some application categories that can exploit the information in the ZLE data store 104 include business visibility applications, business activity monitors, business intelligence applications, campaign management applications, and customer relationship management applications. Some applications capable of supplying data to the ZLE data store 104 include enterprise resource management systems, payments systems, core business applications, and customer relationship management systems.

The illustrative embodiments enable usage of polymorphic metadata to create a ZLE solution that is customized to a particular enterprise environment. Various aspects of a data handling system 100 that are facilitated by polymorphic metadata include construction of a data model for the ZLE data store 104, creating the feeds from data handling applications, mapping data from the data handling applications to the ZLE data store 104, creating feeds to the consuming applications, identifying data to be supplied to the consuming applications, and defining when the data is to be delivered. Because the combination of applications, as well as application usage, is never exactly the same between different enterprises, tools are made available to enable rapid customization.

Customization of metadata is desirable for several reasons. Data models are often used differently, in the context of different companies and even within subsidiaries of a single enterprise. In a particular example, Systems, Applications, and Products (SAP) elements are used to define a data model. Some business-critical data is stored in customer-defined SAP elements. For a particular data handling system, modifications to predefined mappings are often desirable for each customer. For a single customer, several mappings are most likely highly useful to reconcile different uses of SAP within regions, subsidiaries, or acquired companies.

Customization is also useful due to the enormous number of SAP IDocs. Each customer is likely to promulgate more IDocs to meet objectives of a deployment. Often customers use extensions to the data model since a general data model typically does not capture all aspects of the SAP documents. Furthermore, subscribing applications may use information collected and aggregated from various SAP IDocs.

Figure 3A:
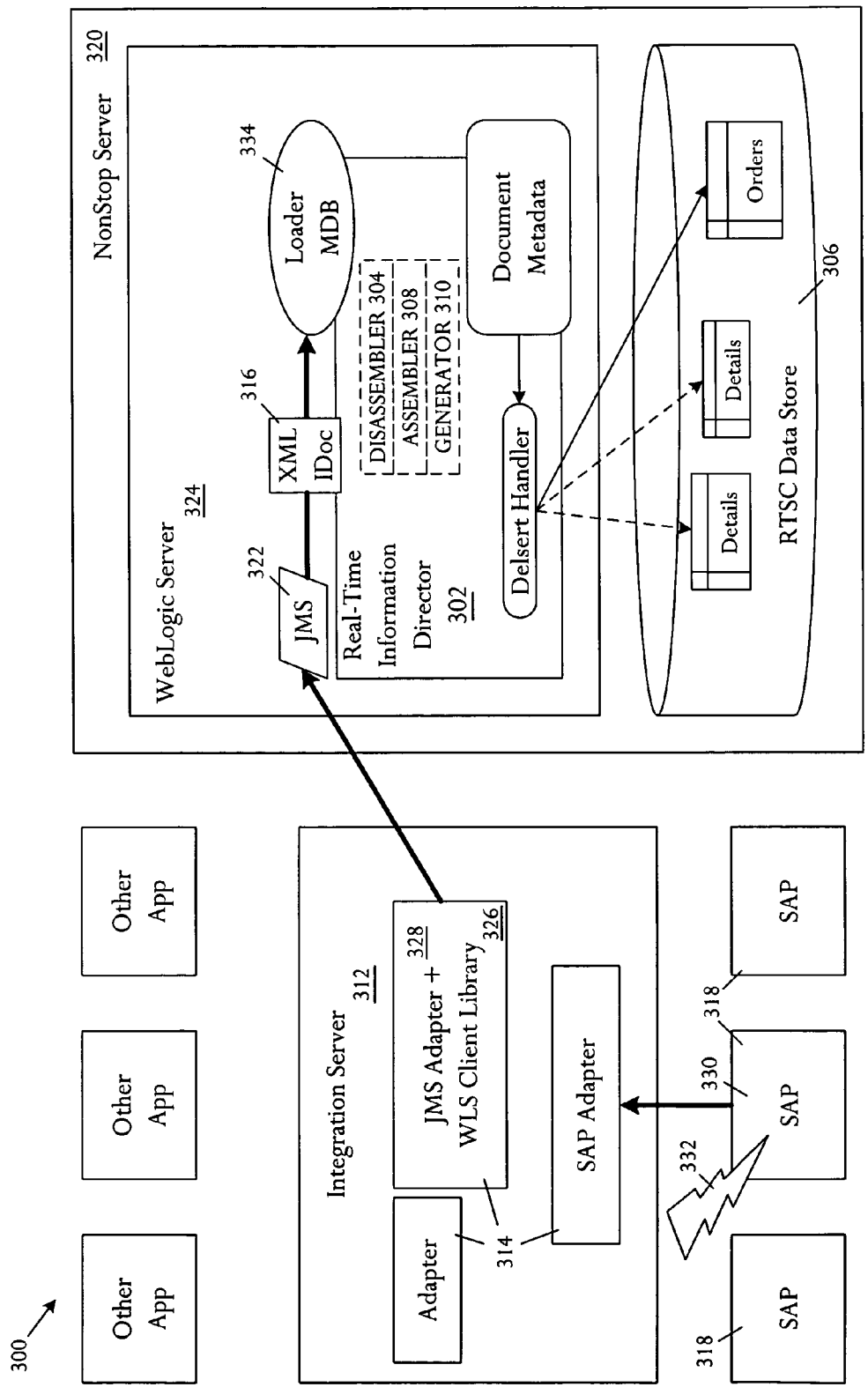
FIGS. 3A and 3B are schematic block diagrams illustrating embodiments of a data services handler that comprises a real time information director (RTID) capable of mapping documents into a data model.
Figure 3B:
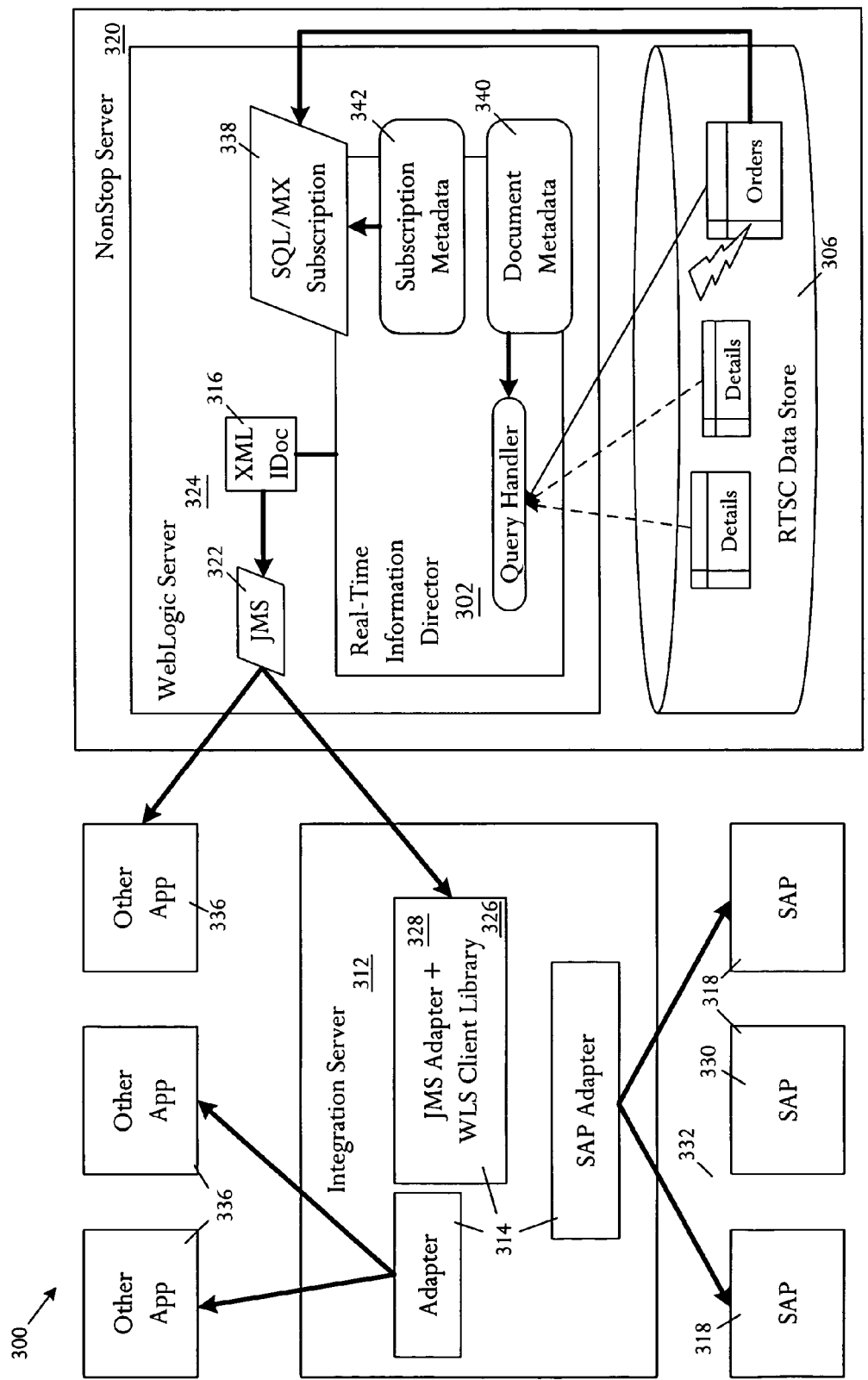

Referring to FIGS. 3A and 3B, schematic block diagrams illustrate an embodiment of a data services handler 300 that comprises a real time information director (RTID) 302 that maps documents into a data model. The data services handler 300 further comprises a disassembly logic 304 that disassembles documents for loading into a database 306, assembly logic 308 that assembles documents from records in the database 306, and a generator logic 310 that generates an eXtended Markup Language (XML) Schema that describes format of the documents. The disassembly 304, assembly 308, and generator logic 310 can operate using a single descriptive polymorphic metadata.

In the illustrative embodiment, the data services handler 300 includes an Integration Server 312 such as SAP Netweaver XI, WebMethods, TIBCO or SeeBeyond and generally runs on an operating system such as HP-UX from Hewlett-Packard, Windows Server, or Linux. In various embodiments, the real time information director 302 runs under NonStop WebLogic Server (WLS) on the NonStop Server.

The Integration Server 312 supplies adapters 314 to obtain Interchange Documents (IDocs) 316 from SAP 318. The adapter 314 converts the IDoc 316 into XML format if the SAP instance is unable to generate the IDoc in XML.

Documents are delivered to the NonStop Server 320 via JMS 322, using a WLS JMS provider 324 in combination with a WLS client library 326 on the Integration Server 312. The individual Integration Servers 312 supply a JMS adapter 328. JMS is a widely adopted standard.

Individual SAP instances 330 are configured to generate SAP IDocs 316 upon the occurrence of defined significant events 332. In the illustrative example, an order is entered or updated 332 in one of the SAP instances 330.

The Integration Server 312 routes the document from SAP 318 to the NonStop Server 320.

The real time information director (RTID) 302 supplies a Message-Driven Bean (MDB) 334 to acquire inbound IDocs from JMS. Written in the Java Programming Language, a bean such as an enterprise bean is a server-side component that encapsulates business logic of an application. The business logic is code that performs the application. A message-driven bean is an enterprise bean enabling J2EE applications to process messages asynchronously. The real time information director 302 disassembles the IDocs 316 into various records and inserts them into the RTSC data store 306 using prepared SQL statements. Document metadata defines how the elements of the XML IDoc maps to rows and columns of the data store. A different document metadata is generally used for each type of IDocs 316. In the illustrative example, the Disassembler 304 uses the metadata for an ORDERS05 IDoc 316.

The real time information director 302 receives documents from Systems, Applications, and Products (SAP) called Interchange Documents (IDocs). The real time information director 302 can publish the IDocs via subscriptions that are expressed in extended Markup Language (XML). The real time information director maps the IDocs to and from a data model, for example Hewlett-Packard's Real-Time Supply Chain (RTSC) data model. The real time information director 302 uses metadata to do the mapping. Flexible functionality is attained for the real time information director 302 via usage of easily customizable metadata.

Referring to FIG. 3B, many applications receive documents from the RTSC data store 306 using a publish-subscribe paradigm. The subscription is configured in the real time information director 302. The subscription definition includes a triggering event, the document to be generated, and the name of a JMS queue or topic to which the document should be delivered. Applications directly receive the published document by reading the JMS queue or topic.

The Integration Server 312 can read the JMS queue or topic and route the document to various applications, including other SAP instances 330.

The subscription can be implemented using a "select from stream" feature of NonStop SQL/MX 338 that receives data in a stream. The event is defined in an SQL statement, so the user has all the power of the SQL language to define events narrowly or broadly. The number of subscriptions that can be configured by Subscription Metadata 342 has no fixed limit. A single document inserted or updated in the database can generate many subscriptions, or one or none.

Content and format of the document generated is defined using Document Metadata 340 and may be very different from the incoming document that triggered the subscription. However, the same document metadata may be used for both inbound and outbound documents. Separate maps need not be created for inbound and outbound documents that have the same content and format.

The real time information director (RTID) 302 assembles the document in accordance with the Document Metadata 340, gathering records from various tables related to the triggering event. The document is output in XML and placed on the JMS queue or topic. The output document may be an IDoc, or it may be a "native" document. The native format enables the real time information director 302 to publish documents that contain more information than is allowed within any specific IDoc. Native format documents are also easier to define, as only document content metadata is used and format metadata superfluous. The real time information director 302 exports XML schema for native documents from the document content metadata, so that other applications can process native documents.

The real time information director 302 is a set of data services that forms a core of the Foundation Layer. The real time information director 302 serves as the gateway between the ZLE data store 306 and both supplying and consuming applications 336. The real time information director 302 maps the incoming data to the data model and delivers requested data to consuming applications, either on demand or by subscription. In this process, the real time information director 302 cleanses and enriches data, provides data security, and insures data integrity.

The Foundation Layer includes a starting Supply Chain data model that further has mappings for SAP IDocs 316 that are core to any supply chain (Orders, Invoices, Shipments, Inventory, Suppliers, Bills of Materials, and the like). The Foundation Layer also includes real time information director 302 software that is used to efficiently move SAP IDocs 316 in and out of the database. The Foundation Layer also implements instructions for extending and customizing the data model to additional IDocs 316 and variations of the documents, as well as instructions for configuring the RTSC environment, including connections to an EAI tool to access SAP instances 330 (SAP Netweaver and WebMethods Integration Platform).

Typically the integrity and security of data is the responsibility of a single unified application that owns the data in a model works well with enterprise applications. However, few large enterprises are built around a single enterprise application. Many large corporations have hundreds of enterprise applications. The ZLE system enables and facilitates data sharing for enterprises that run a large number of applications. In the ZLE system, the real time information director 302 operates as the application that guarantees the integrity and security of the ZLE data store 306. Operations of the real time information director 302 are directed by polymorphic metadata, metadata that enables the rapid customization of the ZLE data model and integration of multiple various enterprise applications with the ZLE data store 306. Polymorphic metadata defines the security model and data integrity rules, and defines the mapping between external document formats and the data model.

Functionality of the real time information director 302 can support specific criteria of particular industries and application frameworks, a flexibility that is assisted by a capability to create additional and novel classes of metadata.

In a particular embodiment, the real time information director 302 can be implemented using the Java™ Language, for example supported under BEA WebLogic Server for HP NonStop Servers (WLS). In other embodiments, the real time information director can be implemented in other languages and/or used in conjunction with other application servers. The illustrative real time information director 302 can be compliant with J2EE standards. The real time information director 302 can use the application server for connectivity and interoperability with other products and platforms, especially through JMS (Java Messaging System) via the WLS JMS provider, and HTTP via Servlets. The real time information director 302 can be managed through the same interfaces as other WLS components and can implements a JMX Bean to supply metrics and enable online deployment of new metadata. The real time information director 302 may use a standard WLS logging facility to report events and exceptions. Any management platform that can manage WLS, such on Hewlett-Packard's OpenView, can manage the real time information director 302. The WLS environment can be further leveraged to publish real time information director 302 interfaces as Web Services.

Real time information director components can also be used outside of an application server, using file inputs and outputs, as part of a batch application running directly in a Java Virtual Machine. Accordingly, the illustrative real time information director can be implemented for usage with other application servers or with no application server at all.

The Foundation Layer can be used to build a centralized RTSC Data Store that collects information from across the enterprise, an application that is facilitated by a highly scalable, available and reliable platform, as is provided by HP NonStop Server. For the most part, the platform is transparent to the real time information director 302. However, the real time information director 302 can use of features specific to NonStop SQL/MX, which is only available on the NonStop Server. For example, the Subscriptions Service of the real time information director 302 uses features unique to SQL/MX.

Data is travels to and from the real time information director (RTID) 302 in the form of XML documents. The RTSC Foundation Layer is designed to handle SAP IDocs (Interchange Documents) expressed in XML, and is compliant with the XML schemas published by SAP. Other Foundation Layers, for example for usage in other business problem domains, may support other widely adopted XML document types. Logic in the real time information director 302 to support SAP IDocs can be extended to other applications of XML. The real time information director 302 also receives and publishes XML documents in native format, which closely reflects the structure of the data in the RTSC or ZLE data store 306. The real time information director 302 exports XML schema for native format documents, which other applications can use to more easily interoperate with the Foundation Layer. Two basic services offered by the real time information director 302 include disassembly of inbound XML documents into multiple records in preparation for insertion into various tables, and assembly of outbound XML documents from multiple records selected from various tables. The services can be driven entirely by polymorphic metadata.

In an illustrative embodiment, the real time information director 302 can contains no procedural code that is hard-wired to a specific data model. Instead the program logic of the real time information director 302 can consume descriptive metadata to identify individual specific data elements, and the behaviors, for example program logic, applicable to the individual elements.

Software code that is adapted to a customized data model, without using direct modification, is often called "table-driven code". Information about the data is itself stored in one or more 2-dimensional matrices or tables. Each row of a metadata table defines a data element, or related group of data elements, and each column defines a specific attribute of those elements. Usage of tables and matrices enables definition of any particular data element without writing specific behaviors or program logic. Instead the desired behaviors can be inferred from one or more attributes of each element. Program logic can simply read the table to determine which behaviors are applicable to each data element. However, the table-driven approach does not handle new behaviors or special cases well. Each special case or new behavior that is not uniformly applied requires the introduction of new columns to the metadata, resulting in metadata tables that are sparsely populated and difficult to maintain. Common patterns are not easily managed. Breaking down the metadata table into various sub-tables can ameliorate these problems, at the cost of additional complexity.

In the illustrative embodiment, the real time information director 302 does not rely principally on 2-dimensional tables to represent metadata. Instead the real time information director 302 represents metadata as polymorphic objects. Polymorphism enables different metadata objects to have different numbers and types of attributes, determined by class. Behaviors can be defined that are specific to certain classes of objects, and the attributes specific to those behaviors need only be specified in those classes of objects, an approach that facilitates introduction of new behaviors and special cases, without modifying the metadata for non-applicable or irrelevant objects and classes.

The metadata objects for the real time information director 302 can be constructed in the Java programming language. Individual classes of metadata can be embodied in a distinct Java class. Special cases of metadata are frequently represented as subclasses of more general metadata classes. Complex metadata can be represented as composite objects constructed from several metadata classes.

In an illustrative system, metadata objects are stateless. The metadata objects are not modified after initial construction, a characteristic attained, for example, in the Java language by declaring all attributes of metadata classes as final. Such attributes are set only during the construction of the metadata object. The attributes are specified as parameters of the metadata object, or are constructed entirely from such parameters and other information available during the construction of the metadata object.

Metadata classes do implement behaviors for the data described in the metadata class. The power of polymorphism resides in the ability to override methods of the metadata super classes. The methods can utilize the unique attributes specified in the constructor of the metadata subclass. However, since the metadata class is stateless, each method of the metadata class is passed at least one stateful object containing the data on which the method operates.

As a general rule in object-oriented design, one strives to embed stateful data in classes containing the methods that operate on the stateful data. In contrast, in the real time information director 302, methods of stateful classes generally delegate operation to stateless metadata objects.

Metadata objects are far less numerous, are subject to much less frequent modification, and are much more frequently used, than individual data objects. Significant performance advantages can be attained by caching metadata objects for reuse. Performance can also be improved by sharing metadata objects between threads. Optimizations can be attained when the metadata objects are stateless. When metadata is modified, obsolete metadata can be discarded and new metadata instantiated.

Overridden methods of a metadata class represent a behavior that is unique in some regard, and that generally applies only to certain data elements. The potential always exists that other data elements, identified in the future, may use a similar behavior.

Consequently, the identification of specific data elements is generally not hard-coded within the implementation of the class. Instead the identification of a specific data element can be specified in a parameter of the constructor of the class, or be identified indirectly.

Specific data elements to which metadata apply are specified in parameters of the constructors for various metadata classes. The constructors can be nested to represent hierarchical relationships between described data elements. Identifying information about the hierarchical context for a metadata element can be derived from the containing metadata object.

In the real time information director (RTID) 302, contained metadata object is usually constructed before the containing metadata object, and reference to the contained object is passed to the containing object. The immediate result of the nested constructors is a tree with all references pointing from the root, through intervening branches, to the individual leaves. In some cases, a more complex interconnection of the metadata may be used, for more convenient and efficient utilization. For example, certain branches might use a reference back to the root, to the parent branch, or to a branch in a parallel tree. In such cases, metadata classes implement methods to traverse the tree. Such methods are passed references to the objects to be referenced within the tree, and which may be traversed in parallel. The methods are typically called only after the construction is complete, and consequently the references being updated thereby cannot be declared as final. To insure class statelessness, traversal methods can generate an exception if reinvoked with different references.

Nested constructors can easily and conveniently be invoked directly in a Java source file. Java source code is a concise and flexible expression of customized metadata for the real time information director 302. For example, customized metadata for each SAP IDoc resides in a distinct Java class. The source file of the Java class has one line for each tag in the XML document that is pertinent. Each line contains a new statement to instantiate a metadata class corresponding to the tag. A different metadata subclass exists for each style of mapping. The name of the tag is one parameter of the constructor. Usually another parameter is the name of a table or field in the database. If the data element represented by that XML tag contains nested elements, then another parameter of the constructor is an array of definitions for the tag. The array is constructed with a new statement, and populated immediately by new constructors for the various contained data elements. An example is as follows:

```
new Segment("E1EDK01", new FieldElement[ ] {
    new FieldElement("ACTION", "SALES_ORDER_ACTION_CD"),
    new FieldElement("CURCY", "CURRENCY_CD"),
    new FieldElement("WKURS",
    "PRICING_STATISTICS_EXCHANGE_RT"),
    new FieldElement("ZTERM", "PAYMENT_TERMS_CD")
    }),
```

Metadata constructors need not be directly nested. A metadata object can be separately named and constructed, and then referenced within a subsequent constructor. For example, a metadata object can be referenced in several other metadata objects. In a particular example, the metadata object that defines an IDoc header can be constructed once and referenced in the metadata classes for many different IDocs.

Metadata can be formed in a form other than Java source code. A graphical tool can be built to edit the metadata. One risk in usage of a graphical tool is that the flexibility enabled within Java may be lost. A metadata representation should be defined such that polymorphism of the metadata is not unduly restricted, a risk that is more likely when using a graphical tool.

Java classes that purely define metadata contain constructor invocations alone. The only statements present are "new" statements. The parameters of the new statements are either identifying or descriptive attributes of data elements. References to contained data elements and references to other metadata objects that identify peculiar behaviors applicable to the contained data elements.

Formatters are an example of the other metadata objects. Formatter is an abstract class that can be passed as a parameter to elements of the XML mapping metadata for individual fields. The Formatter defines transformations between the elements as represented in the SAP IDoc and as represented in the database. Each concrete Formatter class defines a particular kind of modification to the format of a data element. Some, but not all, formatters take parameters in the constructor, such as a length for a padding formatter. The same Formatter can be used for many different fields and thus is often constructed separately.

Customized metadata is descriptive. The parameters of the constructors identify what is to be done, not how the operations are performed. How is defined by methods of the metadata classes.

The same customized metadata can be used for multiple purposes. The XML document mapping metadata is currently used in three different ways. First, the metadata is used to disassemble the elements of the inbound XML document into rows and columns to be inserted into various tables in the database. Second, document-mapping metadata is used to select rows and columns from various tables of the database and assemble the elements into an outbound XML document. Third, the metadata is used to generate an XML schema for the documents that can be input or output using this metadata. Even the Formatter classes have the ability to transform in both directions and generate XML schema.

Different uses of the metadata can be embodied in different methods of the metadata classes. Each of the different methods can be overridden by subclasses of the metadata. Individual data elements described by these metadata classes may be defined a single time and still realize all different uses.

Polymorphic metadata has functional characteristics that improve over other techniques. For example, most data transformation tools generate maps or style sheets that transform in one direction only. Reverse transformation uses a separate map or style sheet, a deficiency that arises since the mappings are, at least in part, procedural rather than descriptive. In a specific instance, the other data transformation tools allow expressions and calls to various transformation functions. XSLT (extensible Stylesheet Language Transformations) Style Sheets are often used to transform XML documents. XSLT is a very high level scripting language, implemented in XML, which enables implementation of a tree-oriented transformation language for transmuting instances of XML. Comparable style sheets can be constructed that disassemble SAP IDocs into rows and columns in the database. XSLT is a procedural language and thus can be used to implement all mappings directly. However, resulting style sheets for the IDoc are highly verbose, measured in terms of either characters or lines, in comparison to the corresponding Java metadata class for the IDoc. The resulting style sheets transform in only one direction so that a separate style sheet is implemented for the reverse transformation. Also the XSLT style sheet is an order of magnitude slower to execute than the real time information director mapping.

When a new pattern of mapping or reformatting is to be implemented, a new Metadata class and relevant methods are constructed in Java to represent the new pattern. Definition of the pattern and methods often expends a higher initial investment than expressing the new mapping using the high level language of XSLT or the expressions and functions built into a data transformation tool. However, the initial investment is recouped as other elements can be mapped using the same new metadata classes concisely and in both directions.

Many different systems allow extension through mechanisms such as user-exits or call-backs. Such extensions are usually cumbersome to implement and integrate into the system. Identification of potentially useful user-exit points in the system, providing full access to the data in the parameters of user-exits, and leveraging of other mechanisms of the system within user-exits can be difficult. Polymorphic metadata enables a much more powerful and flexible approach to extending the capabilities of the real time information director 302. Any non-protected, non-final method of a metadata class can be overridden in a user-written metadata subclass, a mechanism that enables a narrowly targeted callback and enables full access to non-protected attributes and methods of the super class.

In the illustrative embodiment, document metadata is the primary metadata on which the real time information director 302 resides. Document metadata defines the content and format of documents received and published by the real time information director 302. The real time information director 302 is customized and extended either by modification of the metadata for an existing document type, or by the creation of a new document type. A top XML tag identifies the type of a document. Document metadata is defined once for a document type, whether the document is designed for inbound use, outbound use, or both inbound and outbound use.

Document metadata is subdivided into two parts. The first part defines the content of the XML document. The second part defines the format of the XML document. For SAP IDocs or for any other externally standardized document type, both parts of the document metadata are explicitly defined. For Native Format documents, the format is automatically determined from the schema of the tables identified in the content metadata; therefore no format metadata need be specified.

Common document content metadata identifies tables that supply data to or receive data from the document, and association criteria for grouping related records within the hierarchy of the XML document.

The real time information director 302 automatically generates and caches prepared SQL statements from the content metadata after reading the schema of the tables identified in the metadata to obtain detailed information about names and data-types of individual columns. Parameterized select, insert, delete, and update statements are generated according to application to enable the real time information director 302 to manage inbound and outbound documents.

Additional document content metadata may be supplied for outbound documents. Summary metadata identifies how detailed records can be aggregated for documents containing summary data. Summary metadata causes SQL statements to be generated using the GROUP BY clause.

In most cases, document content metadata does not have to give information on individual fields, since the information can be obtained from the database schema. Document format metadata, in contrast, contains at least one line of metadata for each column populated by the document. Consequently, the quantity of metadata used for a native format document is a small fraction of that used for an externally defined format, such as an IDoc.

One benefit of separating content metadata from format metadata is a capability to avoid specifying format metadata for native documents. Another benefit is metadata simplification. For example, selected columns of several tables can be populated by the same element of the inbound document. Specifically, the order number can appear in every record associated with an order IDoc. The mapping of the appropriate tag (<BELNR>) to the appropriate column-name (SALES_ORDER_NO) appears only once in the metadata. From the content metadata and the schema of the database can be determined all rows that have a column by the name. In contrast, in the procedural XLST style sheet, the mapping is repeated for each record, enabling metadata to be less redundant and thus less verbose.

A further consequence of the separation of the format and content metadata is a capability to modify the database schema without modifying the metadata. For example, fields may be inherited from parent or grandparent elements of the document to speed retrieval of information for later usage. Such an operation is termed denormalization in database applications and is used to eliminate the operation of joining detailed records in database with the parent records. A decision to denormalize data can be done with no change to the document metadata. Also columns can be dropped from a table without change to the document metadata. A document element can be mapped to a column-name that does not currently exist in any table.

The real time information director 302 enables multiple document types to be defined that share the same content metadata, but which have different format metadata, a condition that frequently occurs when integrating multiple SAP instances with the ZLE system. Each SAP instance supplies the same basic sets of documents including orders, invoices, shipments, and the like, but mappings for each set has variations, especially for customized elements. A separate document definition for orders, as an example, can be created for each source, containing only format metadata and referencing common content metadata. Usage of the document sets eliminates redundancy and also enables usage of the same set of cached SQL statements to load orders into the database, regardless of which source system sent the data.

The top-level tag of the inbound XML document is typically used to identify which document definition is used. Often, the appropriate document definition to use is unknown until the IDOC header is parsed to identify the source system. The real time information director 302 enables switching of the document metadata class after parsing the header.

Inbound documents can be delivered to the real time information director 302 synchronously, using HTTP, or asynchronously, using JMS. A servlet can be supplied that invokes the real time information director 302 via an Enterprise Java Bean (EJB) whenever documents are delivered via HTTP. The real time information director 302 is invoked via a Message Driven Bean (MDB) whenever documents are delivered via JMS. In either case, the Bean is stateless, and serves only as a thin layer to access the services of the real time information director 302.

Outbound documents can be requested from the real time information director 302 synchronously, using HTTP. A servlet can be supplied that invokes the real time information director 302 via an EJB whenever a document is requested via HTTP. Outbound documents can also be delivered asynchronously, using a JMS subscription.

Figure 4:
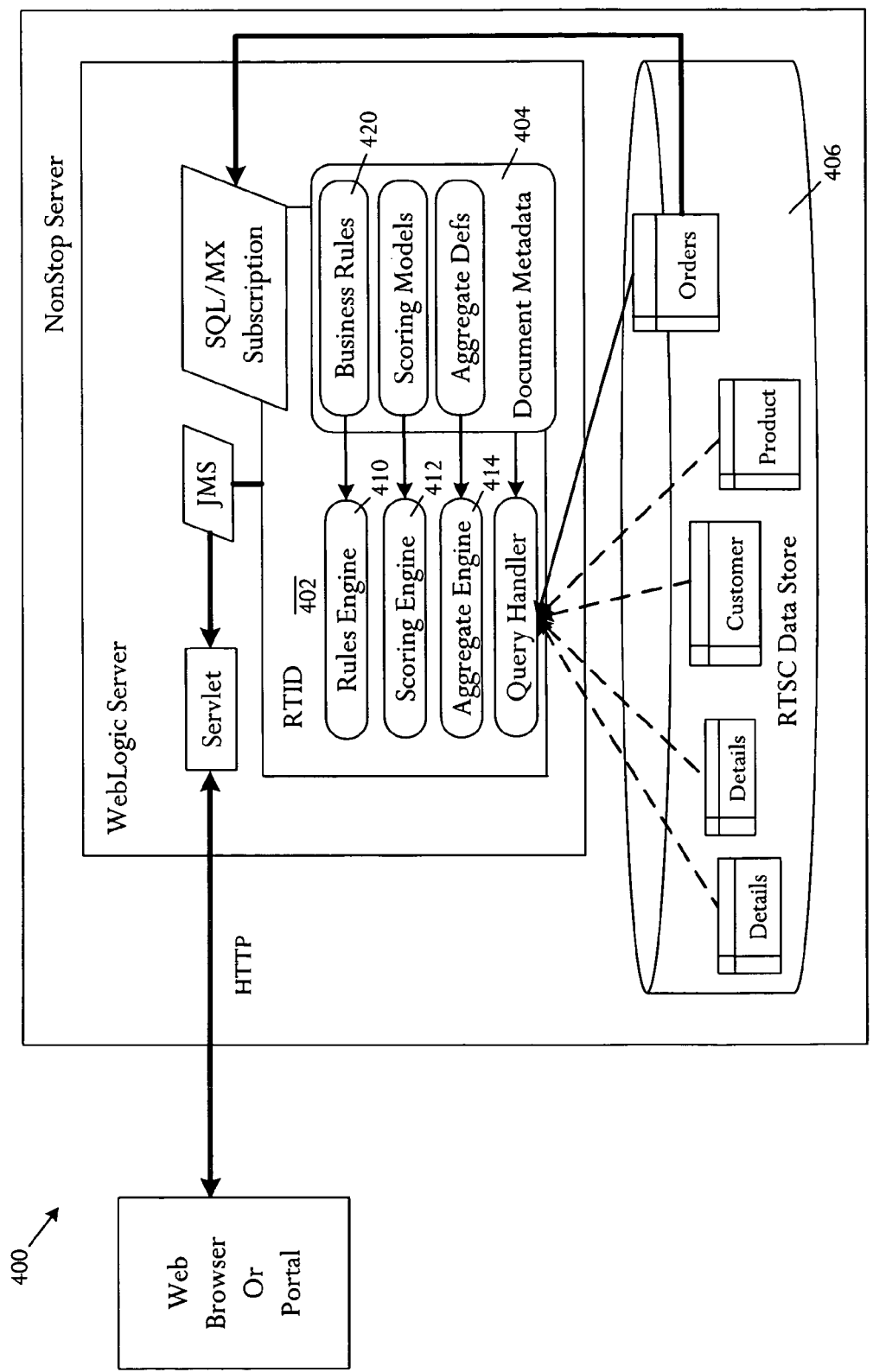
FIG. 4 is a schematic block diagram showing an embodiment of a data handling system in a configuration suitable for handling subscriptions to documents.

Referring to FIG. 4, a schematic block diagram illustrates an embodiment of a data handling system 400 in a configuration suitable for handling subscriptions to documents. The real time information director 402 enables other applications to subscribe to documents. Subscriptions are triggered by insertions or updates of data in the RTSC data store 406. Subscriptions can be extremely flexible, for example a subscription can be defined that is triggered by any change to a table, by changes to specified rows of the table, or by specified types of changes. For example, one subscription may be triggered by orders from a specific customer, while another subscription is triggered whenever an order is canceled. No limit is typically imposed on the number of subscriptions that can be created, or the number that can be triggered by a single event.

The definition of a subscription includes specification of three parts: (1) a triggering event, (2) a type of document that is generated, and (3) a JMS queue or topic to which the document is delivered. The triggering event can be specified as an SQL select statement. The type of document is a reference to document metadata 404, enabling definition of both the content and the format of the document. The subscription capability, in combination with document metadata, enables the real time information director 402 to supply any data to an application as rapidly as possible.

The real time information director (RTID) 402 may include a rules engine 410, a scoring engine 412, and an aggregation engine 414 to enable rules and scoring to be used in the context of a subscription, for exception handling. For example a subscription may be triggered by any order with a large quantity. Real-time scoring may detect the likelihood that the order is entered incorrectly or by someone who is defrauding or gaming the system. Business rules 420 can place orders on a queue to enable checking and correction by service agent.

The real time information director (RTID) 402 further includes the aggregation engine 414 to compute aggregates in memory from data selected from the database 406. The aggregation engine 414 is primarily supplied for client applications and services that extensively use aggregated data, such as real-time scoring and business rules. Such applications use a variety of aggregates, based on different conditions, which generally cannot be computed in a single SQL statement.

Some aggregated data is accessed frequently. For example, an aggregate may be continuously updated on a business activity monitor. Or an aggregate can be frequently utilized in rules or mining models. If the cost of the creating the aggregate from raw data is also high, efficiency may be served by maintaining a persistent aggregate. A persistent aggregate may be implemented by creating a state table in the data store 406 to hold aggregates relevant to a particular item. For example, a state table may contain supply and demand totals by product, region and/or date. The table is continuously updated as the orders and supply documents flow through the system.

Document metadata 404 can be maintained to include accumulator definitions. An accumulator defines the relationship between an element of an inbound document and an element in a state table. An accumulator can represent a total, a count, a maximum or a minimum. The accumulator updates the value of the element in the state table, based upon the value of the element in the document, after taking into account the prior value of that element if the document replaces an existing document.

Outbound documents can directly reference the rows of the state tables to deliver the aggregates directly. Also, aggregate definitions can reference the state tables to speed computation of complex aggregates.

A SQL Select statement has a single WHERE clause that applies to all aggregates computed by that statement. In contrast, each aggregate used by business rules or scoring models may have different conditions, calling for separate computation. SQL aggregation can have a complementary role to the aggregation engine 414. Document metadata 404 can direct SQL to total data into buckets grouped by all the dimensions of the data relevant to the conditions of the aggregates, a practice that reduces the number of rows to be aggregated in memory by the aggregation engine 414. Aggregates are defined separately from document metadata 404, using context-sensitive graphical wizards. The wizards read the document content metadata and database schema to expose the records and columns that are available to be aggregated. The wizards present the appropriate aggregate functions applicable to the data types of the elements. A separate set of aggregates can be defined for each document type. Because business rules and scoring models frequently change, intelligent wizards can be used to quickly modify and redeploy aggregate definitions.

The aggregation engine 414 supports both simple aggregates, such as sum, min, max, mean, first, last, count and count-distinct, and compound aggregates such as ratios. Ratios are frequently used in data mining. Examples are weekend calls to weekday calls, evening calls to daytime calls, and long-distance calls to local calls. Aggregates can also utilize complex conditions.

The aggregation engine 414 supports the creation of custom aggregate functions, both simple and compound, user-written conversion methods, and user-written methods to compute derived attributes. User-written functions and methods are exposed to the aggregate wizards through Java reflection.

In some cases, a customer may not wish to license a third party product such as Blaze or Trillium to perform certain data enrichment or data cleansing tasks. The customer may wish to implement such enrichments or cleansings in Java code. The functions are encapsulated in a Java class that subclasses the real time information director's Enrichment class. The user may specify such user written Enrichment classes in the document content metadata.

Many of the services, such as data cleansing, aggregation, real-time scoring, business rules, and the like are invoked from the document content metadata as special enrichment classes that are provided ready-to-use with the real time information director.

The rules engine 410 supports specification of business rules without writing Java code. In some embodiments, the rules engine can be implemented using Blaze Advisor, from Fair-Isaac. The scoring engine 412 enables real-time scoring based on data-mining models. In an illustrative embodiment, the mining models are built using SAS Enterprise Miner, and deployed using Genus Mining Integrator. The aggregation engine 414 computes derived values and aggregates. The aggregates are used in combination with the scoring engine 412 to add value to the business rules. The services are invoked via document metadata 404 and supply additional metadata.

Real-time scoring is a useful capability of Hewlett-Packard's Zero Latency Enterprise architecture and is discussed in greater detail in U.S. patent application Ser. No. 10/423, 678, and corresponding provisional application No. 60/383, 367, entitled Zero Latency Enterprise Analytic Learning Cycle which is incorporated by reference in its entirety. The real-time scoring capability has previously been enabled under a NonStop CORBA framework and is now available as part of the real time information director 402. Scoring is the penultimate step in the application of data mining. The steps include, first identifying a behavior to be predicted to enable more intelligent and proactive actions. For example, fraudulent behavior may be prevented if predictable. Similarly, prediction of a customer's likelihood of buying various products can result in presentation of better offers. A second step in real-time scoring is collection of past data that reflects known outcomes, both positive and negative. A third step is profiling of data to identify attributes that are possible predictors of an outcome. Each predictor attribute is aggregated from detailed raw data. The number of different stores visited by a customer during the past month is an example of an aggregate.

A fourth step is transforming, aggregating, and downloading data into a data-mining tool, such as SAS Enterprise Miner. Fifth, a predictor model can be built using tools in the data-mining products. Step three can be repeated to generate different aggregates, based on insights gained from the tools. A sixth step includes usage of the mining model to score all the entities, for example customers, for which the outcome is not known. The score is a probability, typically a value between 0 and 1, of the behavior being modeled. A seventh step is usage of the score in the next opportune business decision.

One benefit of the ZLE application of Data Mining is that the time gap between the two final steps is eliminated. Usually scoring is performed as a batch process. Significant time may elapse between the time that the batch process is completed and the time that a customer walks into the store again. As a result, significant activity may have occurred since the score was generated that makes the score obsolete. The scoring engine 412 in the real time information director 402 utilizes aggregates generated from current data and delivers the score to business rules for immediate action. The process is cyclical. As knowledge gained from data mining is used, new insights are available that lead to improved models. Also, mining is performed based on outcomes of decisions are made from application of earlier models. The process involves frequent updating of aggregate definitions. The agility enabled by the aggregation engine 414 and Aggregate Wizards is therefore highly useful.

The Foundation Layer interoperates with Genus Mining Integrator for NonStop SQL. The Genus Data Preparation Tool performs the profiling step and data transformation steps on the NonStop Server. The Genus Data Transfer Tool transfers the data from the NonStop Server to Enterprise Miner. After the prediction models are developed in Enterprise Miner, the Genus Model Deployment Tool deploys the completed models back to the NonStop Server where the Aggregate Wizards and Scoring Engine can access the models.

A subscribing application can manage exceptions. For example, a subscribing application may subscribe to specified high-value events, for example placing or a large order, a disruption in supply, and the like.

A subscribed document may be a document other than an IDoc. The document can contain all information related to that high-value event. Any miscellaneous information for usage by the subscribing application for addressing the event may also be contained in a document, for example inventory, projected supply and orders of a particular product.

A subscribing application can read XML documents from a JMS queue, provided that an XML schema is available.

The real time information director 402 can be used to implement various additional data services. Document metadata can be used to drive invocation of the services.

Figure 5A:
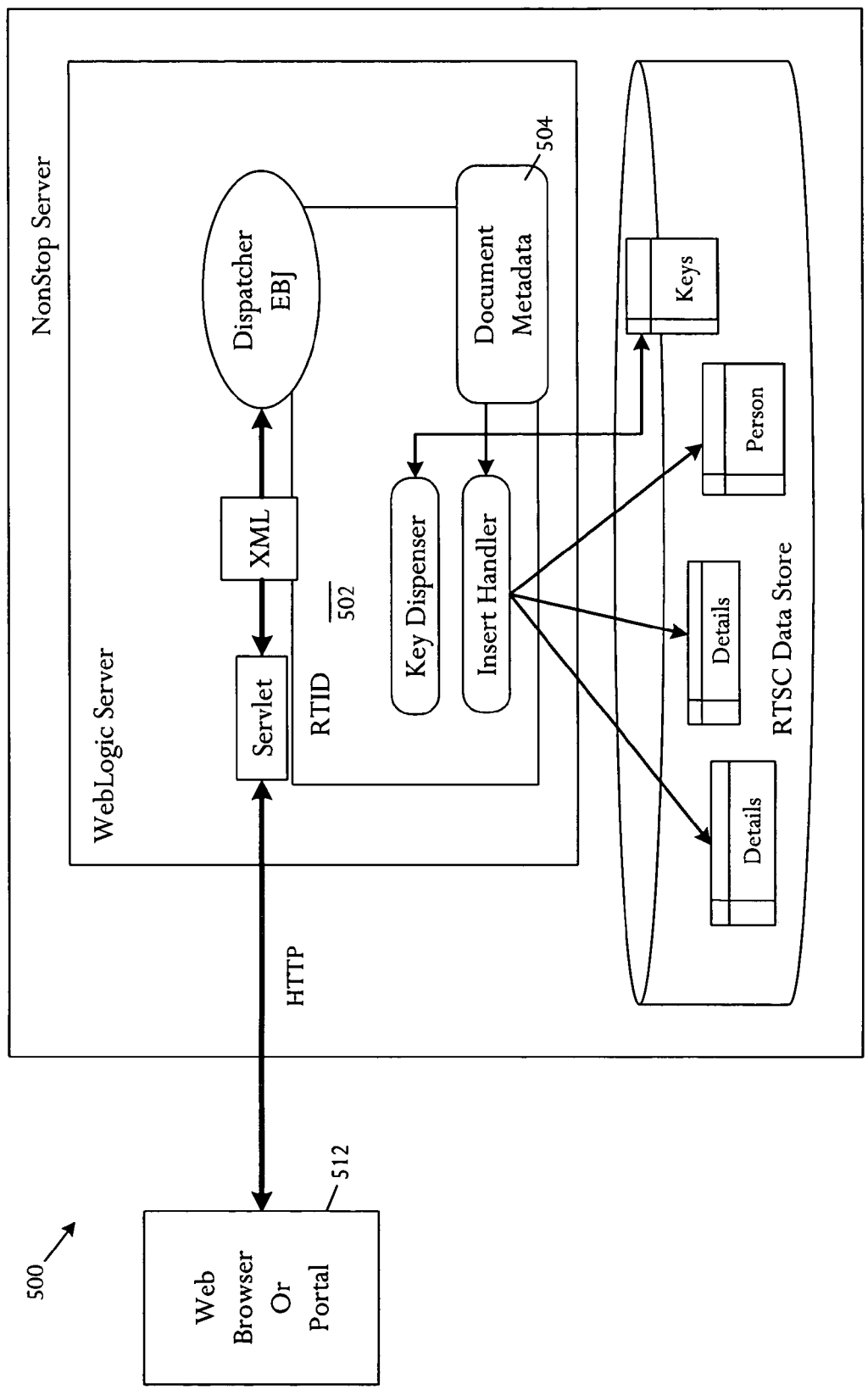
FIGS. 5A and 5B illustrate embodiments of data services handlers that perform an identity management function and multiple-level security functionality, respectively.
Figure 5B:
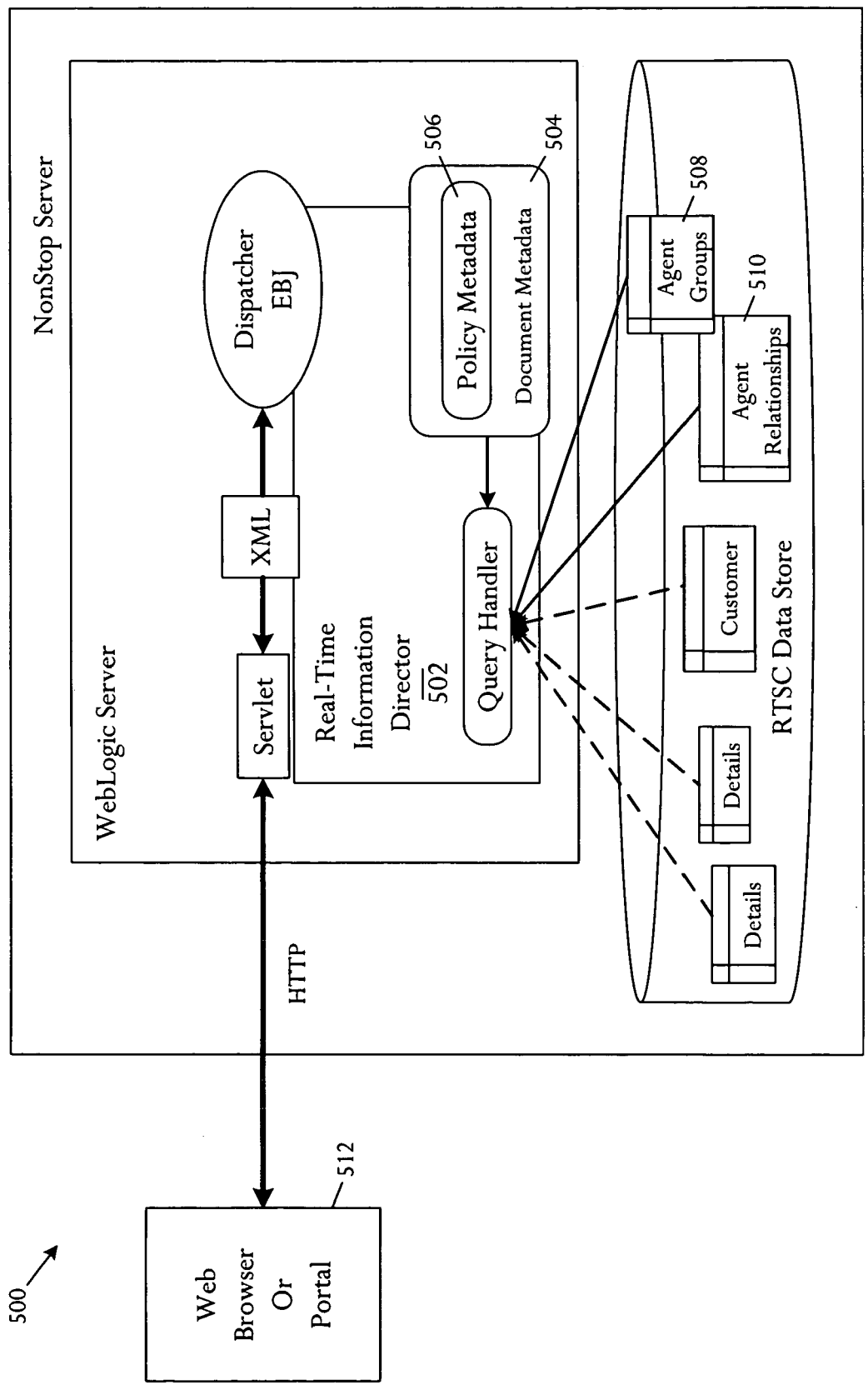

Referring to FIGS. 5A and 5B, schematic block diagrams illustrate an embodiment of a data handling system 500 that implements security and auditing features. Security and auditing operations are defined according to two persons, or pseudo-persons, who are identified in the header of a document sent to the real time information director 502. One person is identified as an agent, a person who requests information in a query document or submits changes to the database. The other person is identified as a consumer, a person whose information is requested or updated.

In an alternative setting, for example a healthcare setting, the consumer is typically a patient, and the agent is typically a healthcare provider, administrator or insurance agent. In a finance setting, the consumer is typically a customer, and the agent is typically a loan officer, teller, or customer service agent. In the hospitality industry, the consumer is typically a guest. Terms agent and consumer are selected as industry-neutral.

A secure or audited document has a header that includes an external identifier (ID) of the agent and the external ID of the consumer. An external ID typically has two elements, each in the form of a character string: an external ID proper and a name or code for an issuing agency. For example, the external ID may be "123-45-6789", or "Social Security".

The real time information director (RTID) 502 resolves each external identifier (ID), agent, or consumer to a unique internal ID by reading a Person table of the database. In one example, the internal IDs are 64-bit numbers assigned by the real time information director 502, using a "Key Manager" functionality, the first time that a consumer or agent is registered in the system. Documents that register new users generally use a SystemKey enrichment.

Multiple external IDs may be associated with the same person, issued by different agencies. For example, a person may be identified using a blue cross number, a social security number, an account number, and a driver's license number. Before registering a person under a new external ID, a determination is made of whether that person already is registered under another external ID. For the example of an Electronic Health Record (HER), a query can be made to look up persons with the same last name, date of birth, and zip code. If a matching person is found, an additional external ID can be assigned to the same internal ID.

Identities of agents and consumers can be managed in the same way to enable consumers to directly log into the system using the same external ID normally used when contacting a business. In such self-service transactions, the external ID of the agent and the consumer are the same.

Not all documents are secure or audited. Non-secure and non-audited documents may omit a header. The document definition indicates whether the document is secure and/or audited.

Not all audited or secure documents refer to one specific consumer. The header of a document may omit a consumer if the information in the document does not apply to a specific consumer. For example, a query that returns a list of patients for a document and the registration document for a new patient generally does not contain a consumer ID. However, an agent is generally always included in an audited or secure document.

The real time information director 502 is generally not used for authentication. For example, authentication may be performed by a portal 512 before sending transactions to the real time information director 502. The real time information director 502 typically accepts information from the portal 512 without additional verification. The connection from the portal 512 to the real time information director 502 is secured through techniques transparent to the real time information director 502.

Audited documents cause a record to be written to an AuditHeader table. The AuditHeader contains the internal ID of the agent and consumer, the date/time at which the transaction occurred, as well as an event date/time specified by the sending system, and the name of the document received. Each AuditHeader record gets a unique ID assigned by the Key Manager called the AuditId, a primary key of the AuditHeader. The AuditHeader also has an index enabling efficient lookup by date and consumer. Auditing is implemented primarily for the benefit of the consumer and has a primary intended usage to protect privacy rights of the consumer and protect against malpractice.

A DocumentDefinition for audited documents specifies additional details for recording in combination with the header. Details are stored in an AuditDetails table and are generally expressed in XML. In one example, the details can include two types: an inbound document received by the real time information director 502 and an outbound document sent by the real time information director 502. The two detail types apply to both queries and updates. Other types of details may be implemented, for example that apply only to updates. Two possible detail types are an image of corresponding data in the database before update and a database image after upsert.

A primary key of an audit details record can include AuditId, the type of details such as Inbound or Outbound, and a sequence number. The Audit system can break up XML documents larger than 4K into smaller chunks stored in several records.

The real time information director 502 can support document definitions that query the audit table by consumer and date, and can also support AuditDocumentDefinitions, query documents that return one of the audit details as an XML response of the request.

The Audit system can also automatically store Auditid of the current transaction in any or all affected records in an update document. Typical data models call for the date/time and ID of the agent who last updated the record to be stored in various tables. In contrast, using AuditID saves space and enables much more information to be captured about the last update, for example including transaction type and possibly full details of a change if storage of such an information capacity is warranted. The real time information director 502 can also be enabled to separately record AuditId of the original record insertion date since some data models carry both created-by/when and last-updated-by/when fields.

The Security system may also be configured primarily to guarantee consumer rights including privacy, for example relying on the portal 512 to supply first level authorization of agents in addition to authentication. The portal 512 may use a directory service to perform security functions. The directory may grant rights to perform certain transactions, for example submit corresponding documents. The directory generally cannot manage rights granted by the consumer. Rights granted by the consumers are stored in the Real Time Data Store and managed by the real time information director 502. Consumer-granted rights determine which agents have access to each consumer's data.

Consumers may grant permission to agents through a variety of different models, called Security Policies. A simple but impractical security data model is a list for each consumer of all individual agents that have the right to the consumer's data. A more complex but also more practical model supports multiple security policies, each with an underlying data model. For example, the real time information director 502 can support creation of standard and custom policies. One possible standard policy is a selfservice policy that grants a consumer, either patient or customer, access to their own data. A second standard policy is a personal agent policy that grants individually-named agents of individual consumer's access to that consumer's data. An example is a patient's primary care physician.

New or custom policies can simply be added. Example policies include a guardian policy that grants a consumer access to the data of a legal dependent, and an agent group policy that grants members of a named group access to a consumers data, for example members including doctors in a named Emergency Room.

Policies can be applied in any combination to individual transactions. For example, rights to perform a transaction A may be granted by either the self-service or guardian policy, while transaction B is granted by either the personal agent or agent group policy.

A policy is generally defined in document metadata 504, using the metadata to specify and customize policies. By definition, a document is secure if and only if a security policy is identified by name as one of the options in the document definition. Security policies are implemented in concrete subclasses of Policy. Like document definitions, concrete policy classes have a default constructor. For example, a document option "Policy=SelfOrPersonalPhysician" causes the class SelfOrPersonalPhysician to be instantiated. The policy creates subclass CompoundPolicy and calls an associated super class with the string "SelfService PersonalPhysician," instantiating concrete policy classes SelfService and PersonalPhysician. CompoundPolicy enables the agent to access the consumer's data if any of the referenced component policy classes grant access. Class SelfService grants access if the consumer ID and agent ID specified in the document header match. PersonalPhysician creates subclass PersonalAgent and passes the agent relationship name "Physician" to the super class. Subclass PersonalAgent grants access if the ConsumerAgentRelationships table contains a record associating the agent to the consumer, for example as "patient" to "physician."

CompoundPolicy and PersonalAgent are examples of standard abstract policy classes provided as part of the real time information director 502. Custom policies are typically created by subclassing such standard abstract policy classes, and referencing other concrete policy classes. PersonalPhysician and SelfOrPersonalPhysician represent the type of concrete policy classes implemented as part of a customization process for a particular industry or business. SelfService is a concrete Policy class supplied with the real time information director 502 that is applicable to any industry. Documentation is typically supplied that enables professional services to create additional abstract policies.

SelfService policy does not access the database but rather compares elements of the document header. Most policies access the database, generally by implementing a template method constructContext. The method is called each time a document handler is created that uses the policy. The method is passed a SQLConnection so that the Policy can create prepared statements. However, the connection and prepared statements do not belong to the Policy as metadata, which is instantiated only once, but to the document handler that likely is instantiated several times. Therefore, the Policy creates a clone and returns the clone as a result of the constructContext method, a result achieved from the constructcontext method by calling an alternate constructor of the same class, taking the clone and the connection as parameters. Statements are prepared in the clone constructor using data stored in the metadata class.

Concrete policies are instantiated by an internal class of the real time information director 502 called the PolicyManager. PolicyManager ensures each concrete policy metadata class is instantiated only once during any execution of the real time information director 502 no matter how often the class is referenced in the metadata. However, the policies can clone as part of DocumentHandlers by implementing the constructcontext method.

Concrete classes similar to PersonalPhysician can be written without dealing with details of cloning. PersonalAgent automatically manages operations to clone the class and create the prepared statements. PersonalPhysician simply customizes behavior by specifying the value "Physician" for one of the fields in the query. Operations are transparent to the person writing the concrete class.

A small number of data models may be supplied to represent agent groups, consumer-group relationships, and consumer-guardian relationships, and the like. Several abstract policy classes can be created to use the different data models. Some enterprises may modify the abstract policy classes or create new policy classes to customize the underlying data models. Some enterprises may supply additional information about the relationships between agents and/or consumers in a dedicated data model.

The header may also include an element that identifies the particular role of an agent when a user logs onto the system. The role can be passed in the document header. The Policy may reference the role when applying policy. For example, the PersonalPhysican policy may grant access only if the role specified in the header is "Physician" and the SelfService policy may grant access only if the role specified in the header is "Self".

The real time information director (RTID) 502 is useful for building a secure ZLE environment. The real time information director 502 enforces security constraints. Any access to the data that bypasses the real time information director 502 might compromise data security. Real time information director 502 is suitably flexible to manage access to the data.

Referring to FIG. 5A, the data services handler 500 performs an identity management function, including registering a user or customer. The data services handler 500 is formed as a request-response model that can be enriched with a variety of services that are integrated with the real time information director 502. The document metadata 504 implements services that can add more information to the resulting document. One common use of these features is to provide a recommendation, such verification of identity.

FIG. 5B depicts the data services handler 500 in a multiple-level security application. Here, document metadata 504 includes policy metadata 506 that specifies agents 508 that are allowed access to data, and defines rules setting forth agent relationships 510 determining which agents have access to particular data along with requisites for attaining the data access.

The policy metadata 506 can be configured to enable operation of a security manager that identifies an agent on behalf of whom information is queried or updated, and identifies a consumer for whom information is requested. The agent is identified in a request for designated documents. An internal unique identifier is dynamically assigned to each consumer and agent as part of registration of the consumer and agent in the system. One or more external identifiers are mapped automatically to the internal identifier in each request.

The real time information director grants access to individual documents based on security policies that conform to the relationship between the agent and the affected consumer, and permissions granted by the consumer. Distinct security policies are specifiable for the individual documents. The security policies are customizable to recognize specific agent and consumer relationships expressed in a business model.

Figure 6:
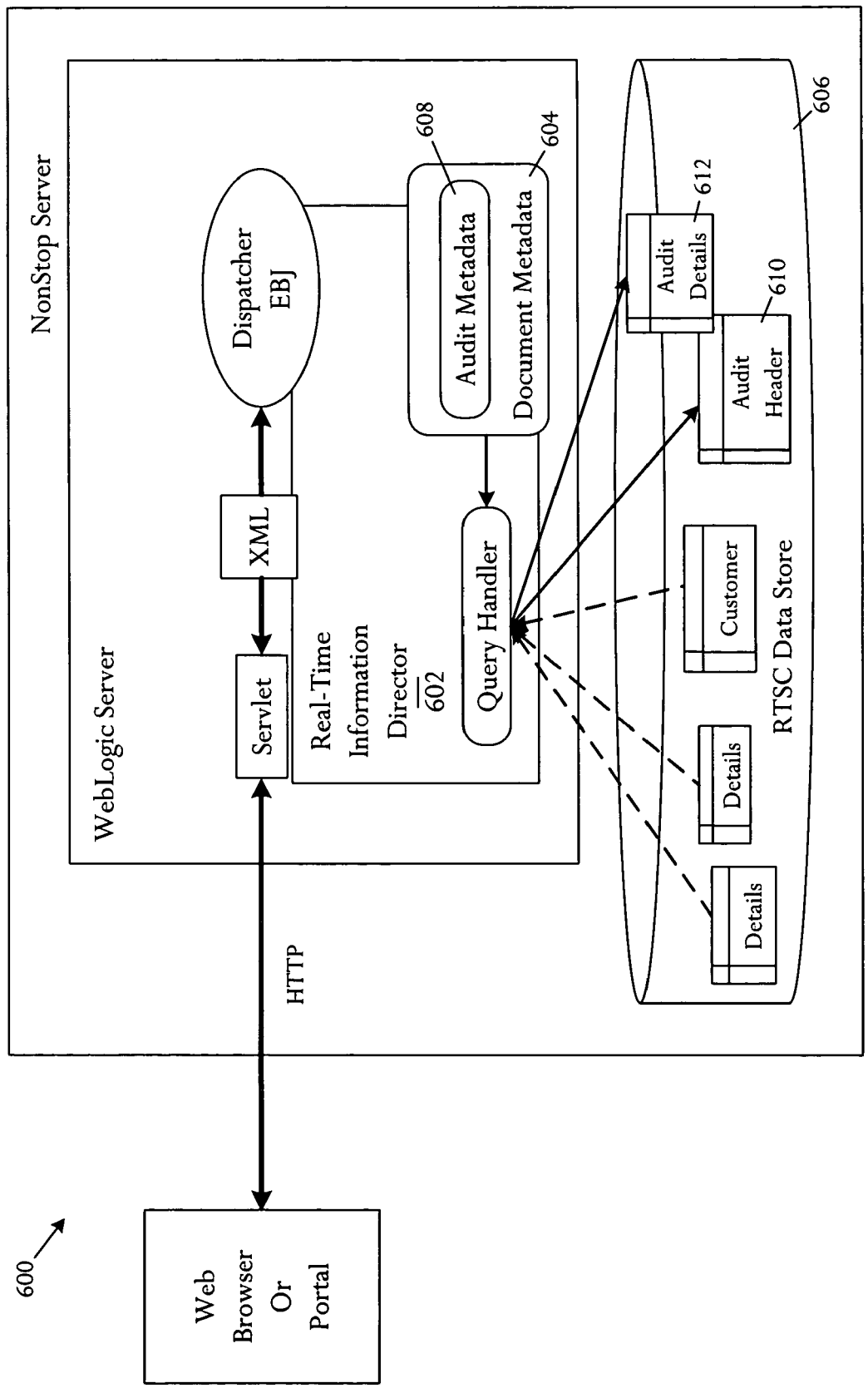
FIG. 6 is a schematic block diagram illustrating an embodiment of a data services handler that is configured with a data auditing capability.

Referring to FIG. 6, a schematic block diagram illustrates an embodiment of a data services handler 600 that is configured with a data auditing capability. Many business environments may use an audit log, for example including an audit header 610 and audit details 612, to record changes to the database 606. In some cases the audit log only records summary information, such as the date and time that a document is received, along with key identifying fields of the document. In other cases, the audit log may record details of each modification, both before and after document access. Either level of auditing can be specified within document content metadata 604 as audit metadata 608. The audit log may also include the identity of the user who submits a change, whenever the information is used to access the real time information director (RTID) 602.

Figure 7A:
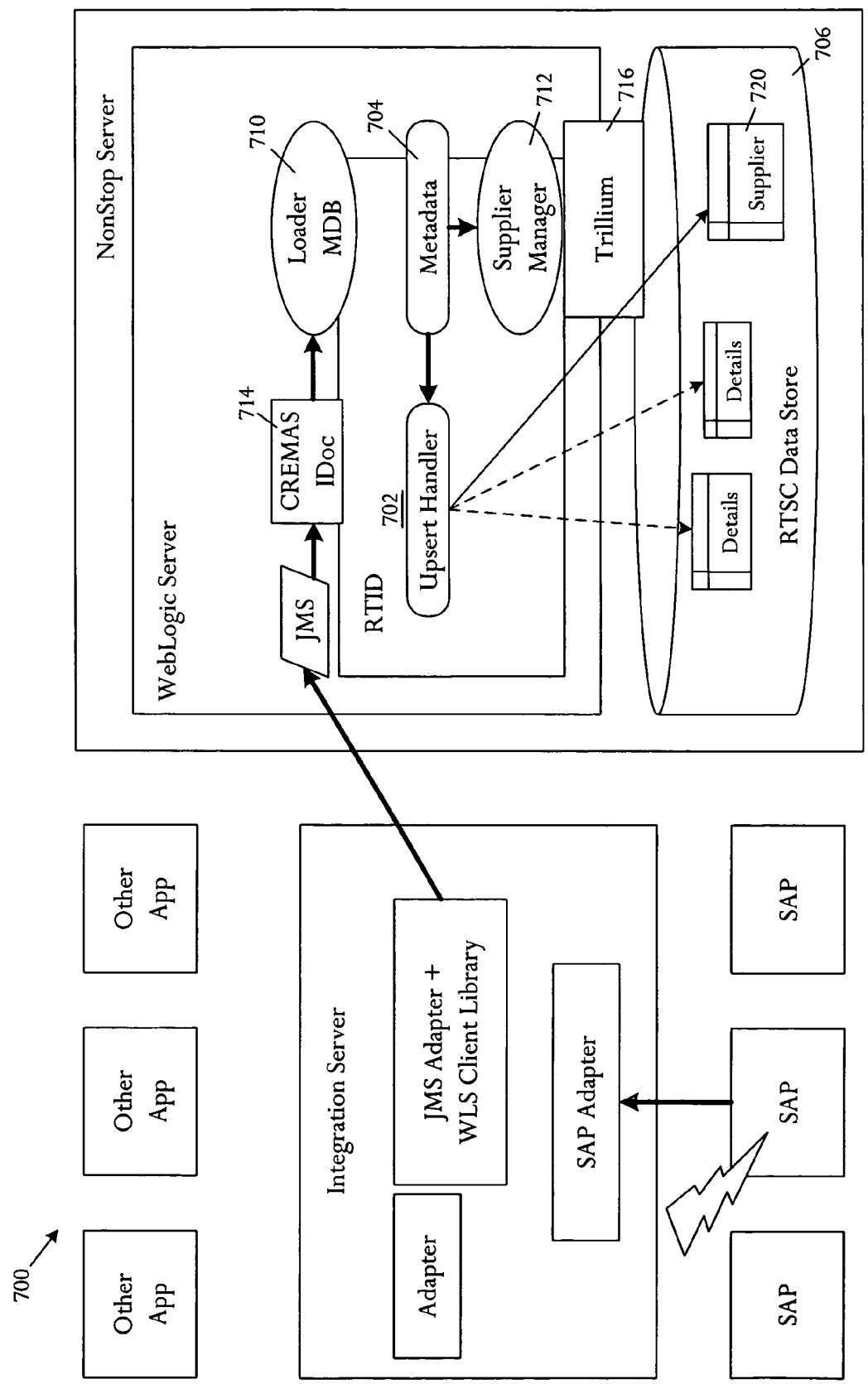
FIGS. 7A and 7B are schematic block diagrams illustrating a data services handler capable of implementing a data cleansing functionality.
Figure 7B:
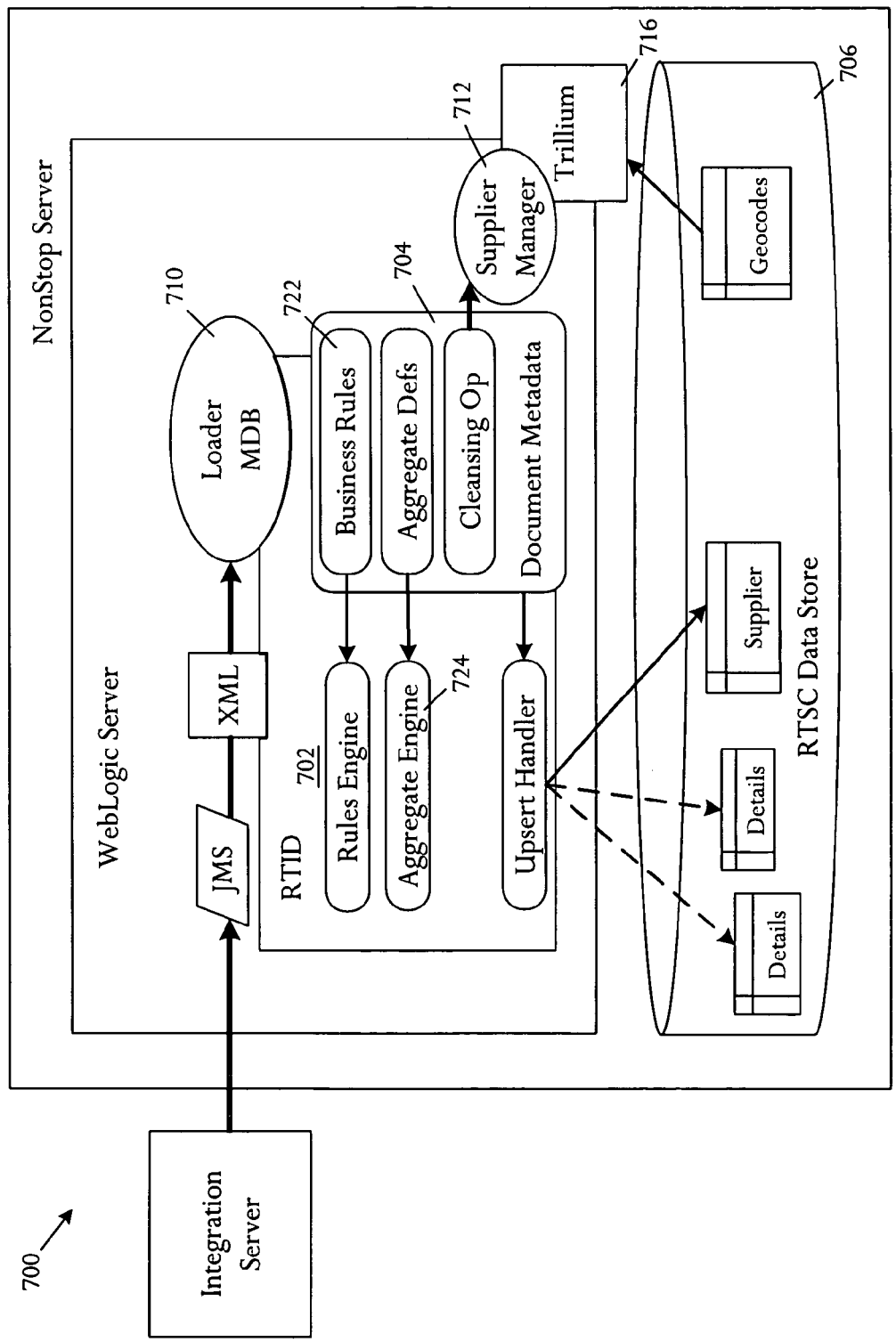

Referring to FIGS. 7A and 7B, schematic block diagrams illustrate a data services handler 700 capable of implementing a data cleansing functionality. FIG. 7A depicts data cleansing on inbound documents. The real time information director (RTID) 702 includes Beans to cleanse and de-duplicate various types of master data, for example using a Loader Message-Driven Bean (MDB) 710. The real time information director 702 includes a Supplier Manager 712. Metadata 704 for a CREditor MASter (CREMAS) IDoc 714 directs the real time information director 702 to call the Supplier Manager 712 to cleanse and de-duplicate an inbound document. The CREMAS IDOC is a master data object for creditor information. Other applications may operate with other IDOCs such as DEBitor MASter (DEBMAS) and MATerial MASter (MATMAS) IDOCs. The Supplier Manager 712 invokes Trillium 716 via a Java Native Interface (JNI) to perform the cleansing and identify possible matches. A vendor or supplier 720 is inserted into the database 706 with the cleansed name and address by the real time information director 702. The Supplier Manager 712 also adds the supplier 720 to a work queue if identified as a likely duplicate. Additional services within the Supplier Manager 712 enable the user to process the candidate duplicates, and confirm or deny the duplicates.

Let us assume that we want to distribute three types of master data objects, the material master, the creditor master and the debitor master. Let us also assume that we have four offices FIG. 7B shows the data services handler 700 in a configuration that cleanses and enriches inbound documents. Business rules 722 can be used to correct and enrich inbound documents prior to insertion into the database 706. An aggregation engine 724 can be used to accumulate information to be inserted into the database 706.

Data cleansing is one example of a value-added service that can be implemented using polymorphic metadata. An example is name and address cleansing, which is applicable to both customer master data and supplier master data. Document metadata 704 identifies name and address elements of the document. The elements are passed to the data cleansing service. The data cleansing service forms an abstract interface to third party data cleansing engines, such as Trillium engine 716. The data cleansing service returns a name and address with normalized spelling, titles, street abbreviations, validated zip codes, etc. Supplier and customer data are inserted into the data store with cleansed names and addresses.

The data cleansing service also queues the supplier and customer information for detection of duplicates. Duplicates frequently arise in source data. Duplicate detection is used in RTSC because the same suppliers and customers appear in multiple SAP instances. The duplicate detection logic identifies likely duplicates. Logic is typically configurable to forward likely duplicates for human confirmation. Confirmed duplicates are cross-referenced in the database.

Subscriptions can use the cross-reference information in a variety of ways, such as limiting subscription to the authoritative instance of a master data document. The subscription filters out duplicate versions of the same supplier document emanating from multiple SAP instances. Subscription can also be constrained to subscribe to all documents, for example shipments, coming from a particular supplier identified in various SAP instances, or to collect data from various SAP instances related to a particular supplier into a single document. Subscription can further be used to enrich documents that reference a particular supplier, for example shipments, with information drawn from the master instance of the supplier.

Figure 8:
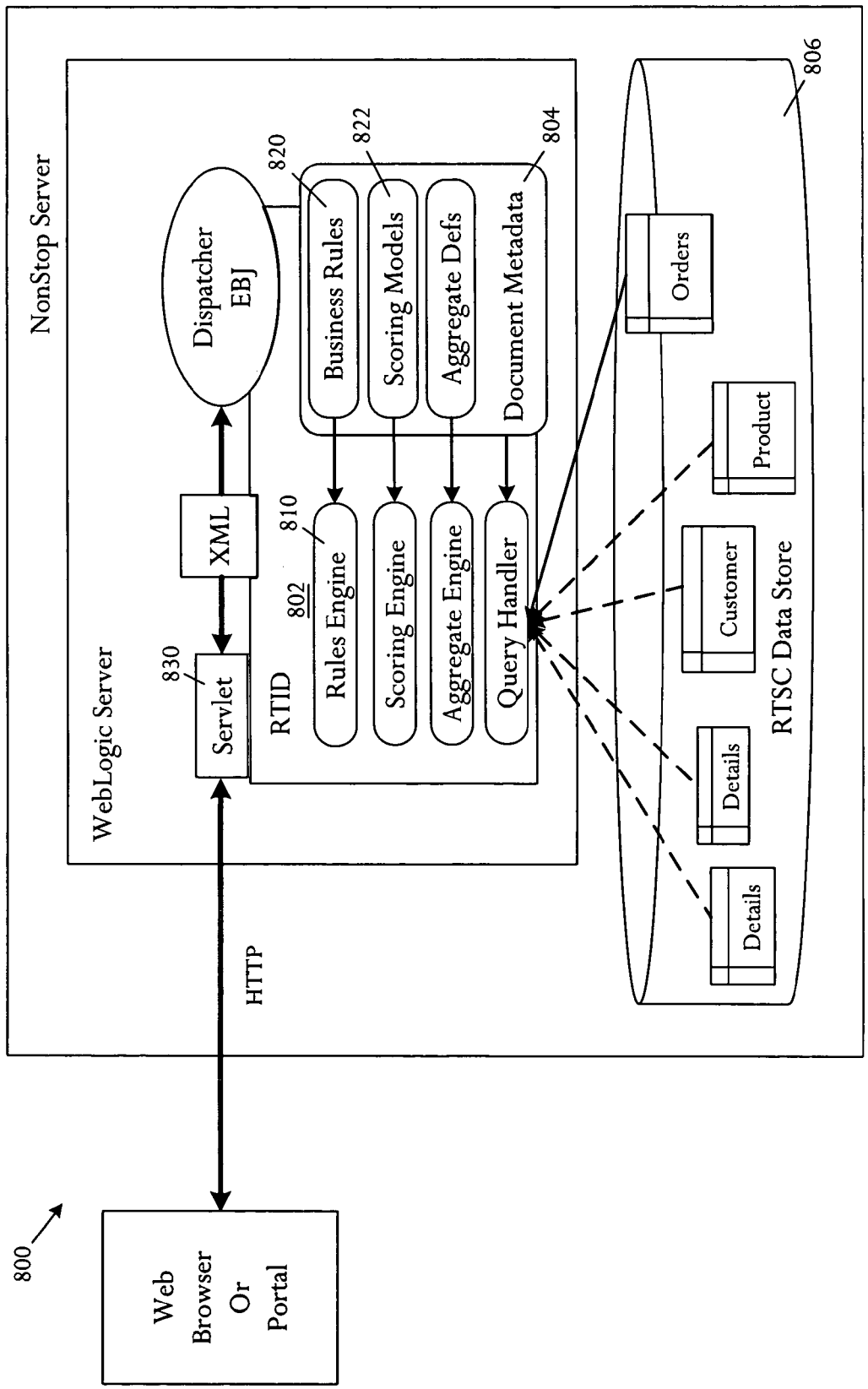
FIG. 8 is a schematic block diagram showing an embodiment of a data services handler that implements business rules handling.

Referring to FIG. 8, a schematic block diagram illustrates an embodiment of a data services handler 800 that implements business rules handling. A business rules engine 810 may be implemented in various configurations. In a specific example, real time information director 802 can host a Blaze Advisor™ business rules engine 810. The real time information director 802 enables access to data that drives business rules 820. Typically a business object model is constructed to support Blaze. The business object model enables access to data, performs computations on the data that are relevant to the rules, and supports execution of decisions made by application of the rules. The real time information director 802 includes a pre-built business object model that is operational without customer modification. The business object model gives direct access to the data described by the document metadata 804 and also enables access to aggregates defined for a specified document type using Aggregate Wizards. The business object model may invoke the scoring engine using any scoring model relevant to the document.

With a capability to create custom aggregate functions, any calculation likely to be used by business rules can be performed without modifying the business object model, a capability that can tremendously shorten the time expended in building a solution using business rules 820.

Business rules 820 can be utilized in both a request-response model, and in an event-driven model.

Figure 9:
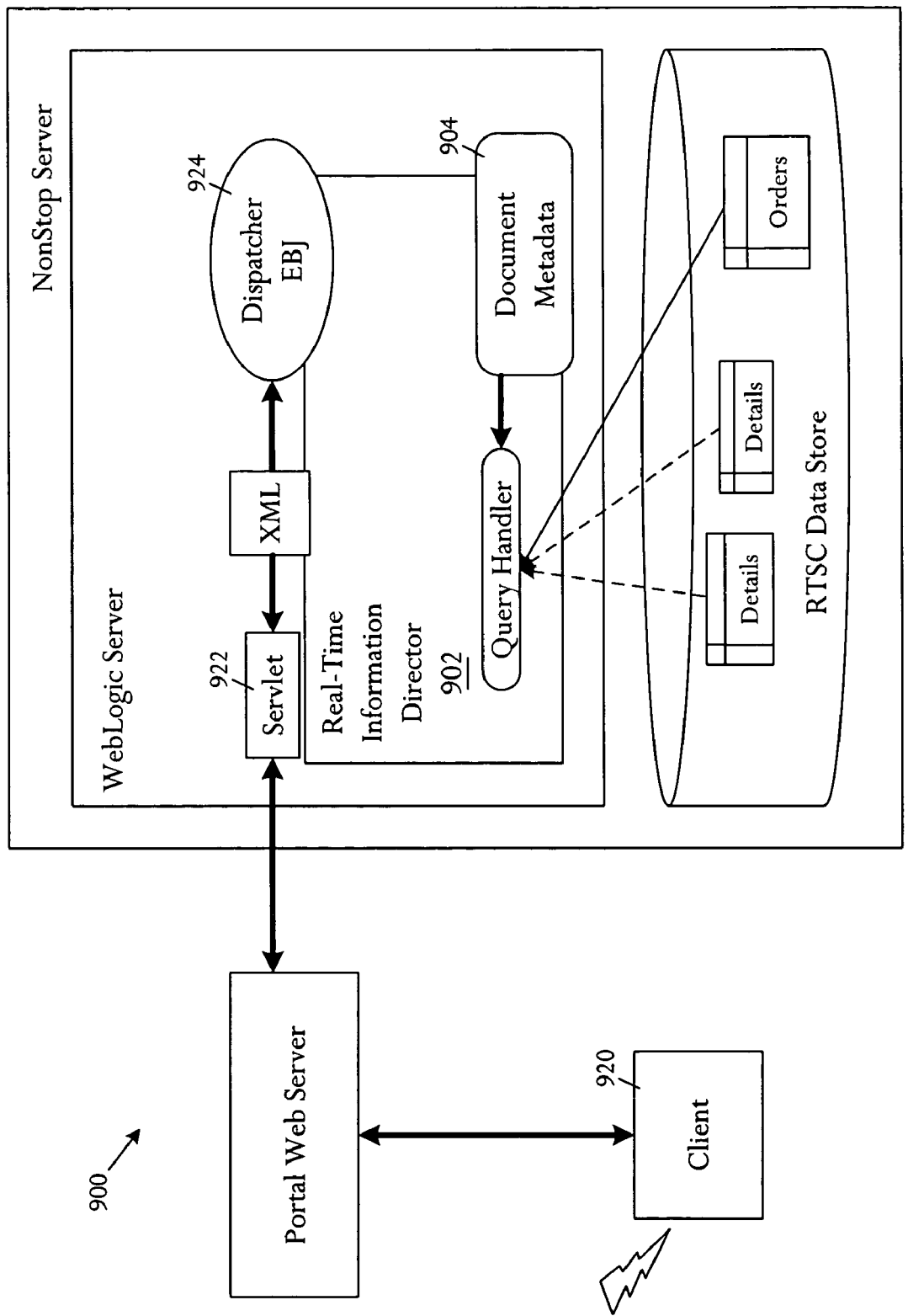
FIG. 9 is a schematic block diagram illustrating an embodiment of a data services handler that operates according to a request-response model.

Referring to FIG. 9, a schematic block diagram illustrates an embodiment of a data services handler 900 that operates according to a request-response model. Client applications 920 may also request a document upon demand, using a request-response model. In the request-response model, the user invokes a servlet 922 for assistance, identifying information that can be used to assemble the document used by the business rules. For example, the information might include the name of a customer, and the identifier of a desired product that is currently back-ordered.

In the illustrative embodiment, the servlet 922 passes the requested document type, along with any identifying parameters, to a session bean 924. The real time information director (RTID) 902 assembles the requested document, using the document metadata 904 in a manner of operation similar to triggering by a subscription. The servlets 922 may be advertised as web services, including the supported document definitions.

Referring again to FIG. 8, a servlet 830 calls the real time information director (RTID) 802, requesting the product-cross-sell document, and passing the customer and product identification. The document metadata 804 directs the real time information director 802 to assemble past data about the customer's buying patterns and preferences, as well as information about the supply of comparable products, and pass the document to the business rules 820. The business rules 820 insert into the document recommendations for products to cross-sell. The business rules 820 may use mining models that predict likelihood that the customer will buy certain products. Business rules may also consider supply and/or apply rules that describe current promotions. The completed document is returned to the servlet 830, which displays recommendation on a web page. In the event-driven model, a subscription triggers the creation of a document that is rules-enabled. After document metadata 804 is used to assemble the data from the database 806, business rules 820 can again insert recommendations into the document and direct the document to a particular queue for further action. For example, suspiciously large orders can trigger a subscription. The business rules 820, possibly with assistance from scoring models 822, and can determine likelihood that the order is mistyped, manipulated or fraudulent. The messages in a queue can be automatically processed by another application, or displayed to an authorized manager. A business rules capability thus enables intelligent, filtered, subscriptions.

Figure 10I:
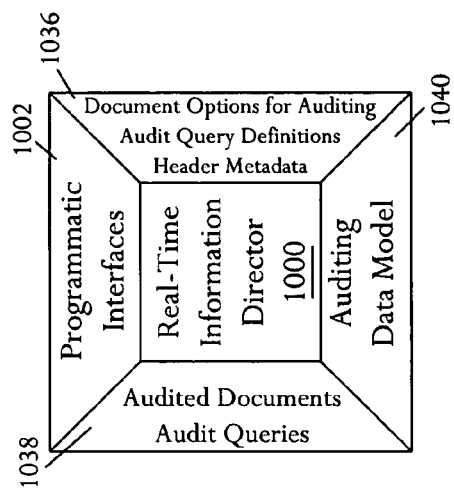

Referring to FIGS. 10A through 10K, multiple schematic block diagrams illustrate various real time information director interfaces. FIG. 10A shows the real time information director (RTID) 1000 as a "black box" that has a few simple programmatic interfaces 1002. Input and output interfaces are in XML 1004. Documents are defined in metadata 1006 and document content reflects a real-time data model 1008.

FIG. 10B shows programmatic interfaces 1002 including a servlet and stateless session bean 1010 that handles inbound and outbound documents synchronously. A message driven bean handles inbound documents asynchronously and a subscription service delivers outbound documents asynchronously via JMS, components that are deployed under WLS.

FIG. 10C depicts generic data model customizations. A user modifies data model (DDL) 1008. The real time information director (RTID) 1000 reads SQL schema dynamically. The user creates content metadata to identify records that make up a document. The real time information director 1000 exports an XML schema 1012 for native documents 1014. The user defines events to trigger custom subscriptions 1016.

FIG. 10D shows enrichments. Various enrichments can be invoked via document metadata. Enrichments can be invoked on inbound or outbound documents. The user extends the data model 1018 to capture inbound enrichments. Some enrichment systems, for example Customer Manager, have a dedicated data model. Some enrichment systems, for example Blaze, have dedicated metadata, for example business rules 1020.

FIG. 10E illustrates interface features that are specific to Real-Time Supply Chain (RTSC). The data model is the RTSC data model 1022 and the interface supports IDocs 1024 in addition to native documents. The metadata 1026 supports variant mappings for the same IDocs from different source systems. RTSC IDocs are based on a standard set of starting IDocs.

FIG. 10F shows an HyperText Transport Protocol (HTTP) interface that can form a basis for the RTSC data model for receiving inbound IDocs. The interface supports variant mappings 1028 for same IDocs received from different source systems. VISTA delivery uses a native document. The servlet & bean interface 1030 that is used is obsolete, supporting updates only.

Figure 10H:
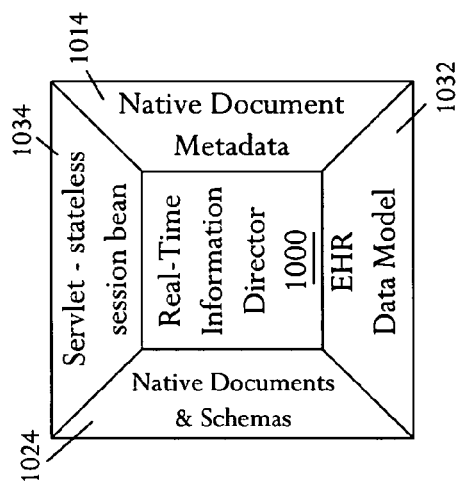
Figure 10K:
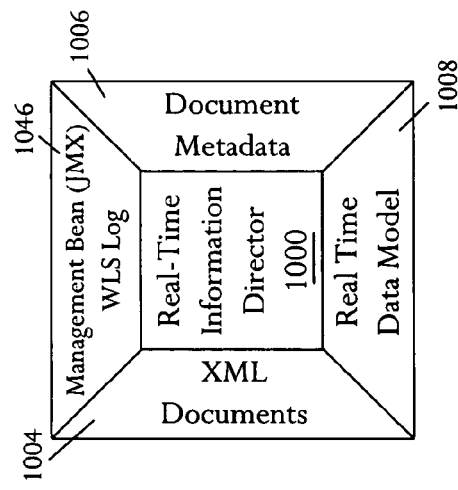
Figure 10G:
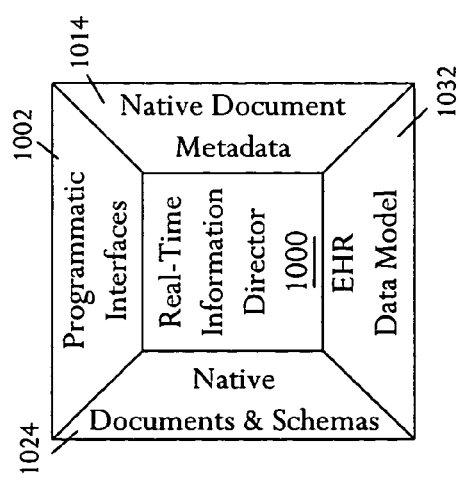

FIG. 10G illustrates an interface that supports Electronic Health Record (EHR)-specific features. EHR can be implemented according to Veterans Health Administration (VHA) electronic medical records in a Computerized Patient Record System (CPRS) using a technical infrastructure that displays various clinical functions in a graphical user interface (GUI) format. The business data model 1032 is specific to EHR. Other features are applicable to other industries.

FIG. 10H shows a request-response interface to the real time information director that handles both updates and queries.

FIG. 10I illustrates an interface embodiment that is configured for auditing functionality. Metadata 1036 contains audit header and detail tables. Metadata 1036 also indicates audit options per document and audit queries 1038, as well as document header contents in conformance with an auditing data model 1040.

Figure 10J:
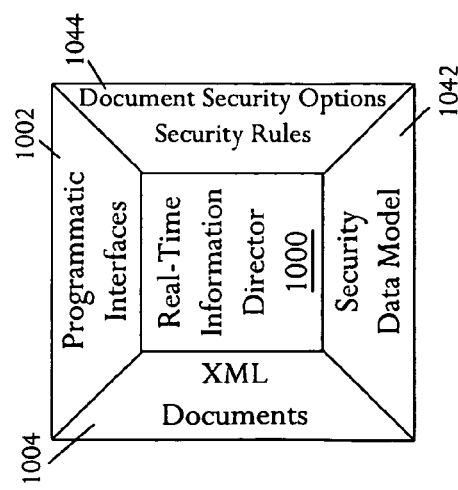

FIG. 10J depicts an embodiment of a security interface based on a security data model 1042 and using document security options and security policies implemented in security metadata 1044 including security tables that record agent/consumer relationships, agent groups, roles that are granted rights based on agent/consumer relationships, and opt in/out exceptions. Metadata 1044 also indicates security constraints by documents, and security policy sets that are invoked.

FIG. 10K shows a management interface 1046. The real time information director 1000 is managed using standard J2EE and WLS mechanisms. Events are reported through WLS log. A management bean 1046 exposes performance counters and makes real-time configuration changes, such as deploying new metadata.

Figure 11:
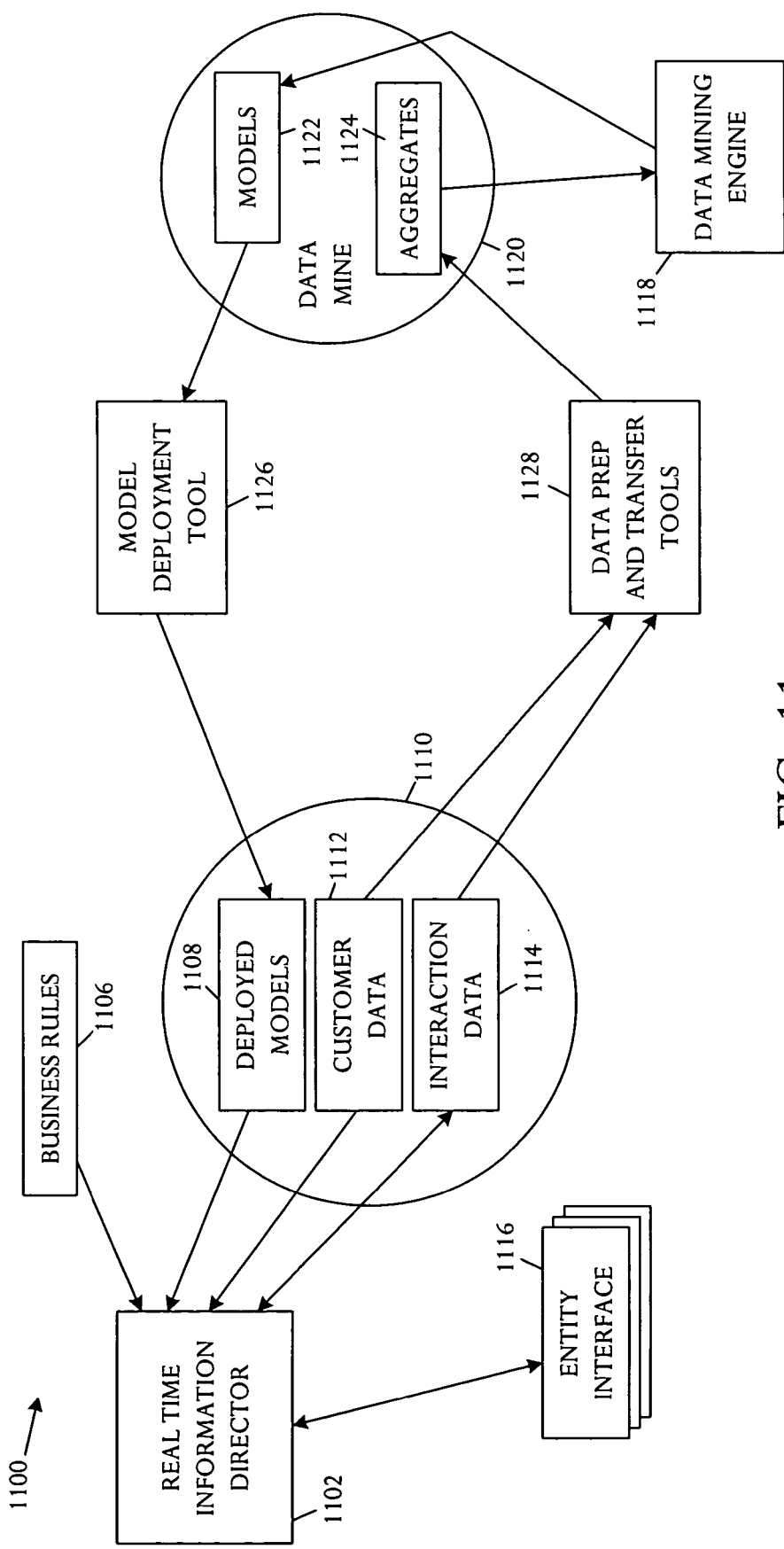
FIG. 11 is a schematic block diagram illustrating an embodiment of an information handling system that can be used for Zero Latency Enterprise (ZLE) applications.

Referring to FIG. 11, a schematic block diagram illustrates an embodiment of an information handling system 1100 that can be used for Zero Latency Enterprise (ZLE) applications and data handling system. The ZLE framework is supported by Hewlett Packard Company of Palo Alto, Calif. The information handling system 1100 includes a real time information director 1102, for example as described with respect to FIGS. 3A and 3B. The real time information director 1102 is a functional computation engine configured to enable real-time aggregation and real-time scoring. In an illustrative embodiment, the real time information director is a black-box application framework for deploying custom systems that perform real-time scoring and implementation of business rules. Typical uses of the real time information director are to make personalized offers and to advise of attempts to commit fraud.

The real time information director 1102 comprises an aggregation engine capable of computing aggregates in real-time from in-memory data that is dynamically cached during a session with an entity.

The information handling system 1100 manages interactions using the real-time information director 1102, a component that efficiently caches detailed entity data during interactive sessions, forwards the information to the real time information director to personalize the session, and make offers. The entity data is supplied during interactive sessions via one or more entity interfaces 1116. In a common application, the entities can be customers who supply information relating to commercial transactions and inquiries. In various applications, the entities can be any sort of entity including persons, corporations, organizations, government agencies, and the like. In an illustrative embodiment, the real time information director 1102 is supplied by Hewlett Packard Company of Palo Alto, Calif. Hewlett Packard Company also has a ZLE Development Kit, familiarly known as the ZDK, used by HP professional services and partners to build custom ZLE applications that run on a NonStop™ Server platform 1110. The NonStop Server platform serves as an information base that stores, for example, deployed models 1108, customer data 1112, and interaction data 1114.

Among the application templates in the ZDK, two are highly useful in the real-time application of data mining. The real time information director 1102 hosts business rules 1106 that are implemented in a rules engine and makes the offers. The business rules 1106 may utilize scores obtained from mining models 1108. A specific example uses a Blaze Advisor rules engine, which can supply offers based on business rules that are written and tested in Blaze Advisor Builder. Blaze Advisor can be licensed from Fair Isaac Corporation of San Rafael, Calif. Blaze Advisor is incorporated into the real time information director by adding appropriate Java™ Archive (JAR) format files obtained from Fair Isaac to the real time information director class path.

The real time information director 1102 returns offers based upon information supplied by interaction management. The illustrative real time information director 1102 has multiple component engines that derive offers from the input data. The engines work in various combinations and use business rules 1106 and/or data mining models 1108 to derive the offers.

The scoring engine scores information using data mining models built using a data mining engine 1118 and aggregates 1124 in the data mine 1120 creating models 1122 in the data mine 1120. One suitable data mining engine 1118 is SAS Enterprise Miner™. Models generated by SAS Enterprise Miner are deployed to the NonStop SQL database using Genus Deployment Tool 1126 from Genus Software, Inc. of Cupertino, Calif. The scores can be used within the Blaze Advisor business rules, as one criterion for making an offer. Usage of data mining models within business rules is not mandatory. Data is prepared on the NonStop Platform 1110 using data preparation tools 1128 and moved from the NonStop Platform 1110 to the data mine 1120 using the transfer tools 1128. Data can be deployed from the data mine 1120 to the NonStop Platform 1110 using a model deployment tool 1126.

Referring to FIGS. 12A through 12E, Unified Modeling Language (UML) diagrams are shown that describe operations and functionality of the real time information director. Document definitions determine behaviors of the real time information director. The document definitions are implemented in a concrete subclass of DocumentDefinition. A person who performs a customization operation writes the concrete DocumentDefinition subclass. A concrete DocumentDefinition subclass is instantiated only once.

Figure 12A:
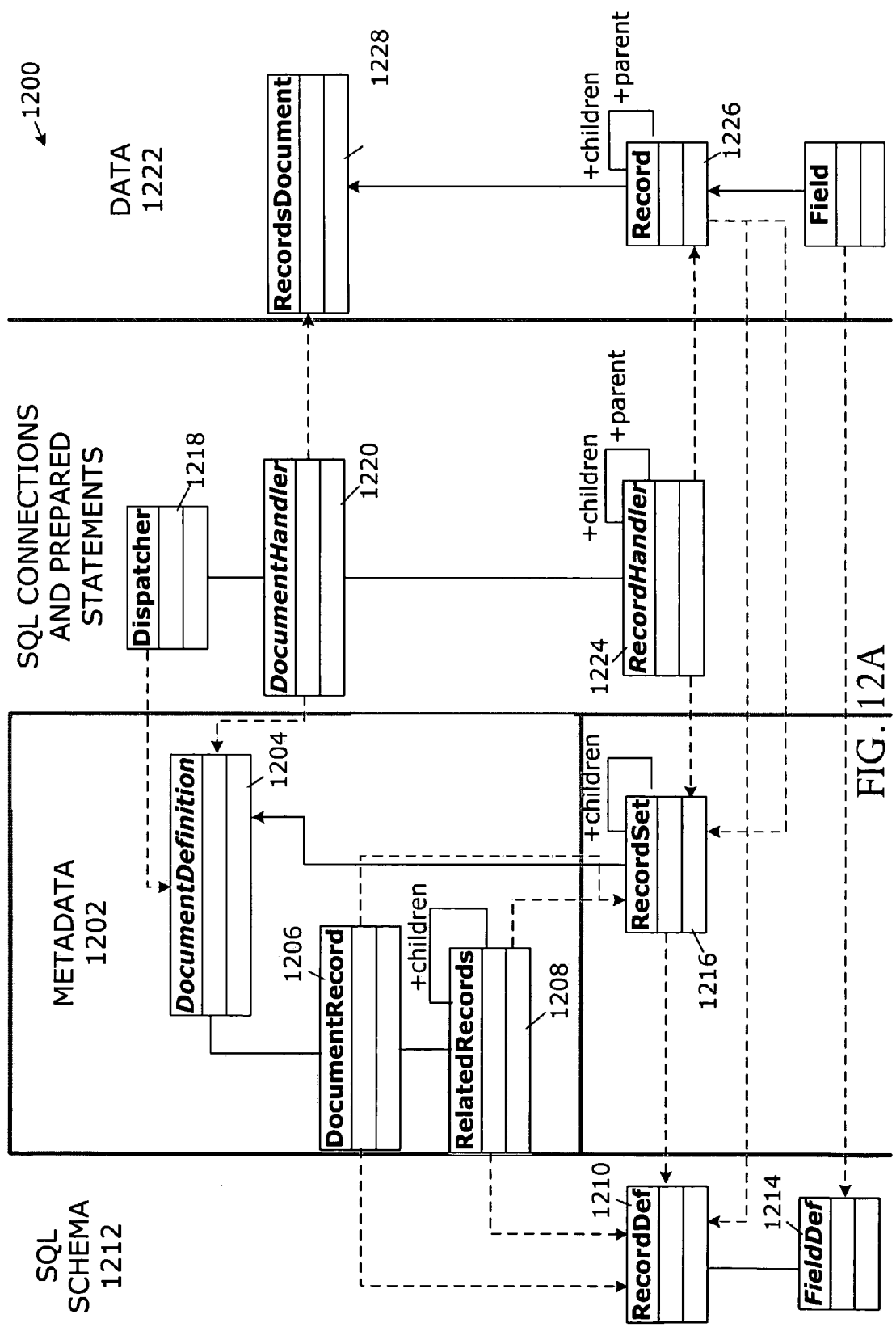
FIGS. 12A through 12E are Unified Modeling Language (UML) diagrams that describe operations and functionality of the real time information director.

FIG. 12A is a content management diagram 1200. Content metadata 1202 for a DocumentDefinition 1204 is defined by a DocumentRecord 1206, which contains various RelatedRecords 1208. RelatedRecords 1208 may contain other RelatedRecords 1208, the only classes shown in the content management diagram 1200 that are visible to the persons performing the customization. A DocumentRecord 1206 or RelatedRecord 1208 typically refers to a table by name, causing a record definition (RecordDef) 1210 for the table to be obtained by reading a SQL schema 1212 of the table if the SQL schema has not already been read. RecordDefs 1210 contain a field definition (FieldDef) 1214 for each column of the table. Enrichment metadata specified in the DocumentRecord 1206 or RelatedRecords 1208 may trigger the creation of an enriched RecordDef 1210 containing additional FieldDefs 1214, for example from a Joined record, or fewer FieldDefs 1214.

The DocumentDefinition 1204 uses the metadata 1202 to construct the tree of RecordSets 1216. The RecordSets 1216 integrate the content metadata, for example DocumentRecords, RelatedRecords, and enrichments nested beneath, with format metadata that is not shown in the diagram. Multiple aliased or variant document definitions, with different format metadata, can share the same content metadata 1202. A separate tree of record sets is constructed from the same content metadata for each aliased or variant document definition.

A Dispatcher 1218 allocates and manages DocumentHandlers 1220 to process inbound documents and subscriptions. Each DocumentHandler 1220 is allocated a SQL connection to the database 1222. The DocumentHandler 1220 includes a tree of RecordHandlers 1224. Each RecordHandler 1224 is constructed and prepares applicable Java DataBase Connectivity (JDBC) statements based on information in the RecordSet 1216 and associated RecordDef 1210. RecordHandlers 1224 either act on the appropriate Records 1226 in the inbound document to update the database, or construct the appropriate Records 1226 for the outbound Document 1228 after reading the database.

The diagram illustrates parallelism between data 1222, document handlers 1220, and metadata 1202. One tree of RelatedRecords 1208, with DocumentRecord 1206 as the trunk, is constructed for each base document definition 1204. One tree of RecordSets 1216 is constructed per base, variant or aliased document definition. One tree of RecordHandlers 1224, containing prepared statements, is constructed per database connection and DocumentHandler 1220. One tree of Records 1226 is constructed per Document 1228.

Figure 12B:
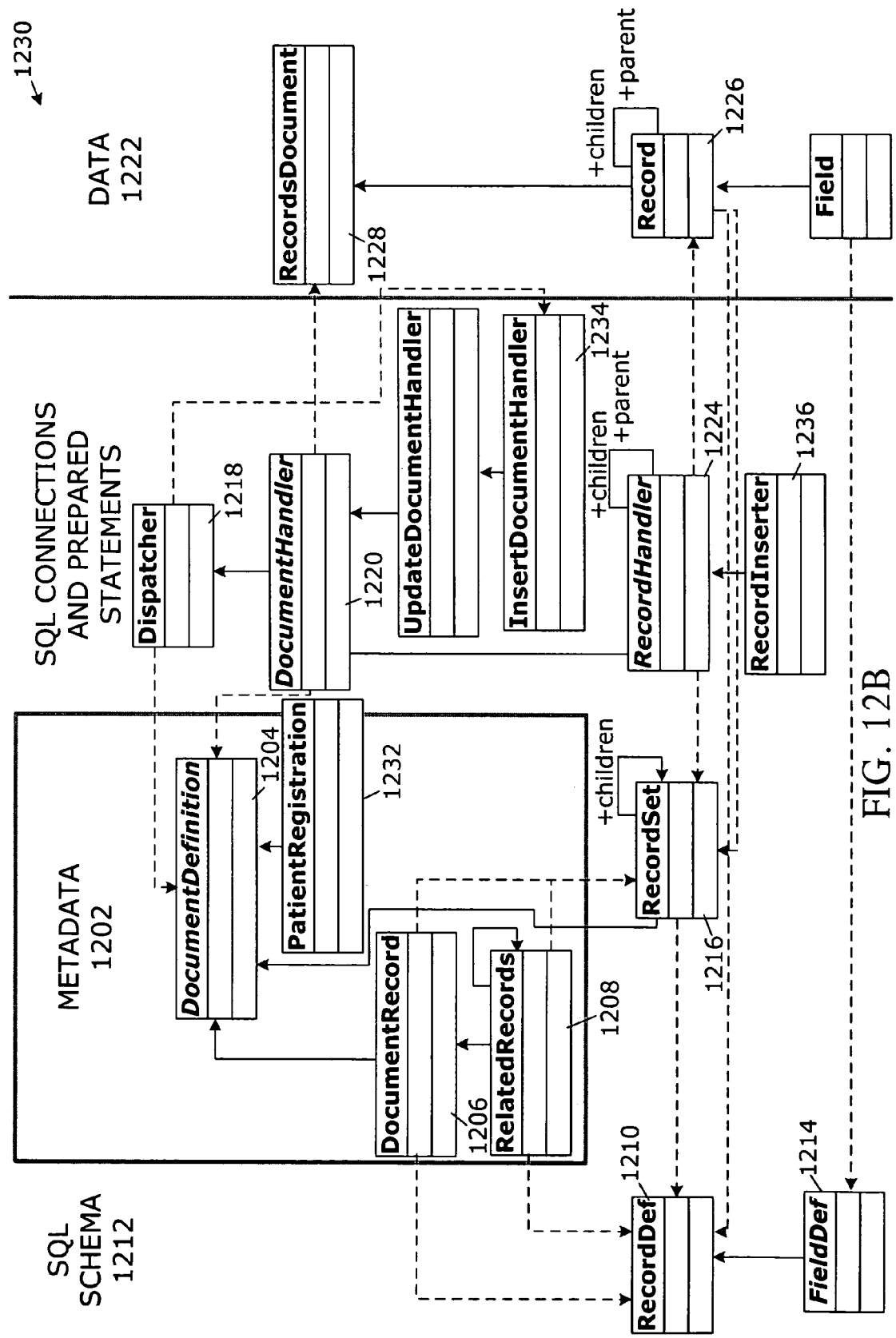

Referring to FIG. 12B, a UML diagram illustrates an embodiment of an Insert function 1230. Several of the classes shown in the content management diagram 1200 are abstract. The Insert diagram 1230 shows concrete classes involved in a Document Definition that inserts a document into the real-time data store.

The Dispatcher 1218 parses and disassembles inbound eXtended Markup Language (XML) into the RecordsDocument 1228. A name is identified during the process. In most cases, the name corresponds to the top-level tag of the document. However, in the case of Variant documents, the name of the document is identified using other criteria, such as the source system.

The Dispatcher 1218 looks up the DocumentDefinition 1204 corresponding to that name, and also looks for an available existing DocumentHandler 1220 for the underlying base document definition. If none currently exist, or all existing DocumentHandlers 1220 for that base document definition are currently in use, the Dispatcher 1218 creates a new DocumentHandler 1220. Attributes of the concrete document definition are read by the Dispatcher 1218 to determine the concrete type of DocumentHandler 1220 to construct that can handle any inbound document.

In the illustrative example, a new patient is registered. A PatientRegistration 1232 document definition is self-identified as an insert document. The Dispatcher 1218 accordingly creates an InsertDocumentHandler 1234 for the PatientRegistration 1232. The InsertDocumentHandler 1234 creates a RecordInserter 1236 for the table named in the DocumentRecord 1206. That RecordInserter 1236 creates RecordInserters for each RelatedRecords 1208 that is child to the DocumentRecord 1206. Each RecordInserter 1236 in turn creates RecordInserters for any RelatedRecords 1208 that is child to the corresponding RelatedRecords 1208. Each RecordInserter 1236 holds the prepared statement to insert records into a particular table. The complete prepared statement is determined by the RecordDef 1210 for that RecordSets 1216.

The RecordDef 1210 for the top record—the patient record—is enriched using a UniqueId enrichment, indicating that the patient should be assigned a new internally unique identifier.

Figure 12C:
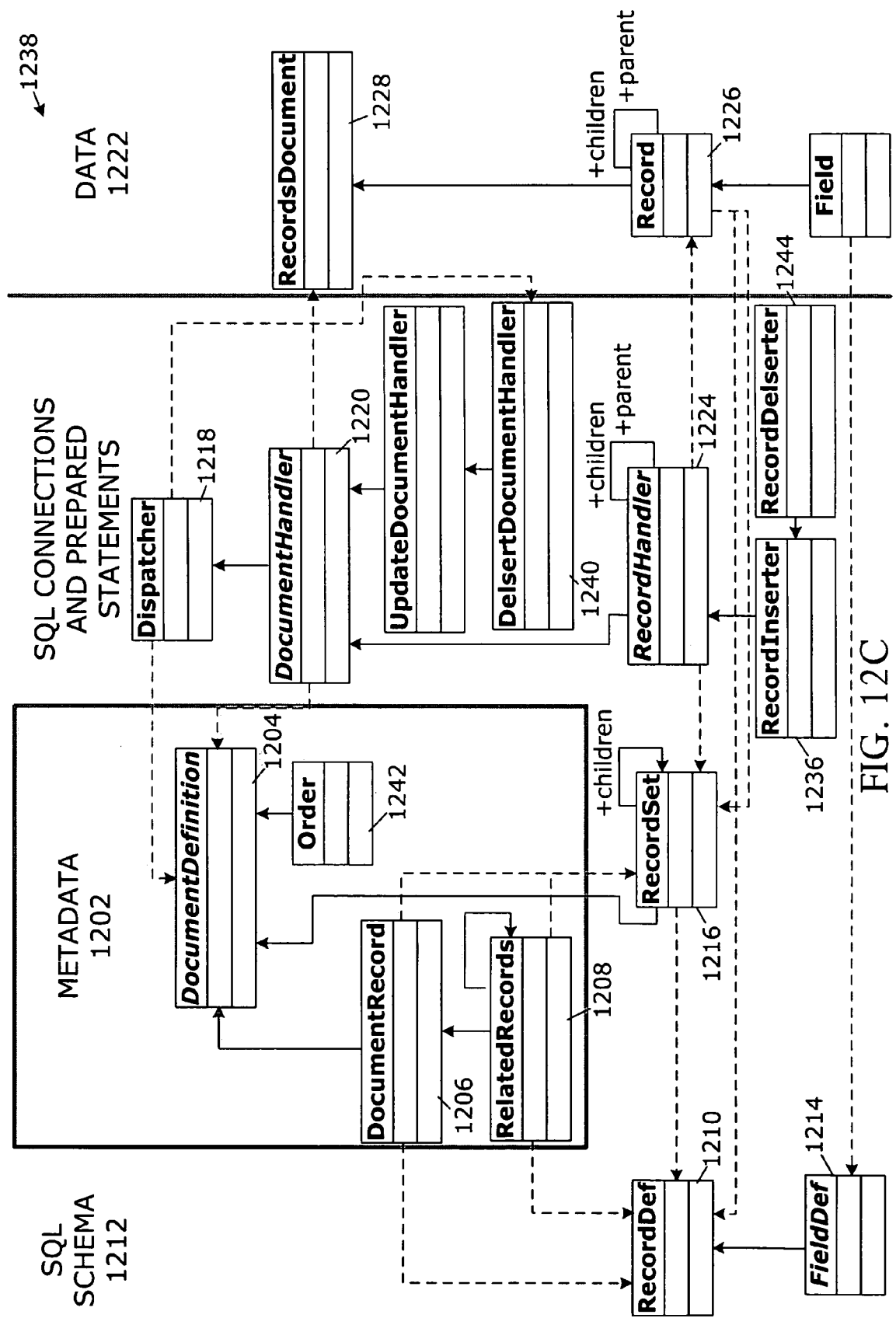

Referring to FIG. 12C, a UML diagram depicts an embodiment of a Delsert diagram 1238. The diagram 1238 shows concrete classes used to "Delsert" a document. Delsert is a contraction of "delete and insert" and is used when a document is a complete replacement for a previous instance of a particular document.

The example illustrates processing of a sales order document. The Dispatcher 1218 obtains a DelsertDocumentHandler 1240 for an Order document. The DelsertDocumentHandler 1240 first deletes rows associated with any previous version of the Order 1242. If the order is not previously in existence, the DelsertDocumentHandler 1240 simply inserts the new order. The DelsertDocumentHandler 1240 does not replace the previous document, however, if the order is more recent than the document currently received. Due to latencies, documents can be received out of order.

The DelsertDocumentHandler 1240 creates a RecordDelserter 1244, which creates child RecordDelserters, grandchildren, and the like. The RecordDelserter 1244 contains a prepared delete statement in addition to the prepared insert statement inherited from the RecordInserter 1236.

The order 1242 also updates a history table that tracks schedule changes in the line items of the order. The HistoryRecord metadata class, a subclass of RelatedRecords 1208, instructs the parent RecordDelserter 1244 to create a RecordInserter 1236 instead for that one table.

Figure 12D:
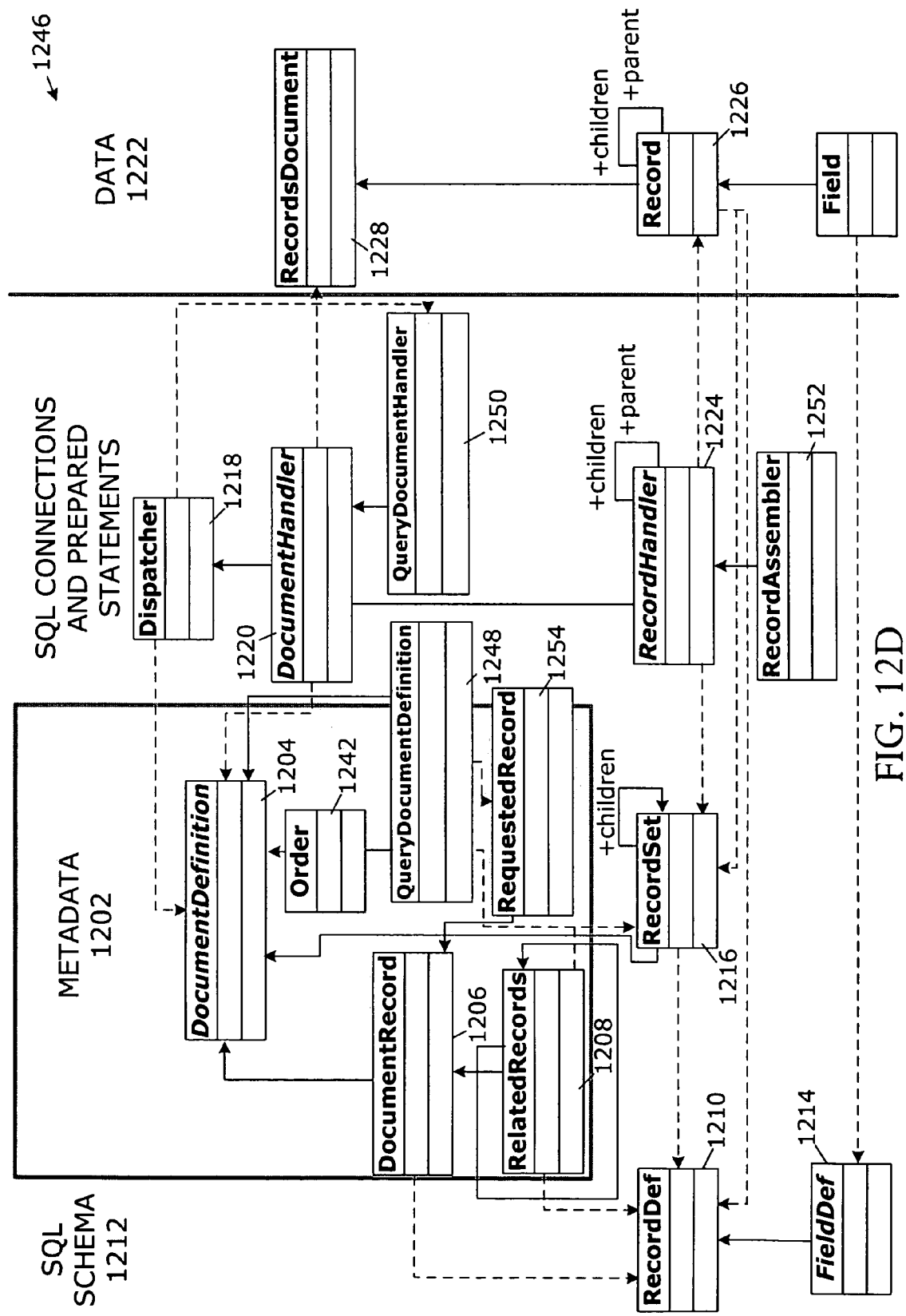

Referring to FIG. 12D, a UML diagram illustrates an embodiment of a query diagram 1246. The query diagram 1246 shows concrete classes used to query a document. Although not shown in FIGS. 12A through 12C, the real time information director automatically creates a QueryDocumentDefinition 1248 for each update document that is defined by a customizer. The QueryDocumentDefinition 1248 defines input criteria for the query, and has a reference to the corresponding update document definition that defines the content to be returned. The query diagram 1246 shows how the same user-specified metadata 1202 is used to define both inbound and outbound data; both updates and queries.

A document is returned as a result of each update that satisfies the XML schema 1212 of the corresponding query document definition. The query document definition contains keys of the updated document. If the same document is submitted to the real time information director as input, a query operation is triggered, returning all data related to the topic. The document has a top level tag that is the same as the corresponding update document, except that "_R" is appended to the name. The "_R" identifies a response to an update or a request for a query.

In the example, the inbound document is an order query. The top tag in the document is ORDER_R. The Dispatcher 1218 obtains a QueryDocumentHandler 1250 corresponding to this document. However, the QueryDocumentHandler 1250 is not created from the QueryDocumentDefinition 1248, but from the Order document definition 1242. The QueryDocumentHandler 1250 creates a RecordAssembler 1252 which creates child RecordAssemblers, grandchildren, and the like. The RecordAssembler 1252 contains a prepared select statement with clauses determined by the enriched RecordDef 1210.

The QueryDocumentDefinition 1248 contains a RequestedRecord 1254 in place of the DocumentRecord 1206. RequestedRecord 1254 is a subclass of DocumentRecord 1206. RequestedRecord 1254 creates a dedicated RecordDef 1210 that does not correspond to a physical record in the database 1222. For every update document a QueryDocumentDefinition 1248 is automatically created. The automatically generated RequestedRecord 1254 has columns that correspond to the keys of the table referenced by the DocumentRecord 1206 of the update DocumentDefinition 1204.

The customizer may not allow queries of selected documents. Two sets of options may be customizer-specified in the default constructor of a concrete DocumentDefinition 1204. One applies to the update document. Another applies to the query document. "Invalid" can be included in either set of options to indicate that the update or the query is invalid.

The customizer may also explicitly create a QueryDocumentDefinition 1248 by writing a subclass of QueryDocumentDefinition 1248 with a default constructor. The constructor references an existing update DocumentDefinition 1204 to define contents to be returned by the query. The QueryDocumentDefinition 1248 must include a RequestedRecord 1254 in place of the DocumentRecord 1206.

Figure 12E:
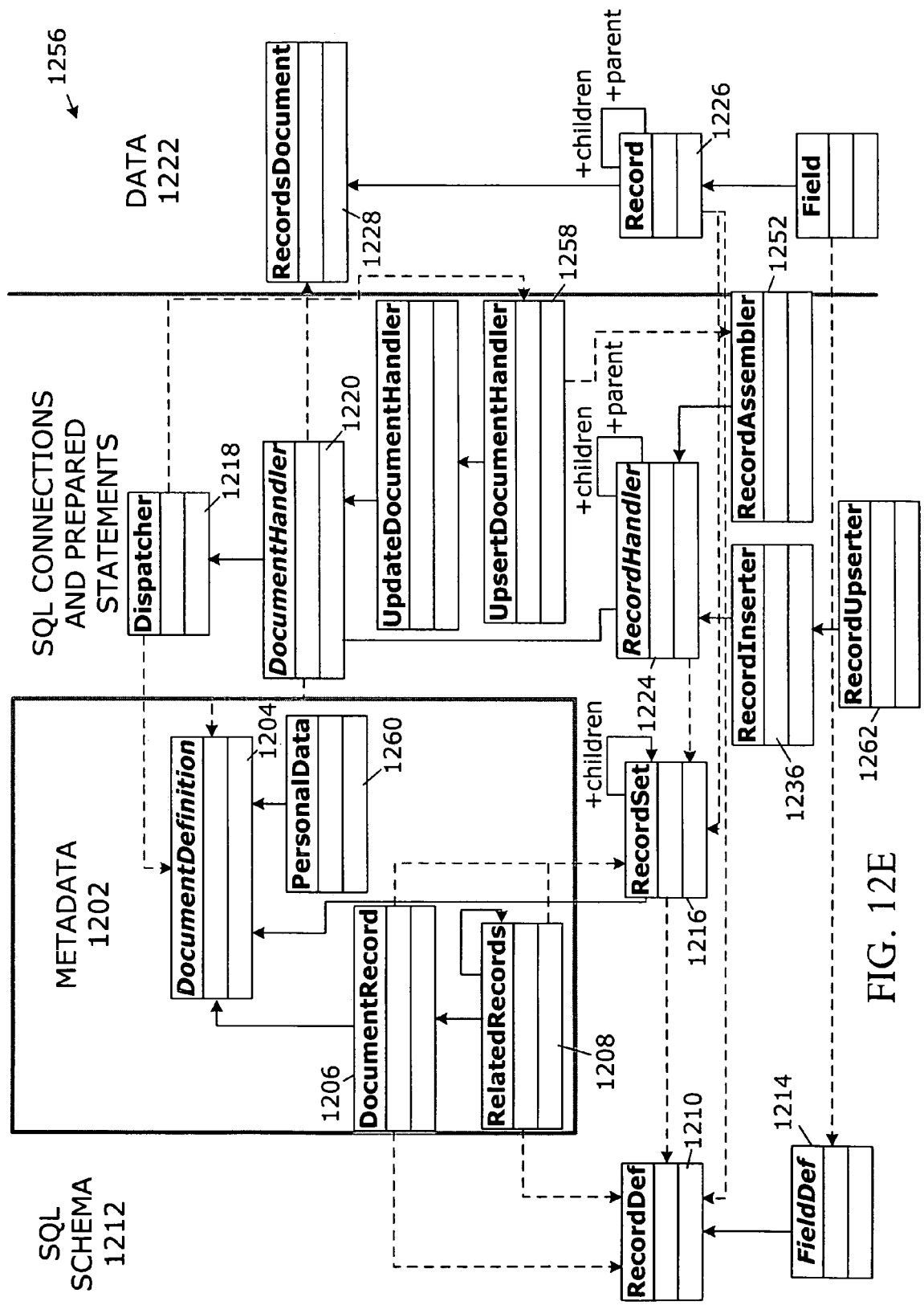

Referring to FIG. 12E, a UML diagram shows an embodiment of an Upsert operation 1256 including concrete classes used to "Upsert" a document. Upsert is a contraction of "update or insert" and is an operation used when a document adds to existing information on a subject without necessarily representing all information on that subject.

In the illustrative case a personal data document is processed and contains information including name, addresses, telephone numbers, dependents, and the like for some customer or patient. The Dispatcher 1218 obtains an UpsertDocumentHandler 1258 for a PersonalData document 1260. The UpsertDocumentHandler 1258 first fetches all existing personal data for the person from the database 1222. The fetched data is compared with the data in the inbound document. Any rows found to be new to the inbound document are inserted into the database 1222. Any rows found to be changed are updated to the database 1222. No further operation against the database 1222 is taken for rows that are unchanged or are omitted from the inbound document.

The UpsertDocumentHandler 1258 creates a RecordUpserter 1262, which creates child Upserters, grandchildren and the like. The RecordUpserter 1262 contains a prepared update statement, in addition to the prepared insert statement inherited from the RecordInserter 1236. The UpsertDocumentHandler 1258 also creates a RecordAssembler 1252 that enables reading of the current data for the document.

Some enrichments analyze both the old and new data when upserting a document. For example, aggregate enrichment causes totals, counts and other aggregates to be rolled up to a parent record. Aggregate enrichment includes both new and existing rows. The instance-ID enrichment monitors instance-IDs in use by old child records before assigning instance-IDs to new sibling records.

Figure 13:
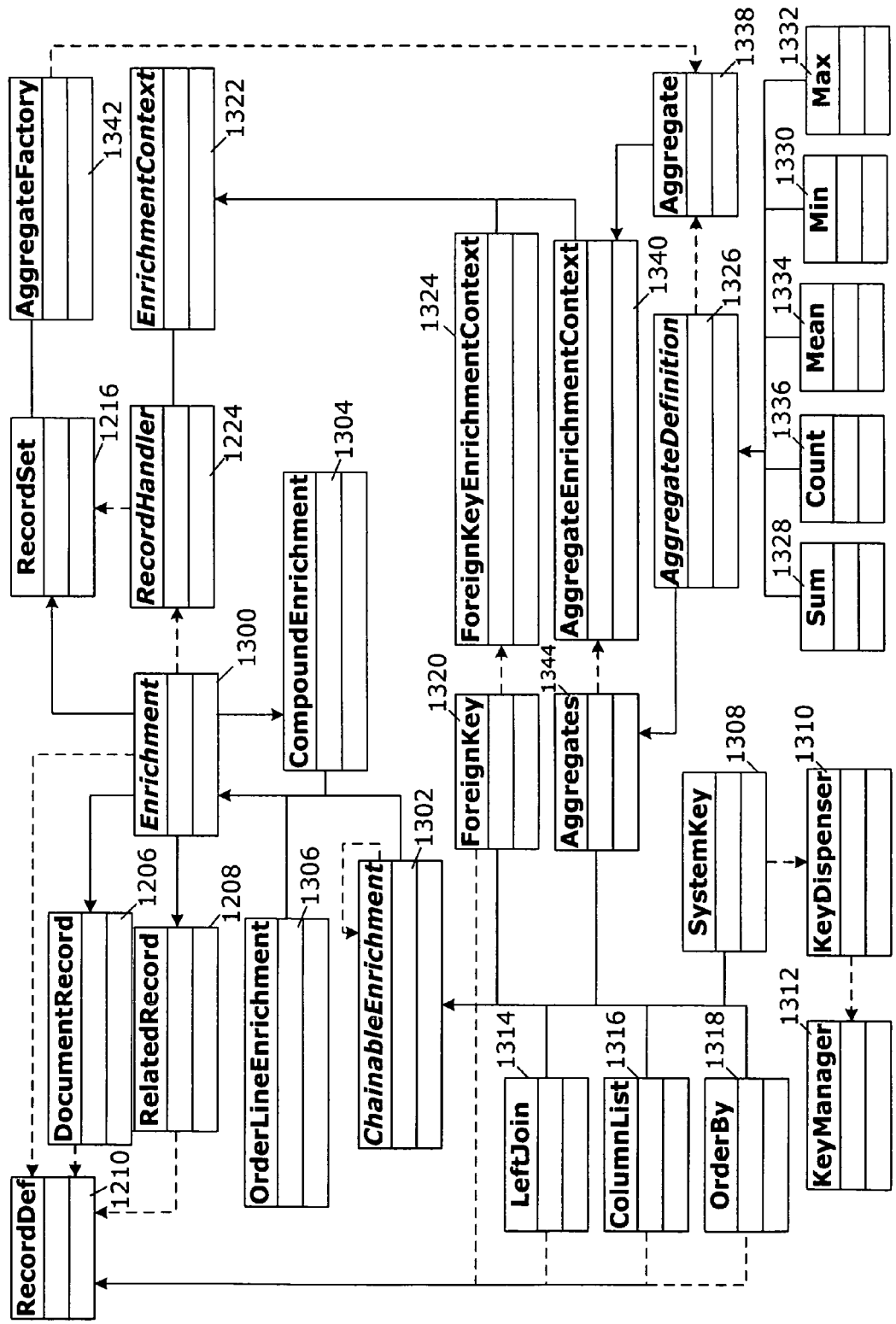
FIG. 13 is a Unified Modeling Language (UML) diagram that illustrates various enrichment classes.

Referring to FIG. 13, a Unified Modeling Language (UML) diagram is shown that illustrates various enrichment classes. Both the DocumentRecord 1206 and the RelatedRecords 1208 classes, along with associated subclasses, contain an optional Enrichment 1300. Enrichment is an abstract class. Enrichments can be combined in two ways. First, all standard enrichment classes are subclasses of the abstract Enrichment subclass, ChainableEnrichment 1302, enrichments that can be chained by nesting each within an enclosing enrichment. Second, the customizer may construct a CompoundEnrichment 1304, and pass an array of Enrichments to CompoundEnrichment 1304.

Enrichment defines multiple template methods that are called at various points during program execution. The template methods are passed various pieces of information. The concrete enrichment classes can implement any of the template methods.

An enrichInbound method is passed a Group object after the real time information director has parsed the XML document. The Group object contains a hashtable of string values that can be obtained by the name of the column. A column that is not present in the input, is not present in the hashtable. The Group also contains a vector of Groups representing the children of the Group.

OrderLineEnrichment 1306 is an example of a custom enrichment class that implements enrichInbound and is passed the group representing an order line. OrderLineEnrichment 1306 reconciles information between the order line and various schedule line details found in its child groups.

SystemKey 1308 is a standard enrichment that implements enrichinbound and is passed a KeyDispenser 1310. KeyDispenser 1310 dispenses unique 64-bit numbers for keys to a record. If several document definitions use the same set of system-generated keys, KeyDispenser is constructed once in your metadata classes and has all the document definitions referring to the same KeyDispenser 1310. The KeyDispenser 1310 uses the KeyManager 1312, a singleton class. The KeyManager 1312 allocates a block of keys for the KeyDispenser 1310 and reads and updates the system keys table to ensure that no two instances of the real time information director allocate the same key values. The block of keys is sized sufficiently large so that calls to the KeyManager 1312 are infrequent, otherwise multiple threads of DocumentHandlers and real time information director instances are likely to block while waiting on the KeyManager 1312.

The enrichRecordDef method is passed a RecordDef 1210 and returns a RecordDef 1210. The method enables the enrichment to replace the RecordDef 1210 with an enriched RecordDef 1210. The enrichment is called when the metadata is constructed. LeftJoin 1314, ColumnList 1316, OrderBy 1318, and ForeignKey 1320 are examples of standard enrichments that implement enrichRecordDef When the enrichments are compound or chained, the RecordDef 1210 can be replaced multiple times.

Some Enrichments 1300 have a defined context or state. For example, an enrichment may use a prepared SQL statement. The Enrichments 1300 are instantiated as part of a DocumentDefinition 1204, within the corresponding RecordSets 1216. The Enrichments 1300 cannot hold state because multiple threads, DocumentHandlers, can concurrently use the same DocumentDefinition 1204. Therefore, each RecordHandler 1224 has an array of EnrichmentContexts 1322. One of the template methods that an enrichment 1300 may implement is instantiateEnrichmentContext. The method is called at the time that a RecordHandler 1224 is created for a new DocumentHandler 1220. The RecordHandler 1224 is passed to the instantiateEnrichmentContext method. An enrichment that uses state constructs the particular EnrichmentContext 1322 subclass, and calls the addEnrichmentContext method of the RecordHandler 1224 to store the state.

The diagram shows two contextual enrichments including ForeignKey and Aggregates, each of which has a corresponding enrichment context class.

The EnrichmentContext 1322 has template methods enrich and enrich2. Each is passed a Record. Records are generated from the Groups after parsing of the inbound document is complete. Unlike a Group, which only contains named Strings, a Record includes an array of Fields, each with specific data type information, obtained from the database or from enrichments that enrich the RecordDef 1210. A field can obtain a value from the corresponding Group, or from any ancestor Group that has a named value corresponding to the name of the field.

In the UpsertDocumentHandler 1258, enrich is called before the previous data is read from the database. Enrich2 is called after the previous data is merged from the previous document. ForeignKey 1320 implements enrich to resolve the enrichment before reading old data. Aggregates and InstanceId implements enrich2 because the aggregates and instance IDs take into consideration all the data, both new and old.

ForeignKeyEnrichmentContext 1324 contains the prepared statement used to lookup the internal ID of a referenced record using the external IDs passed in the inbound document. ForeignKeyEnrichmentContext 1324 also contains the prepared statement used to lookup the external ID of a referenced record using the internal ID for an outbound document. The enrichment is often used when the referenced record has an artificial key, assigned using the SystemKey enrichment 1308 in some other document. The enrichment has other uses. For example, a patient event can be stored in the database with the system key of the patient. But the patient event document uses the external ID of the patient. The ForeignKey enrichment 1320 substitutes the system key for the external ID in the inbound document, and vice-versa in the outbound document, by reading the Person table that catalogues all the external ID/system key mappings.

The Aggregates enrichment 1344 contains an array of AggregateDefinitions 1326 that have names reflecting common aggregate functions, such as Sum 1328, Min 1330, Max 1332, Mean 1334, and Count 1336. The Aggregates enrichment 1344 instantiates the AggregatesEnrichmentContext 1340 and uses the AggregateFactory 1342 in the RecordSets 1216 to construct an Aggregate object 1338 from each AggregateDefinition 1326, to populate the AggregatesEnrichmentContext 1340.

Figure 14:
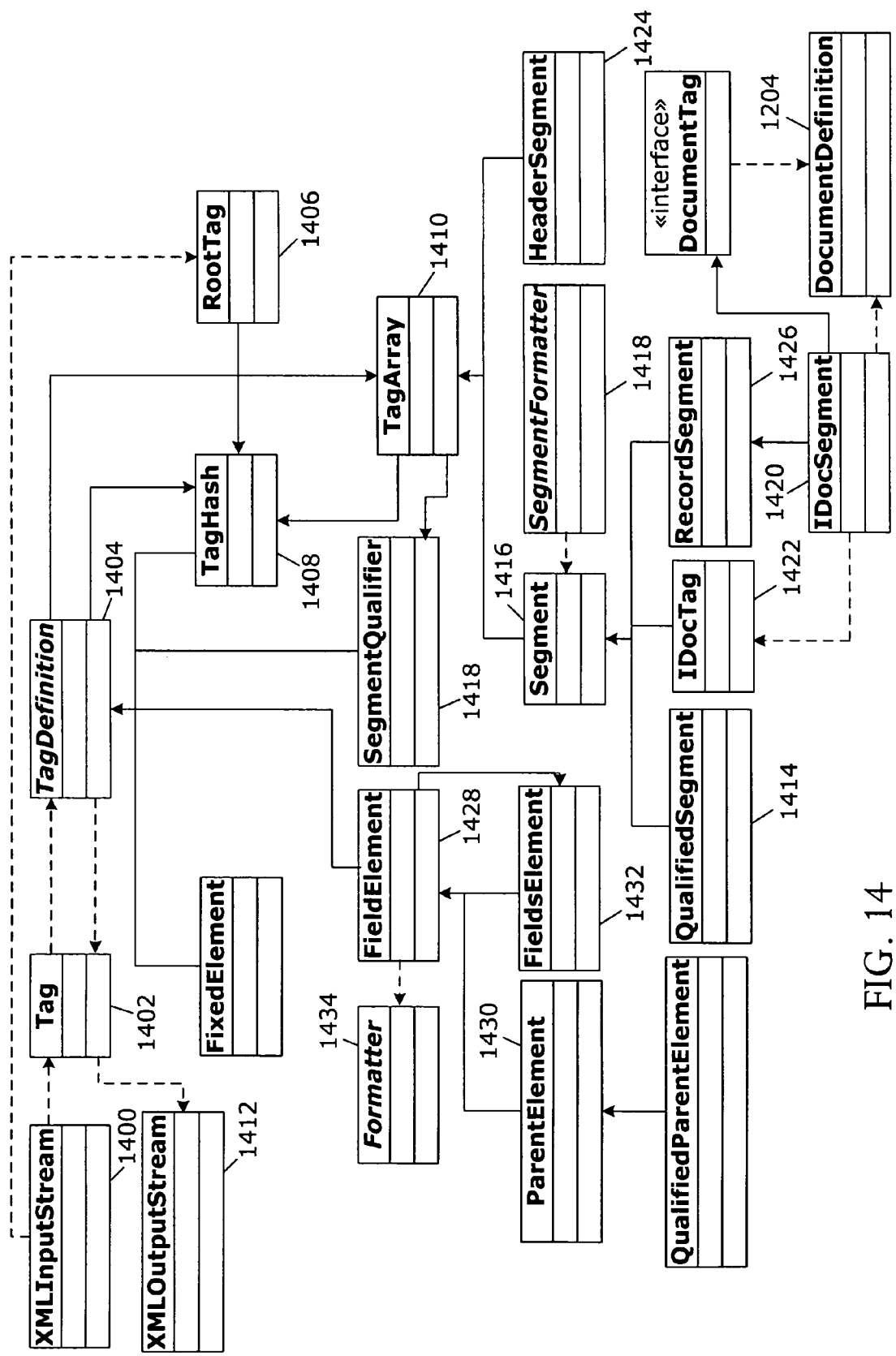
FIG. 14 is a UML diagram illustrating an embodiment of IDoc format metadata that depicts a technique for implementing format metadata for Systems, Applications, and Products (SAP) IDocs.

Referring to FIG. 14, a UML diagram illustrates an embodiment of IDoc format metadata, depicting a technique for implementing format metadata for Systems, Applications, and Products (SAP) IDocs.

The XMLInputStream 1400 scans an input stream for eXtended Markup Language (XML) begin and end tags. Each begin tag causes a Tag object 1402 to be pushed onto a stack. Each end tag causes a Tag 1402 to be popped off the stack. Each Tag 1402 is associated with a TagDefinition 1404 at the time the tag 1402 is pushed onto the stack. The stack is initialized with a Tag that points to RootTag 1406.

RootTag 1406 is a TagHash 1408 and contains all the top level tags that have been identified in all document definitions. Each DocumentDefinition 1204 causes an associated top tag to be added to RootTag 1406.

When a tag is pushed onto the stack, a corresponding TagDefinition 1404 is searched by name from the TagHash 1408 that is associated with the last defined Tag pushed onto the stack. If no matching TagDefinition 1404 is found, then the new tag is considered undefined. Subsequent tags skip over the undefined tag when searching for the definition, thus treating undefined tags as non-existent tags.

TagDefinitions 1404 for complex elements, for example segments in IDoc terminology, derive from TagArray 1410. TagArray 1410 contains an ordered list of TagDefinitions 1404, in addition to the hash table inherited from TagHash 1408. The list order determines the order in which tags are written to an XMLOutputStream 1412.

Tags for simple elements derive from TagDefinition 1404 without inheriting from TagHash 1408 or TagArray 1410. No tags can be nested under simple elements.

QualifiedSegment 1414 is Segment 1416 having a TagArray 1410 populated with SegmentQualifiers 1418. SegmentQualifier 1418 contains a dedicated internal TagArray 1410, which defines elements for the QualifiedSegment 1414 when the Qualifier applies. The QualifiedSegment 1414 searches associated SegmentQualifiers 1418 after parsing the first nested tag, uses, then replaces the associated definition on the stack with the TagArray 1410 associated with the SegmentQualifier 1418, altering handling of subsequent tags within the segment.

The top tag in any IDoc is declared as an IDocSegment 1420. The top tag associates the document with a DocumentDefinition 1204. The IDocSegment 1420 always contains an IDoc tag 1422, for example <IDOC BEGIN=1>. The IDocSegment 1420 constructs the IDoc tag 1422 automatically. Under IDoc Tag 1422 is HeaderSegment 1424, for example <EDI_DC40>. After parsing HeaderSegment 1424, the HeaderSegment 1424 passes to the DocumentDefinition 1204 to determine whether fields in the header match the criteria for any registered variants of the document. If so, the IDocSegmentTag is replaced on the stack with the IDocSegmentTag for the variant document in a process similar to that performed by a QualifiedSegment 1414.

RecordSegment 1426 and associated subclass IDocSegment 1420 are associated with a physical table. When the document definition is instantiated, RecordSets generated from the content metadata, for example DocumentRecord and RelatedRecords, are cross-linked to the RecordSegment tag. Each time a RecordSegment 1426 is parsed, a new Group is constructed, and made a child of the last Group triggered by a parent RecordSegment 1426.

FieldElement 1428 causes a string value to be added to the hash table in the Group. The key under which the string is stored is the name of the table column identified in the metadata. The value of the string is parsed from the element. ParentElement 1430 is similar, except that the string is put into the hash table of the parent Group. FieldsElement 1432 causes the same value to be put into the Group under multiple names. Other format metadata classes perform similar variations. A FieldElement 1428 may have a Formatter object 1434. Formatter 1434 is an abstract class. Concrete formatters modify the string that is put into the hash table in various ways.

TagDefinition 1404 has a number of template methods that are called by XMLInputStream 1400, such as begin that is called when the begin tag is parsed, data that is called when the data of an element has been output, and end that is called when the end tag is parsed. The tag is passed on all of methods. The tag has a pointer to the next tag on the stack. All of the behaviors described above are implemented by overriding these template methods in the various subclasses of TagDefinition 1404. Each of the TagDefinition 1404 classes manipulates the tag and/or the tag stack in various ways.

Segments may have a SegmentFormatter 1418, another abstract class. Custom SegmentFormatters can modify the contents of the Group in unlimited ways. SegmentFormatters are called after the end tag of the segment has been parsed.

TagDefinitions 1404 write tags to an XMLOutputStream 1412. The TagDefinition 1404 has a template method called assemble that is passed the tag and the XMLOutputStream 1412. Each TagDefinition 1404 contains information for writing a corresponding tag. TagArrays 1410 write each element or nested group in the Group, in the order specified by the TagArray 1410. Formatters 1434 and SegmentFormatters 1436 are called during tag writing to undo the operations that are performed on the inbound document, if possible.

In an illustrative embodiment, real time information director (RTID) metadata can be mostly implemented in Java. As an object-oriented language, Java supports polymorphism. Descriptive metadata is usually expressed as parameters passed to Java constructors. A constructor in Java is invoked using a new statement. The constructor for each metadata class has parameters applicable to that object. For example,

```
new Circle(16);        // diameter = 16
new Rectangle(10, 8);  // length = 10, width = 8.
```

New statements can be written or modified that define the metadata. A behavior is implemented within the other methods of each metadata class. Implementation of the behaviors is transparent to a user.

Systems can be implemented with metadata written in Java. In Java implementations, procedural code is not written. The main Java statement is new and the statements are relatively concise. Java metadata enables rapid evolution since metadata is represented in the language of implementation, facilitating enhancements and response to special requirements.

Alternatively, metadata can be represented in eXtended Markup Language (XML), which is also polymorphic. However, XML describes but does not implement behavior so that implementation or translation to another language, such as Java, would extend development time without avoiding complexity.

The illustrative Real-Time Supply Chain (RTSC) uses two kinds of metadata including content metadata and format metadata. Baseline metadata definitions map to a baseline data model and may be extended to support specific implementations. Extensions may be implemented to create native documents for new or existing data models, create a new Interchange Document (IDoc) mapping that is not included in the baseline, and map a single IDoc type multiple times for integrating different SAP source systems. Additional purposes for implementing extensions include complying with XML Schema validation, inserting additional formatting and/or unformatting to an existing mapping, capturing additional information in the data store, possibly leading to modification of the data model. Extensions may be further implemented to adapt to changes in database schema or data model, for example, adaptations to changes in table column names, table primary keys. Similarly, extensions can be implemented to address new tables in the data model for a document.

Various suitable techniques may be used to extend metadata. In one example, the data model is optionally updated on the NonStop server to enable usage of new documents and changes to an existing data model. Changes can be made to metadata, for example using a Java Interface Development Environment (IDE) on a workstation. Metadata is compiled and tested on the workstation, for example using a stand-alone test program. The new metadata is deployed to the real time information director (RTID) server. Monitoring of a real time information director log on the NonStop server enables analysis and verification of metadata operation.

Creating a New Native Document Mapping

The real time information director can generate native documents as eXtended Markup Language (XML) representations of data in the NonStop SQL database. Typically the native documents are used by an application that consumes data from the NonStop SQL database, such as subscriber applications. Consumers of native documents can use the XML Schema for native documents to validate received documents.

Metadata for a new native document can be created by determining whether inbound documents are delserted or upserted, and determining information to be accessed from the database. Information to be accessed is determined by identifying the tables, and the relationship between the tables, that contain the desired data. Metadata is further created by forming the data model if not currently in existence. For example, a native document can use the data model for an IDoc. Once the data model is formed, the XML Schema is created for the native document.

For inbound native documents, the real time information director (RTID) determines whether documents are delserted or upserted into the database. If the input documents always contain complete information, for example for different versions of the same document, the current document is a superset of the older versions of the document, then the document is appropriately delserted. In a delsert operation, the real time information director first deletes all existing records related to the current document, and then inserts the current document into the RTSC data store.

However, delsert does not delete records inserted in historical tables, including tables defined with HistoryRecord in the content metadata. The purpose of the historical table is to accumulate a historical trail for all transactions, implying that inbound data contains unique values for the primary key columns of the historical table. In the historical view relationship, a table always accumulates records, as opposed to event tables in which data can be updated or deleted. The same records that are updated in event tables are accumulated in historical tables, thereby forming an historical view of the data.

If the input documents are updates, for example for different versions of the same document so that the current document contains different data than the older versions of the document, then the document is appropriately to upsert. In the upsert operation, the real time information director updates any existing records related to the current document. If no such records exist, then the current document is inserted.

Once the mapping information exists, metadata is created by creating a new Java class in a suitable package, for example com.hp.rtsc.documents. The class is conventionally but optionally named after the document name. For example, for creation of metadata for a native INVOICE document, the name of the Java file can be "NativeInvoices.java". The new Java class extends the NativeDocumentDefinition class. The call to the superclass constructor may include a string of options. No two documents can have the same top-level tag.

Once the new Java class is created, Java metadata objects are created for tables that have been analyzed, first by creating document content metadata objects (DocumentRecord, RelatedRecords, SplitRecords or HistoryRecord.), then creating Links objects to describe fields used to join two tables.

After creation of the new Java class, the Java source file is compiled, tested, and updated Java class files are deployed to the RTSC runtime environment according to instructions described herein for compiling metadata and deploying Metadata sections. To test inbound native documents, a dispatch and/or reselect program may be used. To test outbound native documents, a Select stand-alone program may be used. To test both inbound and outbound native documents, a Reselect program may be used.

An XML Schema can be created for the native document using an Export utility.

Creating a New Interchange Document (IDOC) Mapping

To create metadata for a new IDoc that is not handled by the RTSC baseline, the information being captured is analyzed and the data model is updated to hold the additional information. As for a native document, whether inbound documents are delserted or upserted is determined. The mappings to be created to store the information in the data store is analyzed and determined, fundamentally to identify elements in the document to be mapped to particular columns in the database.

When an IDoc mapping is created for the first time, a Base Document is also created, defining for the first time the content and format metadata suitable and appropriate for the IDoc. The data model appropriate for the content metadata is also created.

Once the mapping information is available, multiple actions can be performed to create the metadata. In one embodiment, a new Java class is created, for example in a package com.hp.rtsc.documents. Conventionally but optionally, the class is named after the IDoc name. For example, metadata created for an ORDERS05 IDoc can be named the Java file "Orders05.java". The new Java class extends the BaseDocumentDefinition class. The call to the superclass constructor may include DocumentDefinition.UPSERT. No two documents can have the same top-level tag except for variant IDocs.

In a second action of the illustrative embodiment, Java objects are created for the analyzed mappings. Document format metadata objects (IDocSegment, RecordSegment, FieldElement, and the like) are created along with content metadata objects (DocumentRecord, RelatedRecords, SplitRecords), and Links objects that describe fields used to join two tables.

In a third action of the illustrative technique, the Java source file is compiled, tested, updated Java class files are deployed to the RTSC runtime environment in accordance with instructions for compiling and deploying metadata described hereinafter. To test inbound IDocs, a dispatch or reselect program can be used. To test outbound IDocs, a Select stand-alone program can be used. To test both inbound and outbound IDocs, a Reselect program can be used in accordance with the description for testing metadata.

Resolving Conflicts Between Source Systems

Mappings for an IDoc type typically already exist, for example ORDERS05 IDoc. Mappings include content and format metadata, and are based on an existing data model. A different mapping for the same IDoc type may be desired, for example in a case that inbound documents come from different SAP source system.

Different SAP source systems may have different mappings for the same IDoc. For example, two SAP instances can generate ORDERS05 documents with differences in data. In one instance, the documents may have a different top tag, ORDERS05 versus ORDERS05EXT. The real time information director presumes that the documents are two different IDocs since the top-level tag identifies the metadata for a particular IDoc. In another instance, the documents have the same top tag but different mappings. The real time information director presumes the two documents are the same IDoc, since the top-level tag is the same. However, the documents should be handled differently because the mappings are not the same.

Regardless of the source system from which the real time information director receives the IDoc, the correct mappings are to be used to load the data in the database. The data stored in the database should look the same, regardless of the SAP source.

A new document definition is chosen as an alias or variant. The differences between different SAP source systems is analyzed and determined by obtaining sample IDocs and analyze differences. If the IDoc top tag is different than the top tag of the base document mapping, then a Variant Document Definition is created. If the IDOC top tag is the same as the top tag of the base document mapping, then an Alias Document Definition is created.

The Alias or Variant Document Definition mappings are created using the same actions as are used for creating a new IDoc mapping. However, some actions can be eliminated since a base document definition already exists that can serve as a starting point. Beginning with the base document definition, a new mapping is created. For example, the file Orders05.java can be copied and written to a file, for example named Orders05EXTjava. Assuming the top tag is different from the base definition top tag, then Orders05EXTjava can be edited and the class definition changed to extend AliasDocumentDefinition instead of BaseDocumentDefinition. The top-level tag can be changed to ORDERS05EXT in a form, as follows:

```
private static final IDocSegment idocSegment =
    new IDocSegment("ORDERS05EXT", "SALES_ORDER",
    new Segment[ ] {
    IDOC.HEADER,
    ...
    }
```

The definition of the DocumentRecord content metadata is removed. Instead, the superclass constructor with the name of the base document which contains the content metadata on which this IDoc is based is called, for example "ORDERS05". Then Orders05EXTjava source file is compiled, tested, and the updated Java class files are deployed to the RTSC runtime environment according to instructions herein for compiling metadata and deploying metadata sections.

To test inbound IDocs, Delsert or Disassemble stand-alone programs are used. To test outbound IDocs, the Select stand-alone program is used. To test both inbound and outbound IDocs, the Reselect program is used in accordance with the metadata testing instructions described herein. The mapping can be tested with both base document sample IDocs (ORDERS05) and with the new alias sample IDocs (ORDERS05EXT). Similar steps can apply to create a VariantDocumentDefinition subclass.

Passing XML Schema Validation

Metadata may be insufficient, without modification, to enable validation of documents generated by the real time information director against the XML Schema for a particular IDoc. An XML Schema file can be used to verify that an XML file is valid. Content of Markup Language (ML) documents generated by the real time information director depends on the order in which the format metadata is defined.

Validation of an XML document against the XML Schema can be implemented using multiple actions. First, IDoc schemas are obtained from the SAP website. The schema is saved as an .XSD (XML Schema Definition) file. Second, a sample XML IDoc file is generated with the Real time information director (RTID) using the Select standalone program in accordance with the metadata testing description herein. Third, the XML IDoc file is opened using XML Spy. The file can be viewed in "Schema/WSDL Design view" mode. Fourth, the schema obtained from the first action is assigned to the XML document. For example, from XML Spy main menu, DTD/Schema->Assign Schema . . . is selected to assign the schema. Fifth, the XML file is validated. For example, from XML Spy main menu, "XML->Validate" is selected to validate the file. Sixth, error messages, if any, suggest metadata modifications. For example, current format metadata may generate the output file with the XML sequences in the wrong order so that the metadata is to be rearranged in the order defined by the XML Schema to pass the validation. Seventh, the format metadata is modified according to the error messages. Eighth, the Java source file is compiled, tested, and the updated Java class files are deployed to the RTSC runtime environment in accordance with instructions for compiling metadata and deploying metadata sections described herein. To generate outbound IDocs in accordance with the second action, the Select stand-alone program can be used in accordance with the metadata test description herein. Ninth, the third to eighth actions are repeated until the XML IDoc passes the XML Schema validation.

Adding Formatters to the Existing Mapping

Inbound IDoc data may contain values that are not stored in the database in the same format. One example is numeric values with leading zeros, and date or date-time fields that are formatted differently than SQL date or SQL date-time fields. For the real time information director to generate outbound documents from the database in the same format as the inbound documents, formatter metadata objects are specified.

An example of an element using the formatter object is a definition in Orders05.java, which uses a predefined formatter:

New FieldElement("POSEX", "SALES_ORDER_ITEM_NO", IDOC.ITEM_NO);

The predefined formatter ITEM_NO is defined in IDOC class as:

Formatter ITEM_NO=new LeadingZeros(6);

The class com.hp.rtsc.documents.IDOC defines the most commonly used formatters. Depending on the suitable formatting/un-formatting, the constructor of the Java object is modified to specify the formatter object. If the baseline does not include a suitable formatter object, a custom formatter can be created that subclasses the class com.hp.rtsc.metadata.formatters.Formatter.

Usually differences are apparent in comparison of inbound IDocs with outbound IDocs generated by Select or Reselect stand-alone programs. The Reselect program is useful for comparison tests because the program inserts a document into database and selects the same document from the database. Then, on comparison of the two documents, differences and the type of formatters to be added become apparent. Details of the comparison and response are disclosed in the metadata testing description hereinafter.

Extending Data Store

Several actions are performed prior to updating metadata to capture additional information in the data store. Information to be captured is analyzed. Changes are made to the data model to hold the additional information. Mappings are analyzed, designed, and created to appropriately store the additional information in the data store.

Once the new mapping information is configured, the data store can be extended by opening the Java source file for the IDoc metadata mapping class. For example, to extend the ORDERS05 document, com\hp\rtsc\documents\Orders05.java file is edited. For each new element in the IDoc is to be captured in the data store, a statement is inserted to create the Java object that describes the mapping for the particular element. Inserted and added elements are check to ensure entry to the correct parent segment. For example, the following statement creates a FieldElement in the E1EDP01 segment, to map the "VPREI" element to the "NET_PRICE_AM" column in the database:

New FieldElement("VPREI", "NET_PRICE_AM").

The Orders05.java source file is compiled, testes, the updated Java class files are deployed to the RTSC runtime environment according to instructions for compiling metadata and deploying metadata sections herein.

To test the new mappings, first Disassemble is called, then Delsert stand-alone programs. Disassemble generates the output Records file containing data in format for insertion into the database. If the Records file is correct, Delsert is used to actually insert sample IDocs into the database, using the new mappings. The database is queried to ensure data is inserted correctly.

Changing Metadata Mapping

If any baseline mappings are not applicable to the implementation, metadata can be updated to suit the applications. Business characteristics are analyzed to determine suitable and appropriate mappings. The data model is modified according to the business characteristics. Once the mapping information is developed, multiple actions are performed to change the metadata. First, the Java source file for the IDoc metadata mapping class is opened. For example, if the metadata for the ORDERS05 document is updated, com\hp\rtsc\documents\Orders05.java file is updated. Second, for individual elements in the IDoc for which the mapping is to be changed, the Java object that relates to that element is located and changes made. For example, to map the element to a different column in the database table, the field name that is mapped to the IDoc element is updated. Similarly, to change a SegmentQualifier for a given element, SegmentQualifier is updated with the new qualifier. To add a new SegmentQualifier, the QualifiedSegment associated with the SegmentQualifier is located and a new SegmentQualifier is added. Third, the Orders05.java source file is compiled, tested, and the updated Java class files are deployed to the RTSC runtime environment in accordance with instructions for compiling metadata and deploying metadata sections described hereinafter. To test inbound IDocs, Delsert or Disassemble stand-alone programs are used. To test outbound IDocs, Select stand-alone program is used. To test both inbound and outbound IDocs, Reselect program is used in accordance with metadata testing described herein.

SQL Schema Updating

For conditions and circumstances for which SQL Schema updating is desired, for example, column name changes, primary key changes, data type changes, and the like, metadata is also checked and updated. For example, if the name of a table column that is mapped to an IDoc element is changed, the Java object definition of the metadata element is also updated to specify the new column name. After editing of the Java source and updating of the metadata mappings are complete, the Java source file is compiled and the updated Java class files deployed to the RTSC runtime environment according to instructions for compiling and deploying metadata. Some SQL Schema changes to existing tables, such as adding or dropping a column to the primary key, call for restarting the real time information director (RTID) server.

Compiling Metadata

Metadata can be modified on a computing system of various types, for example a workstation, using a Java IDE or even Notepad. The Java IDE may be used to compile the metadata or a command-line compiler. In one embodiment, a process for compiling metadata includes actions of opening a DOS window, changing directory to the RTSC install directory, for example c:\rtsc, setting up an environment by running a c:\rtsc\bin\setenv.bat file, and compiling the metadata source file. For example, to compile the Orders05.java, the following command may be used to create the Orders05.class:

Javac com/hp/rtsc/documents/Orders05.java.

Deploying Metadata

After metadata is compiled, multiple actions are performed to deploy the metadata to the NonStop server. Metadata is deployed prior to testing because test drivers use the DOCCLASS table from the NonStop SQL database to determine which metadata classes to load. In an illustrative embodiment, the class file is first transferred in binary mode using the File Transfer Protocol (FTP) to the com/hp/rtsc/documents folder in an RTSC OSS install directory on the NonStop server. Second, if the metadata definition is new, an entry in the DOCCLASS table is created. The RTSC framework looks up the table and determines the class to load to process the applicable IDoc. For example, to add Orders05 metadata, the following command SQL is used:

```
insert into =DOCCLASS values("com.hp.rtsc.documents.Orders05",
"Metadata for ORDERS05", current).
```

Third, the RTSC framework is restarted to pick up the updated metadata, or management tools are used to request the real time information director (RTID) server to reload the updated metadata.

If the metadata is not deployed before testing, the new metadata class can be loaded by specifying the –c parameter to the test driver. All test drivers listed herein handle the –c parameter as in the following example:

Java Disassemble –c com.hp.rtsc.documents.NewMetadataClass <other params>.

A message is typically entered on a display screen, for example:

Load class com.hp.rtsc.documents. NewMetadataClass.

Finally, after deploying the new metadata on the real time information director (RTID) server, the server log is monitored to determine whether any errors are generated.

Testing Metadata

RTSC framework uses two internal document formats including "Groups" and "Records". The internal document formats are a representation of IDoc XML elements that are stored in the database. The Groups internal document format represents the grouping or relationship between the various IDoc segments and elements.

The Records internal document format is similar to the database record in a format suitable for storage. The Records format facilitates verification that elements in the input XML are mapped to the correct columns in the correct table, a useful property for debugging SQL errors. For errors such as data truncations and numeric value out of range, the Records representation of the IDoc can be accessed and compared against the table schema definitions in the database. If a SQL error occurs and debugging of the error is sought, the Disassemble test driver can be run to create a Records representation of the IDoc XML. Then the Records file can be visually inspected against the database schema to debug the field that generated the SQL error.

Stand-alone programs listed hereinafter can and typically are run without using RTSC WebLogic services. The stand-alone programs directly access the NonStop SQL database to obtain a list of metadata classes from DOCCLASS table, and load the specified metadata classes from the local com\hp\rtsc\documents directory.

EXAMPLE

Metadata Native Document Definition

A native document is specified by creating a new class, giving the class a descriptive name. The class extends NativeDocumentDefinition. A DocumentRecord is constructed to specify the document content metadata. The constructor for the class calls the super class constructor with two parameters, a reference to the document record and the document name. An alternate constructor has three parameters including the document record reference, the document name, and string of options, for example including a security policy.

```
package com.hp.rtsc.documents;
import com.hp.rtsc.metadata.*;
```

-continued

```
Import com.hp.rtsc.metadata.internal.MetadataInconsistency;
import java.sql.SQLException;
/**
* Metadata class to define an ORDERS05 IDOC.
*/
Public class Orders05 extends BaseDocumentDefinition
...
    private static final IDocSegment idocSegment =
    new IDocSegment ("ORDERS05","SALES_ORDER",
    new TagDefinition[ ] {
    IDOC.HEADER
    New Segment("E1EDK01", new TagDefinition[ ] {
    ...
    ...
    Private static DocumentRecord documentRecord=
    new DocumentRecord("SALES_ORDER", new RelatedRecords[ ] {
    new RelatedRecords ("ROLE_SPEC_SLS_ORD_EVENT"),
    new RelatedRecords ("SALES_ORDER_DETAIL",
    new RelatedRecords[ ] {
    new SplitRecord ("SLS_ORD_SPEC_BUSINESS"),
    new SplitRecord ("SALES_ORDER_FLOW",
    new Links(new String[ ] {
    "SALES_ORDER_NO","PRECEDING_DOCUMENT_NO",
    "SALES_ORDER_ITEM_NO",
    "PRECEDING_DOCUMENT_ITEM_NO"})),
    new RelatedRecords ("RL_SPEC_SO_DT_EV_OVRRD"),
    new RelatedRecords ("SLS_ORD_SCHEDULE_DT"),
    new RelatedRecords [ ] {
    new HistoryRecord("SLS_ORD_SCH_DT_HIST_STG")
    })
    })
    });
    // Metadata Constructor:
    public Orders05 ( )
    throws MetadataInconsistency, SQLException
    {
    super (documentRecord, idocSegment);
    }
```

DocumentRecord identifies the parent record of the document and is an object passed to the super class constructor. Parameters include the name of the table from which the parent record is drawn and an array of RelatedRecords. Keys from the table are used to select the record. Other records in the document are related to the record, directly using document keys and indirectly using other fields of the record or other related records.

Arrays of nested metadata are constructed as an array of RelatedRecords that is defined using the new statement, then constructing individual RelatedRecords. Nested metadata arrays are a direct representation of relationships between metadata. The RelatedRecords class selects one or more records from another table and includes parameters including the name of the table containing the related records and optionally a links object defining a link of the table to a parent table or an array of related records nested under a current record. SplitRecord identifies a single record in another table that is related to the parent record and is a subclass of RelatedRecords.

HistoryRecord identifies a single record that is inserted into another table when a parent record is inserted or replaced. HistoryRecord is a subclass of RelatedRecords. HistoryRecord can be used to capture schedule changes for line items in an IDoc.

The real time information director (RTID) metadata leverages the SQL schema data definition language (DDL). The real time information director queries the database to determine information, for example name, datatype, and defaults, about the individual tables used by a document.

The eXtended Markup Language (XML) tags for a native document are generated automatically with the top tag assigned as the document name and following tags assigned as the names of tables or fields in the database. Data elements are delimited by tags with the field name. The real time information director includes a tool to export the XML Schema for the native document. The XML Schema can be imported into applications that support XML, and used to specify mappings within the applications. An example of XML excerpts for a native documents follows:

```xml
<?xml version="1.0" encoding="ISO-8859-1"?>
<NATIVEORDERS>
 <SALES_ORDER>
  <SALES_DOCUMENT_TY>YOR</SALES_DOCUMENT_TY>
  <PRECEDING_DOCUMENT_NO>0200114533</PRECEDING_DOCUMENT_NO>
  <CUSTOMER_PURCHASE_ORDER_DT>2002-10-18</CUSTOMER_PURCHASE_ORDER_DT>
  <INCOTERMS_2_TX>DELIVERED DUTY UNPAID</INCOTERMS_2_TX>
  <SOURCE_NM>ORDERS05SAPAPL</SOURCE_NM>
...
  <ROLE_SPEC_SLS_ORD_EVENT>
  <EVENT_SPEC_CUSTOMER_NO>ZHPF400</EVENT_SPEC_CUSTOMER_NO>
  <EVENT_SPEC_LANGUAGE_CD>E</EVENT_SPEC_LANGUAGE_CD>
...
  </ROLE_SPEC_SLS_ORD_EVENT>
  <ROLE_SPEC_SLS_ORD_EVENT>
  <EVENT_SPEC_TITLE_TX>Company</EVENT_SPEC_TITLE_TX>
  <EVENT_SPEC_LANGUAGE_CD>E</EVENT_SPEC_LANGUAGE_CD>
...
  </ROLE_SPEC_SLS_ORD_EVENT>
```

A unique IDoc is specified by creating a new class and descriptively naming the new class, for example to match the IDoc. The class is to extend BaseDocumentDefinition. The constructor for the class calls the super class constructor with two parameters including a reference to the document content metadata and a reference to the document format metadata. The document content metadata id defined in the manner of the native document definition. An example of a metadata excerpt ORDERS05 follows:

```java
package com.hp.rtsc.documents;
import com.hp.rtsc.metadata.*;
import com.hp.rtsc.metadata.format.*;
import java.sql.SQLException;
/**
* Metadata class to define an ORDERS05 IDoc.
*/
public class Orders05 extends BaseDocumentDefinition {
        // XML IDoc Mapping Metadata.
        // This array of tags is declared separately,
        // since these tags occur both under <E1EDKA1> and <E1EDPA1>
        private static final FieldElement[ ] ORDER_EVENT_TAGS =
        new FieldElement[ ] {
                new FieldElement("PARVW", "PARTNER_FUNCTION_CD"),
                new FieldElement("PARTN", "EVENT_SPEC_CUSTOMER_NO"),
                new FieldElement("LIFNR", "EVENT_SPEC_SUPPLIER_NO"),
                new FieldElement("NAME1", "EV_SPEC_DOING_BUSINESS_AS_NM"),
        Private static DocumentRecord documentRecord =
        new DocumentRecord("SALES_ORDER", new RelatedRecords[ ] {
         new RelatedRecords("ROLE_SPEC_SLS_ORD_EVENT"),
         new RelatedRecords("SALES_ORDER_DETAIL", new RelatedRecords[ ] {
          New SplitRecord("SLS_ORD_SPEC_BUSINESS"),
          New SplitRecord("SALES_ORDER_FLOW", new Links(new String[ ] {
           "SALES_ORDER_NO","PRECEDING_DOCUMENT_NO",
           "SALES_ORDER_ITEM_NO","PRECEDING_DOCUMENT_ITEM_NO"})),
          New RelatedRecords("RL_SPEC_SO_DT_EV_OVRRD"),
          New RelatedRecords("SLS_ORD_SCHEDULE_DT",new RelatedRecords[ ]{
           new HistoryRecord("SLS_ORD_SCH_DT_HIST_STG")
          })
         })
        });
        // Metadata Constructor:
        public Orders05( )
```

-continued

```
        throws MetadataInconsistency, SQLException {
            super(documentRecord, idocSegment);
        }
}
```

IDocSegment identifies the top level XML tag of an IDoc and normally has the same name as the IDoc. IDocSegment is a tag that is passed to the super class constructor. All other format metadata is nested under the IDocSegment object. Parameters of IDocSegment include the name of the XML tag, the name of the table to which the top record belong, and an array of segment tags nested under the tag.

IDOC.HEADER is the first tag under the new IDocSegment and represents an IDoc header.

The IDoc class contains statically-initialized metadata objects that can be re-used in various IDocs. IDOC.HEADER is one object that is used in IDoc definitions. Other re-usable metadata objects can be added to the IDOC class or other classes. An example of an XML IDoc header is shown as follows:

```
<?xml version="1.0" encoding="iso-8859-1"?>
<ORDERS05>
    <IDOC BEGIN="1">
        <EDI_DC40 SEGMENT="1">
            <TABNAM>EDI_DC40</TABNAM>
            <MANDT>016</MANDT>
            <DOCNUM>0000000001651543</DOCNUM>
            <DOCREL>46C</DOCREL>
            <STATUS>30</STATUS>
            <DIRECT>1</DIRECT>
            <OUTMOD>2</OUTMOD>
            <IDOCTYP>ORDERS05</IDOCTYP>
            <CIMTYP>ORDERS05</CIMTYP>
            <MESTYP>ORDRSP</MESTYP>
            <SNDPOR>SAPAPL</SNDPOR>
            ...
            <CREDAT>20030916</CREDAT>
            <CRETIM>040122</CRETIM>
            <SERIAL>20030916040120</SERIAL>
        </EDI_DC40>
```

The following XML IDoc segment excerpt illustrates three data segments:

```
<E1EDK01 SEGMENT="1">
    <ACTION>000</ACTION>
    <CURCY>JPY</CURCY>
    <WKURS>1.00000</WKURS>
    <ZTERM>J328</ZTERM>
    <BELNR>0300060645</BELNR>
    <VSART>01</VSART>
    <VSART_BEZ>STANDARD</VSART_BEZ>
    <RECIPNT_NO>W0J008399</RECIPNT_NO>
    <AUGRU>00</AUGRU>
    <AUGRU_BEZ>New orders</AUGRU_BEZ>
</E1EDK01>
<E1EDK14 SEGMENT="1">
    <QUALF>006</QUALF>
    <ORGID>ZD</ORGID>
</E1EDK14>
<E1EDK14 SEGMENT="1">
    <QUALF>007</QUALF>
    <ORGID>ZZ</ORGID>
</E1EDK14>
```

The next tag definition following IDOC.HEADER is a Segment tag. In an illustrative example, for ORDERS05 the initial segment is E1EDK01 and contains information for the top level record. Segment is SAP terminology for a record or group of related fields in an IDoc. The term segment is also used to refer to a complex XML element, for example an XML tag that does not directly introduce data but only other XML elements. As a result, the segment contains an array of nested tag definitions. Following the segment is a FieldElement that maps an element to a table column. FieldElement parameters include a tagName string, a columnName string, and an optional formatter. A FieldsElement maps the same XML element to multiple columns in a database, for example in cases that the same data is stored by a different name in different tables. FieldsElement parameters include a tagName string, a columnNames string array, a fieldElements array, and an optional formatter. The following metadata excerpt illustrates an example of the start of an IDocSegment:

```
private static final IDocSegment idocSegment =
new IDocSegment("ORDERS05", "SALES_ORDER", new TagDefinition[ ] {
    IDOC.HEADER,
    new Segment("E1EDK01", new TagDefinition[ ] {
        new FieldElement("ACTION", "SALES_ORDER_ACTION_CD"),
        new FieldElement("CURCY", "CURRENCY_CD"),
        new FieldElement("WKURS", "PRICING_STATISTICS_EXCHANGE_RT"),
        new FieldElement("ZTERM", "PAYMENT_TERMS_CD"),
        new FieldElement("BSART", "CUSTOMER_PURCHASE_ORDER_TY"),
        new FieldsElement("BELNR", new String[ ]
            {"SALES_ORDER_NO", "PRECEDING_DOCUMENT_NO"}),
        new FieldElement("BSTZD", "PURCHASE_ORDER_NUMBER_DS"),
        new FieldElement("VSART", "SHIPPING_CONDITION_CD"),
        new FieldElement("VSART_BEZ", "SHIPPING_CONDITION_DS"),
        new FieldElement("RECIPNT_NO", "CUSTOMER_SOLD_TO_NO"),
        new FieldElement("KZAZU", "ORDER_COMBINATION_IN"),
        ...
        new FieldElement("DELCO", "AGREED_DELIVERY_TM")
    }),
```

QualifiedSegment can be used to compress data, for example by mapping different occurrences of the same XML element to a number of distinct columns in the record of the database. QualifiedSegment is used on recurring segments for which a first element serves as a qualifier. QualifiedSegments are often used to represent different uses of similar data objects, such as dates, organization identifiers, and document numbers. SegmentQualifier maps one instance of QualifiedSegment based on one value of the qualifier element. Parameters for the SegmentQualifier may include qualifiervalue, mappedTagName, columnName, or alternative qualifiers such as FieldElement field and impliedField which can be used to insert a fixed value into a database column on input of qualifiervalue. A segment qualifier can define multiple fields, for example the segment qualifier for E1EDK03 defines a time field as well as a date field. The following metadata excerpt illustrates an example of the start of a QualifiedSegment:

```
new QualifiedSegment("E1EDK14", "QUALF", new SegmentQualifier[ ] {
    new SegmentQualifier("001", "ORGID", "BUSINESS_AREA_CD"),
    new SegmentQualifier("006", "ORGID", "DIVISION_CD"),
    new SegmentQualifier("007", "ORGID", "DISTRIBUTION_CHANNEL_CD"),
    new SegmentQualifier("008", "ORGID", "SALES_ORGANIZATION_CD"),
    new SegmentQualifier("012", "ORGID", "SALES_DOCUMENT_TY"),
    new SegmentQualifier("010", "ORGID", "SALES_GP"),
    new SegmentQualifier("016", "ORGID", "SALES_OFFICE_CD")
}),
new QualifiedSegment("E1EDK03", "IDDAT", new SegmentQualifier[ ] {
    new SegmentQualifier("002", "DATUM", "REQUESTED_DELIVERY_DT"),
    new SegmentQualifier("005", "DATUM", "VALID_FROM_QUOTATION_DT"),
    new SegmentQualifier("006", "DATUM", "VALID_TO_QUOTATION_DT"),
    new SegmentQualifier("012", "DATUM","DOCUMENT_RECEIVED_SENT_DT"),
    new SegmentQualifier("022", "DATUM","CUSTOMER_PURCHASE_ORDER_DT"),
    new SegmentQualifier("025", new FieldElement[ ] {
        new FieldElement("DATUM", "RECORD_CREATE_DT"),
        new FieldElement("UZEIT", "ORDER_ENTRY_TM")
    }),
    new SegmentQualifier("023","DATUM","PRICE_AND_EXCHANGE_RATE_DT")
}),
```

RecordSegment maps a segment to a record in a table, according to parameters including tagName, tableName, tagDefinitions array, and optional ImpliedField. Many tag definitions can be nested within a RecordSegment. Segment defines a segment that does not introduce a new record into the database. Therefore, segment is to be used only when the segment does not occur more than once within any instance of the parent segment. RecordSegment is a subclass of Segment. The following metadata excerpt illustrates an example of a RecordSegment:

```
new RecordSegment("E1EDP01","SALES_ORDER_DETAIL",new TagDefinition[ ]{
    new FieldsElement("POSEX", new String[ ]
    {"SALES_ORDER_ITEM_NO","PRECEDING_DOCUMENT_ITEM_NO"}, IDOC.ITEM_NO),
    new FieldElement("ACTION", "SALES_ORDER_ITEM_ACTION_CD"),
    ...
    new RecordSegment("E1EDP20","SLS_ORD_SCHEDULE_DT",new TagDefinition[ ]{
        new FieldElement("WMENG", "CONFIRMED_QT"),
        new FieldElement("EDATU", "SCHEDULE_LINE_DT"),
        new FieldElement("EZEIT", "DELIVERY_TM"),
        new Segment("ZEEDP20", new FieldElement[ ] {
            new FieldElement("ETENR", "SCHEDULE_LINE_NO", IDOC.LINE_NO),
            new FieldElement("LDDAT", "LOADING_DT"),
            new FieldElement("MBDAT", "MATERIAL_AVAILABILITY_DT"),
            new FieldElement("WADAT", "CURRENT_SCHEDULED_SHIP_DT"),
            new FieldElement("EDATU", "CUSTOMER_REQUESTED_RECEIPT_DT"),
            new FieldElement("WMENG", "REQUESTED_QT")
        })
    }),
    new RecordSegment("E1EDPA1","RL_SPEC_SO_DT_EV_OVRRD",ORDER_EVENT_TAGS),
```

Nested RecordSegments have automatic access to columns in parent and grandparent RecordSegments, a useful characteristic since key columns for parent records usually are included in child detail records. A column may be used in a table identified in the owning RecordSegment, tables identified in directly nested child RecordSegments, tables identified in indirectly nested descendant RecordSegments, and in any such combination. In a parent-child relationship, records in child tables link back to a record in a parent table.

A RecordSegment may refer to more than one table. Tables can be horizontally segmented so that different columns of the same entity are stored in different tables. The same entities may be represented in different tables with different primary keys for mapping or lookup purposes. Each such segmented record is identified in the content metadata as a SplitRecord. Any column is stored into a segmented table having a column by the name of one or more of the segmented tables, or none of the segmented tables.

In a split-record relationship, data can be inserted as records into two different tables by splitting part of data into a first table and the remaining data in one or more additional tables.

In a lookup-table relationship, a portion of data that is inserted into a table is derived from data supplied by static lookup tables.

Mapped elements are put in a hash table keyed by column name with a separate hash table allocated for each parsed RelatedRecords and DocumentRecord. Before inserting in the database, the real time information director looks up each column in the owning RelatedRecords, then the parent, then the grandparent, all the way up to the DocumentRecord. Columns can be moved between different tables, or completely removed, without changing the mapping metadata. Accordingly, mapping is equally driven by the static mapping metadata and the dynamically-read schema of the database. ParentElement maps an element to a column in the parent table. QualifiedParentElement maps an element in a specific instance of a segment to a column in the parent table. FixedElement generates an element in subscribed IDocs that has an unchanging value. FixedElement may be used in IDOC.HEADER to populate fields of the outbound document header that are used to pass XML schemas published by SAP, but which are not captured in RTSC data store. Elements can be concatenated using PrependFieldElement and AppendFieldElement which map two elements into a single table column by concatenation. A distinct separator character is used to enable deconcatenation of the column when assembling the IDoc for subscriptions. SplitElement divides an element into two fields of the database.

Formatter classes can be used to convert element data from the IDoc document format, or custom format, to the database format or vice versa. For outbound documents, as elements are written out, formatter formats element data to the external document format. For inbound traffic, as elements are parsed the formatter unformats the element data to the database format. When possible, the formatter implements reformatting in both directions. A Formatter object can be passed as an optional parameter to the constructor of any FieldElement or subclass of FieldElement.

Automatic formatters can be applied to elements in IDocs based on the data type of the corresponding SQL field. A production order follows that includes many formatters:

```
new FieldElement("FREIZ", "REL_PERIOD_IN_DA", new LeadingZeros(3)),
new FieldElement("FTRMI", "ACTUAL_RELEASE_DT", IDOC.DASHED_DATE),
new FieldElement("FTRMS", "SCHEDULED_RELEASE_DT", IDOC.DASHED_DATE),
new FieldElement("GAMNG", "TOTAL_ORDER_QT"),
new FieldElement("GETRI", "CONFIRMED_ORDER_FINISH_DT", IDOC.DASHED_DATE),
new FieldElement("GEUZI", "CONFIRMED_ORDER_FINISH_TM", IDOC.TIME),
new FieldElement("GLTRI", "ACTUAL_FINISH_DT", IDOC.DASHED_DATE),
new FieldElement("GLTRP", "BASIC_FINISH_DT", IDOC.DASHED_DATE),
new FieldElement("GLTRS", "SCHEDULED_FINISH_DT", IDOC.DASHED_DATE),
new FieldElement("GLUZP", "BASIC_FINISH_TM", IDOC.TIME),
new FieldElement("GLUZS", "SCHEDULED_FINISH_TM", IDOC.TIME),
new FieldElement("GMEIN", "COMMON_UNIT_OF_MEASURE_CD"),
new FieldElement("GSTRI", "ACTUAL_START_DT", IDOC.DASHED_DATE),
new FieldElement("GSTRP", "BASIC_START_DT", IDOC.DASHED_DATE),
new FieldElement("GSTRS", "SCHEDULED_START_DT", IDOC.DASHED_DATE),
new FieldElement("GSUZP", "BASIC_START_TM", IDOC.TIME),
new FieldElement("GSUZS", "SCHEDULED_START_TM", IDOC.TIME),
```

The following shows usage of re-usable formatters defined in the IDOC class:

```
public final static Formatter TIME = new ColonTime( );
public final static Formatter DASHED_DATE = new DashedDate( );
public final static Formatter STRIP_BLANKS = new
RemoveCharFormatter(' ');
public final static Formatter PRODUCT_BASE_NO =
new CompoundFormatter(new Formatter[ ] {
   New SubStringFormatter("#"),
   STRIP_BLANKS
});
public final static Formatter ITEM_NO = new LeadingZeros(6);
public final static Formatter LINE_NO = new LeadingZeros(4);
```

Typically SAP instances have some unique aspects of data element handling. Variant document definitions facilitate management of the different aspects by creating a separate document metadata class for each source. Variant documents are recognized based on information in the header of inbound documents. The header information identifies the sending system. Variants can potentially be selected based on other header information. Variant document definitions typically do not supply content metadata. Content metadata of the base document is used. Variant documents are used when the same IDoc has different tag mappings in different circumstances. Typically mappings vary by source SAP instance. Variant document definitions extend the VariantDocumentDefinition class. The super class is called with parameters including selectable variantSelector to identify the variant from information in the header of the inbound IDoc, variantName string to select the variant form of the IDoc in an outbound document, idocSegment containing the format metadata for the variant IDoc, and a string of options. The following illustrates an example of a variant document definition:

```
package com.hp.rtsc.documents;
import com.hp.rtsc.metadata.*;
import com.hp.rtsc.metadata.format.*;
import java.sql.SQLException;
// Metadata class to define an ORDERS05 IDoc for Fusion Asia Pacific
public class IhubOrders05FusionAP extends VariantDocumentDefinition {
...
  private static final IDocSegment idocSegment =
  new IDocSegment("ORDERS05", "SALES_ORDER",
    new Segment[ ] {
      IDOC.HEADER,
      new Segment("E1EDK01", new FieldElement[ ] {
...
  // Metadata Constructor:
  public IhubOrders05FusionAP( )
    throws MetadataInconsistency, SQLException {
    super(Sources.FusionAP, "ORDERS05FUSIONAP", idocSegment);
    }
  }
}
```

The following metadata excerpt shows an example of an implementation of source selectors:

```
package com.hp.rtsc.documents;
import com.hp.rtsc.metadata.SourceSelector;
public class Sources
{
  static final SourceSelector Calado = new SourceSelector("SAPCLP");
  static final SourceSelector CRS = new SourceSelector("SAPMA2");
  static final SourceSelector D7 = new SourceSelector("SAPD7C");
  static final SourceSelector EPH = new Source Selector("SAPEPH");
  static final SourceSelector GPG = new SourceSelector("SAPGPG");
  static final SourceSelector FusionAP = new
  SourceSelector("SAPAPL");
  static final SourceSelector FusionEU = new SourceSelector("SAPR01");
  static final SourceSelector FusionAM = new
  SourceSelector("TRMUT");
  static final SourceSelector RSAP = new SourceSelector("SAPPAP");
  static final SourceSelector SAIL = new SourceSelector("SAPCPO");
  static final SourceSelector SPE = new SourceSelector("SAPSPE");
  static final SourceSelector SPR = new SourceSelector("SAPEXE");
}
```

Aliased documents are used when an IDoc has a distinctive top tag that differentiates the document from other variants of the document. Aliased document definitions extend the AliasedDocumentDefinition class. The super class is called with parameters including idocSegment containing the format metadata for the variant IDoc, and string idocSegment containing the format metadata for the variant IDoc. The following metadata excerpt depicts an example of an aliased document definition:

```
package com.hp.rtsc.documents;
import com.hp.rtsc.metadata.*;
import com.hp.rtsc.metadata.format.*;
import java.sql.SQLException;
// Metadata class to define an ORDERS05 IDoc for Fusion North America
public class IhubOrders05FusionAM extends
AliasedDocumentDefinition {
...
  private static final IDocSegment idocSegment =
  new IDocSegment("ZORDREXT", "SALES_ORDER",
```

-continued

```
    new Segment[ ] {
      IDOC.HEADER,
      new Segment("E1EDK01", new TagDefinition[ ] {
...
  // Metadata Constructor:
  public IhubOrders05FusionAM( )
    throws MetadataInconsistency, SQLException {
    super(idocSegment, "ORDERS05");
    }
}
```

A substitute document definition enables dynamic replacement of an existing base document or aliased document without restarting WebLogic Server (WLS). The substitute document definition can be used to correct or modify document format metadata and deploy the metadata into a system that is executing without interruption. A Java class cannot be reloaded once loaded into a java Virtual Machine (JVM) by the class loader. Therefore, the substitute document definition is created using a new class name. Variant document definitions are substituted in real-time using a new variant document definition. The super class is called using parameters including idocSegment that contains format metadata for the variant IDoc. The following metadata excerpt depicts an example of a substitute document definition:

```
package com.hp.rtsc.documents;
import com.hp.rtsc.metadata.*;
import com.hp.rtsc.metadata.format.*;
import java.sql.SQLException;
// Metadata class to define an ORDERS05 IDoc
public class Orders05v3 extends SubstituteDocumentDefinition {
...
  private static final IDocSegment idocSegment =
  new IDocSegment("ORDERS05", "SALES_ORDER",
    new Segment[ ] {
      IDOC.HEADER,
      new Segment("E1EDK01", new FieldElement[ ] {
...
  // Metadata Constructor:
  public IhubOrders05( )
    throws MetadataInconsistency, SQLException {
    super(idocSegment);
    }
}
```

The same SQL statements generated for base document definitions can be used for variant, aliased, and substitute documents, saving SQL statement compilation time, conserving SQL connections, and enabling format metadata to be deployed without recompilation of SQL statements. A management interface notifies the running system when a new document definition class is available, whether a replacement or completely new document definition.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, components, and dimensions can be varied to achieve the desired structure as well as modifications, which are within the scope of the claims. Variations and modifications of the embodiments disclosed herein may also be made while remaining within the scope of the following claims. For example, the specific embodiments described herein identify various computing languages, application software packages, and systems that operate as part of or in conjunction with the illustrative information handling system, components, and methods. In other embodiments, any suitable languages, applications, systems, and operating methods may be used. The various embodiments described herein have multiple aspects and components. These aspects and components may be implemented individually or in combination in various embodiments and applications. Accordingly, each claim is to be considered individually and not to include aspects or limitations that are outside the wording of the claim.

What is claimed is:

1. A data services handler for execution on a computing system comprising:
   an interface executing on the computing system for communicating between a data store and applications that supply and consume data; and
   a real time information director (RTID) executing on the computing system that transforms data for supply, consumption, or both by the applications under direction of polymorphic metadata that defines a security model and data integrity rules for application to the data, the RTID to dynamically instantiate, create, and cache for reuse disassemblers and assemblers according to demand, the RTID further comprising:
      at least one disassembler defined according to the polymorphic metadata that disassembles inbound data documents into multiple records in preparation for insertion into metadata tables; and
      at least one assembler defined according to the polymorphic metadata that assembles outbound data documents from at least one record selected from at least one metadata-selected table whereby data is transformed for supply, consumption or both.

2. The data services handler according to claim 1 further comprising:
   a data mapper collecting data from a plurality of diverse applications that can supply data in multiple diverse external document formats and mapping the supplied data to a predetermined unified data model according to the polymorphic metadata.

3. The data services handler according to claim 1 wherein:
   the real time information director comprises a logic that cleanses and enriches the data, supplies data security, and insures data integrity.

4. The data services handler according to claim 1 wherein the real time information director further comprises:
   the RTID using a same descriptive polymorphic metadata to build both assemblers and disassemblers for a same document class.

5. The data services handler according to claim 1 wherein the real time information director further comprises:
   a logic that defines a data model according to received descriptive metadata that identifies individual data elements and specifies logic behaviors applicable to the individual data elements.

6. The data services handler according to claim 1 wherein the real time information director further comprises:
   a logic that represents metadata as polymorphic objects, enabling individual metadata objects to have distinct numbers and types of attributes according to a predetermined object class, the behaviors and attributes being defined specific to object class.

7. The data services handler according to claim 1 wherein the real time information director further comprises:
   a logic that represents metadata as stateless polymorphic objects that are permanent after initial construction, whereby methods of stateful metadata classes delegate operation to the stateless polymorphic metadata objects.

8. The data services handler according to claim 1 wherein the real time information director further comprises:
   at least one metadata object constructed using constructors of multiple metadata classes, the constructors having parameters that specify metadata data elements and being nested to represent hierarchical relationships between the specified metadata data elements, the at least one metadata object including identifying information for deriving the hierarchical relationships.

9. The data services handler according to claim 1 wherein the real time information director further comprises:
   a logic that uses received data document mapping metadata to disassemble elements of inbound data documents into rows and columns to be inserted into inbound metadata-selected tables in a database, select rows and columns from outbound metadata-selected tables of the database, assemble elements from the outbound metadata-selected tables into an outbound data document, and generate a schema for documents that can be input or output using the received data document mapping metadata.

10. The data services handler according to claim 1 wherein:
    the real time information director receives and publishes data documents having a content and a format defined by document metadata.

11. The data services handler according to claim 1 wherein the real time information director further comprises:
    a logic that reads a schema of tables identified in metadata; and
    a logic that automatically generates and caches prepare SQL statements from a content metadata portion of document metadata according to the schema.

12. The data services handler according to claim 1 further comprising:
    a servlet that invokes the real time information director synchronously when an inbound data document is delivered via HyperText Transport Protocol (HTTP);
    a logic that invokes the real time information director asynchronously when an inbound data document is delivered via Java Message Service (JMS);
    a servlet that invokes the real time information director synchronously when an outbound data document is requested via HyperText Transport Protocol (HTTP); and
    a logic that invokes the real time information director asynchronously when an outbound data document is requested via Java Message Service (JMS).

13. The data services handler according to claim 1 wherein the real time information director further comprises:
    a subscription handler that responds to a triggering event by publishing a document according to content and format specified by Document Metadata, and sending the document to a designated queue or topic.

14. The data services handler according to claim 1 wherein the real time information director further comprises:
    a security manager that identifies an agent on behalf of whom information is queried or updated in a document request, dynamically assigns an Internal unique identifier to consumers and agents upon registration; and the real time information director grants access to individual documents based on security policies according to a relationship between an agent, a consumer affected by the agent, and permissions granted by the consumer.

15. The data services handler according to claim 14 wherein:
the security manager enforces securities policies that are specifiable for each document.

16. The data services handler according to claim 14 wherein:
the security manager enforces securities policies that are customized to identify specific agent and consumer relationships expressed in a business model.

17. The data services handler according to claim 1 wherein the real time information director further comprises:
an audit log handler that responds to changes in the data store by compiling and storing information based on metadata that determines content and detail of the compiled information.

18. The data services handler according to claim 1 wherein the real time information director further comprises:
a data cleanser that receives data elements identified by Document Metadata, normalizes the data elements, queues source and destination information for detection of duplicates, and cross-references duplicates in the data store.

19. The data services handler according to claim 1 wherein the real time information director further comprises:
an aggregation engine that computes aggregates in memory from data selected from the data store.

20. The data services handler according to claim 1 wherein the real time information director further comprises:
a real-time scoring engine.

21. The data services handler according to claim 1 wherein the real time information director further comprises:
a business rules engine that defines a business object model capable of enabling access to data described by Document Metadata, performing computations on data relevant to business rules specified by the business object model, concluding a decision based on computation results, and executing the decision.

22. An article of manufacture comprising:
a controller-usable storage medium having a computer readable program code embodied therein for managing data services, the computer readable program code further comprising:
a code causing the controller to transfer data among a data store and applications that supply and consume data;
a code causing the controller to transform data for transfer using a representation of metadata as polymorphic objects, enabling individual metadata objects to have distinct numbers and types of attributes according to a predetermined object class, the behaviors and attributes being defined specific to object class;
a code causing the controller to dynamically instantiate, create, and cache for reuse at least one disassembler and at least one assembler according to demand;
a code dynamically created by the controller as defined by polymorphic metadata that disassembles inbound data documents into multiple records in preparation for insertion into metadata tables; and
a code dynamically created by the controller as defined by polymorphic metadata that assembles outbound data documents from at least one record selected from at least one metadata-selected table.

23. The article of manufacture according to claim 22 further comprising:
a code causing the controller to transform data under direction of polymorphic metadata that defines a security model and data integrity rules for application to the data.

24. The article of manufacture according to claim 22 further comprising:
a code causing the controller to collect data from a plurality of diverse applications that can supply data in multiple diverse external document formats and mapping the supplied data to a predetermined unified data model according to the polymorphic metadata.

25. The article of manufacture according to claim 22 further comprising:
a code causing the controller to represent metadata as stateless polymorphic objects that are permanent after initial construction, whereby methods of stateful metadata classes delegate operation to the stateless polymorphic metadata objects.

26. The article of manufacture according to claim 22 further comprising:
a code causing the controller to construct at least one metadata object using constructors of multiple metadata classes;
a code causing the controller to use constructor parameters to specify metadata data elements and being nested to represent hierarchical relationships between the specified metadata data elements, the at least one metadata object including identifying information for deriving the hierarchical relationships.

27. The article of manufacture according to claim 22 further comprising:
a code causing the controller to use received data document mapping metadata to disassemble elements of inbound data documents into rows and columns to be inserted into inbound metadata-selected tables in a database, select rows and columns from outbound metadata-selected tables of the database and assemble elements from the outbound metadata-selected tables into an outbound data document, and generate a schema for documents that can be input or output using the received data document mapping metadata.

28. An enterprise system comprising:
a plurality of interlinked computer servers and networks enabling multiple users to access applications and data on the servers; and
a real time information director (RTID) executing on at least one of the interlinked servers that manages information flow between a data store and applications that supply and consume data and dynamically instantiates, creates, and caches for reuse disassemblers and assemblers according to demand,
the RTID that creates at least one disassembler defined according to the polymorphic metadata that disassembles inbound data documents into multiple records in preparation for insertion into metadata tables and create at least one assembler defined according to the polymorphic metadata that assembles outbound data documents from at least one record selected from at least one metadata-selected table whereby data is transformed for supply, consumption, or both.

29. The enterprise system according to claim 28 further comprising:
a business rules engine coupled to the real time information director that personalizes transactions by applying business rules and prediction models against cached entity data.

30. The enterprise system according to claim 28 further comprising:
a server platform coupled to the real time information director that serves deployed models, customer data, and interaction data.

31. The enterprise system according to claim 28 wherein:
the RTID represents metadata as polymorphic objects, enabling individual metadata objects to have distinct numbers and types of attributes according to a predetermined object class, the behaviors and attributes being defined specific to object class.

32. The enterprise system according to claim 28 wherein:
the RTID represents metadata as stateless polymorphic objects that are permanent after initial construction, whereby methods of stateful metadata classes delegate operation to the stateless polymorphic metadata objects.

33. A data services handler according to claim 1 further comprising:
a at least one generator that is dynamically created by the RTID as defined by polymorphic metadata and generates an eXtended Markup Language (XML) Schema that describes format of the documents, the at least one disassembler, assembler, and generator that use a single descriptive polymorphic metadata.

34. The data services handler according to claim 33 wherein the metadata further comprises:
content metadata that defines data to be included into a document; and
format metadata that defines how the data appears in the document.

35. The data services handler according to claim 33 wherein the real time information director further comprises:
a query logic that queries the database to determine information about tables in the database that the document uses, the information including field name, field datatype, and field allowance of nulls.

36. A method for executing on a computer system for managing data services comprising:
transfering data among a data store and applications that supply and consume data;
transforming data for transfer using a representation of metadata as polymorphic objects, enabling individual metadata objects to have distinct numbers and types of attributes according to a predetermined obiect class, the behaviors and attributes being defined specific to object class;
dynamically instantiating, creating, and caching for reuse at least one disassembler and at least one assembler according to demand;
disassembling inbound data documents into multiple records in preparation for insertion into metadata tables; and
assembling outbound data documents from at least one record selected from at least one metadata-selected table.

37. A method according to claim 36 further comprising:
dynamically creating metadata for a new native document as defined by polymorphic metadata further comprising: determining whether inbound documents are inserted, delserted or upserted;
generating native documents;
determining what data from the SQL database is sufficient for usage in the new native document; and
creating an XML Schema for the native document.

* * * * *

UNITED STATES PATENT AND TRADEMARK OFFICE
CERTIFICATE OF CORRECTION

PATENT NO. : 7,313,575 B2 Page 1 of 1
APPLICATION NO. : 10/868434
DATED : December 25, 2007
INVENTOR(S) : Steven R. Carr et al.

It is certified that error appears in the above-identified patent and that said Letters Patent is hereby corrected as shown below:

In column 1, lines 32–33, delete "a cross" and insert -- across --, therefor.

In column 56, line 43, in Claim 12, delete "serviet" and insert -- servlet --, therefor.

In column 56, line 49, in Claim 12, delete "serviet" and insert -- servlet --, therefor.

In column 56, line 66, in Claim 14, delete "Internal" and insert -- internal --, therefor.

In column 59, line 20, in Claim 33, delete "a" before "at least".

In column 60, line 6, in Claim 36, delete "transfering" and insert -- transferring --, therefor.

In column 60, line 11, in Claim 36, delete "obiect" and insert -- object --, therefor.

Signed and Sealed this

Eighth Day of July, 2008

JON W. DUDAS
*Director of the United States Patent and Trademark Office*